United States Patent
Lakic

[19]

[11] Patent Number: 6,014,823
[45] Date of Patent: *Jan. 18, 2000

[54] INFLATABLE SOLE LINING FOR SHOES AND BOOTS

[76] Inventor: Nikola Lakic, 45-191 Elm St., Indio, Calif. 92201

[*] Notice: This patent is subject to a terminal disclaimer.

[21] Appl. No.: 07/931,025

[22] Filed: Aug. 17, 1992

Related U.S. Application Data

[63] Continuation of application No. 07/636,603, Dec. 31, 1990, abandoned, which is a continuation-in-part of application No. 07/539,978, Jun. 18, 1990, abandoned, which is a continuation-in-part of application No. 07/427,515, Oct. 27, 1989, Pat. No. 5,025,575, which is a continuation-in-part of application No. 07/323,340, Mar. 14, 1989, Pat. No. 4,991,317, which is a continuation-in-part of application No. 07/262,749, Oct. 28, 1988, abandoned, which is a continuation-in-part of application No. 07/230,908, Aug. 11, 1988, Pat. No. 4,941,271, which is a continuation-in-part of application No. 07/177,410, Apr. 4, 1988, Pat. No. 4,845,338, which is a continuation-in-part of application No. 07/093,579, Sep. 4, 1987, Pat. No. 4,823,482, which is a continuation-in-part of application No. 07/054,189, May 26, 1987, Pat. No. 4,782,602.

[51] Int. Cl.$^7$ .............. A43B 7/14; A43B 13/20; A43B 7/06
[52] U.S. Cl. .................. 36/93; 36/3 B; 36/29; 36/54; 36/71; 36/11.5
[58] Field of Search .................. 36/28, 29, 3 R, 36/3 B, 117.6, 43, 44, 93, 117.1, 88, 71, 25 R, 11.5, 54, 153, 154, 114

[56] References Cited

U.S. PATENT DOCUMENTS

| | | | |
|---|---|---|---|
| 518,579 | 4/1894 | Annenberg et al. | 36/2.6 |
| 1,364,226 | 1/1921 | Wherry . | |
| 1,976,656 | 10/1934 | Clark | 36/153 |
| 2,104,924 | 1/1938 | Dellea | 36/28 |
| 2,825,154 | 3/1958 | Windle | 36/38 |
| 2,836,907 | 6/1958 | Windle | 36/38 |
| 3,225,463 | 12/1965 | Burnham | 36/3 R |
| 3,410,004 | 11/1968 | Finn | 36/93 |
| 3,716,930 | 2/1973 | Brahm | 36/3 B |

(List continued on next page.)

FOREIGN PATENT DOCUMENTS

| | | | |
|---|---|---|---|
| 0155495 | 9/1985 | European Pat. Off. . | |
| 2252820 | 6/1975 | France . | |
| 2356384 | 1/1978 | France | 36/71 |
| 2496423 | 6/1982 | France . | |
| 2460034 | 6/1976 | Germany | 36/29 |
| 3200139 | 10/1982 | Germany . | |
| 3600437 | 1/1986 | Germany . | |
| 2085278 | 4/1982 | United Kingdom | 36/43 |
| 9009115 | 8/1990 | WIPO . | |

*Primary Examiner*—Ted Kavanaugh
*Attorney, Agent, or Firm*—Robert E. Strauss

[57] ABSTRACT

There is disclosed an inflatable lining for selected inner surfaces of footwear, such as a shoe, boot or sandal. The inflatable lining is formed of first and second plastic sheets having the shape and size of the selected inner surfaces, e.g., a sole, or any portion of the upper surfaces of the footwear. The sheets are bonded together in a continuous seam about their peripheral edges thereby forming a sealed interior chamber. A plurality of discontinuous seams are formed between the first and second sheets to create within the sealed interior chamber a plurality of interconnecting tubular passageways, and at least one continuous seam can also be provided that subdivides the interior chamber into two or more subdivided interior chambers. The inflatable liner is provided with an air pump that preferably is a flexible bulb with an inlet valve which discharges into a flexible tube which extends to a pressure control valve and then to the interior chamber of the inflatable inner sole. Preferably the flexible bulb is mounted at the heel of the inner sole. The pressure relief valve is manually adjustable to control the pressure within the inflatable inner sole. Excess air from the pressure control valve can be directed into channels formed on the undersurface of the inner sole where it discharges through sealed apertures in the inner sole thereby providing forced air circulation in the footwear. Alternatively, manually operated air pumps can be provided.

20 Claims, 59 Drawing Sheets

U.S. PATENT DOCUMENTS

| | | | |
|---|---|---|---|
| 3,724,106 | 4/1973 | Magidson | 36/44 |
| 3,758,964 | 9/1973 | Nishimura | 36/119 |
| 4,123,855 | 11/1978 | Thedford | 36/153 X |
| 4,183,156 | 1/1980 | Rudy | 36/44 |
| 4,219,945 | 9/1980 | Rudy | 36/29 |
| 4,232,459 | 11/1980 | Vaccari | 36/71 |
| 4,236,725 | 12/1980 | Bataille | 36/93 |
| 4,462,171 | 7/1984 | Whispell | 36/29 |
| 4,471,538 | 9/1984 | Pomeranz et al. | 36/43 |
| 4,567,677 | 2/1986 | Zona | 36/43 |
| 4,702,022 | 10/1987 | Porcher | 36/93 |
| 4,730,403 | 3/1988 | Walkhoff | 36/119 |
| 4,776,110 | 10/1988 | Shiang | 36/3 B |
| 4,991,317 | 2/1991 | Lakic | 36/44 |
| 4,995,173 | 2/1991 | Spier | 36/93 X |
| 4,999,932 | 3/1991 | Grim | 36/3 B |
| 5,025,575 | 6/1991 | Lakic | 36/29 |
| 5,113,599 | 5/1992 | Cohen et al. | 36/29 |
| 5,158,767 | 10/1992 | Cohen et al. | 36/29 |

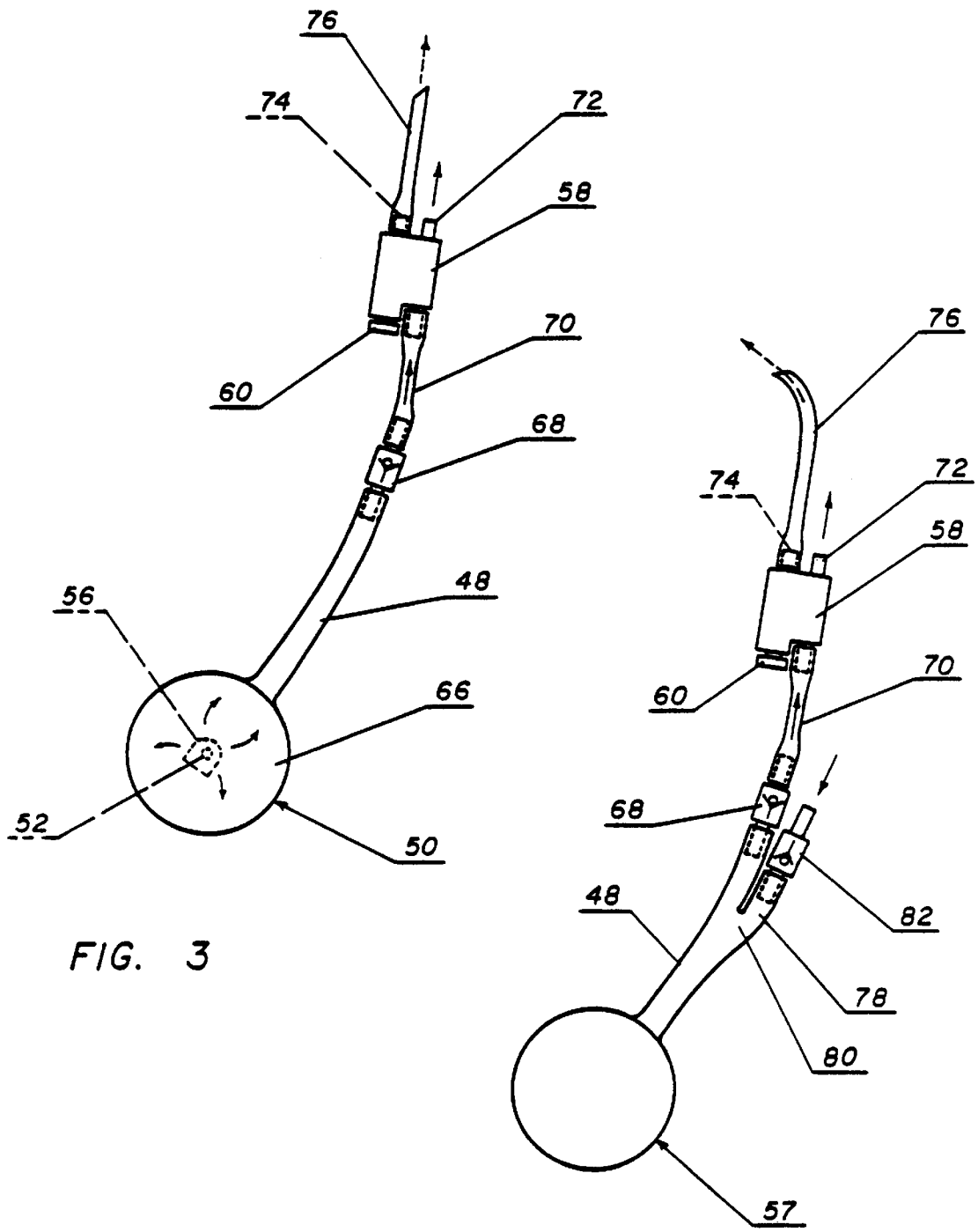

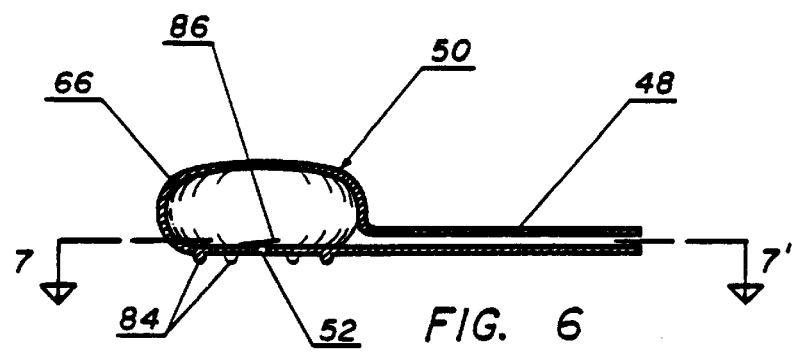
FIG. 6
FIG. 7
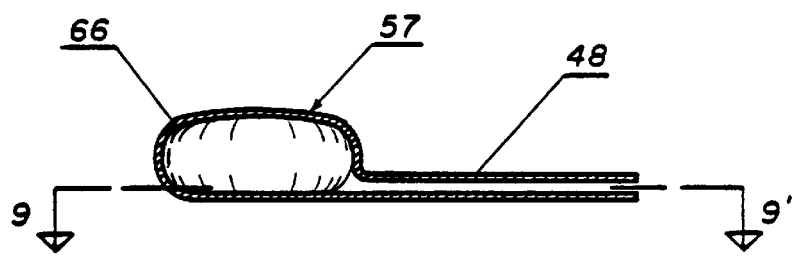
FIG. 8
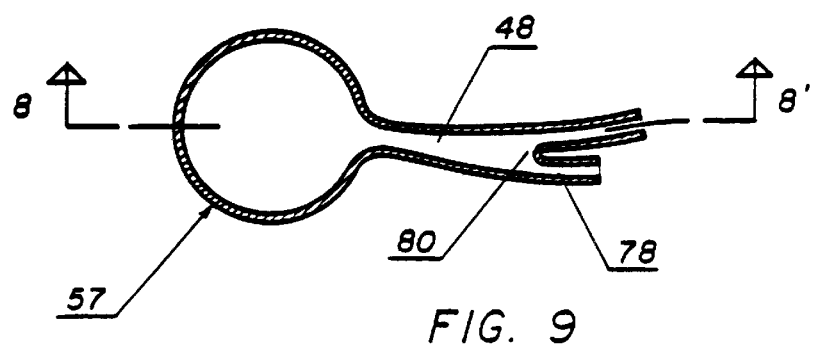
FIG. 9

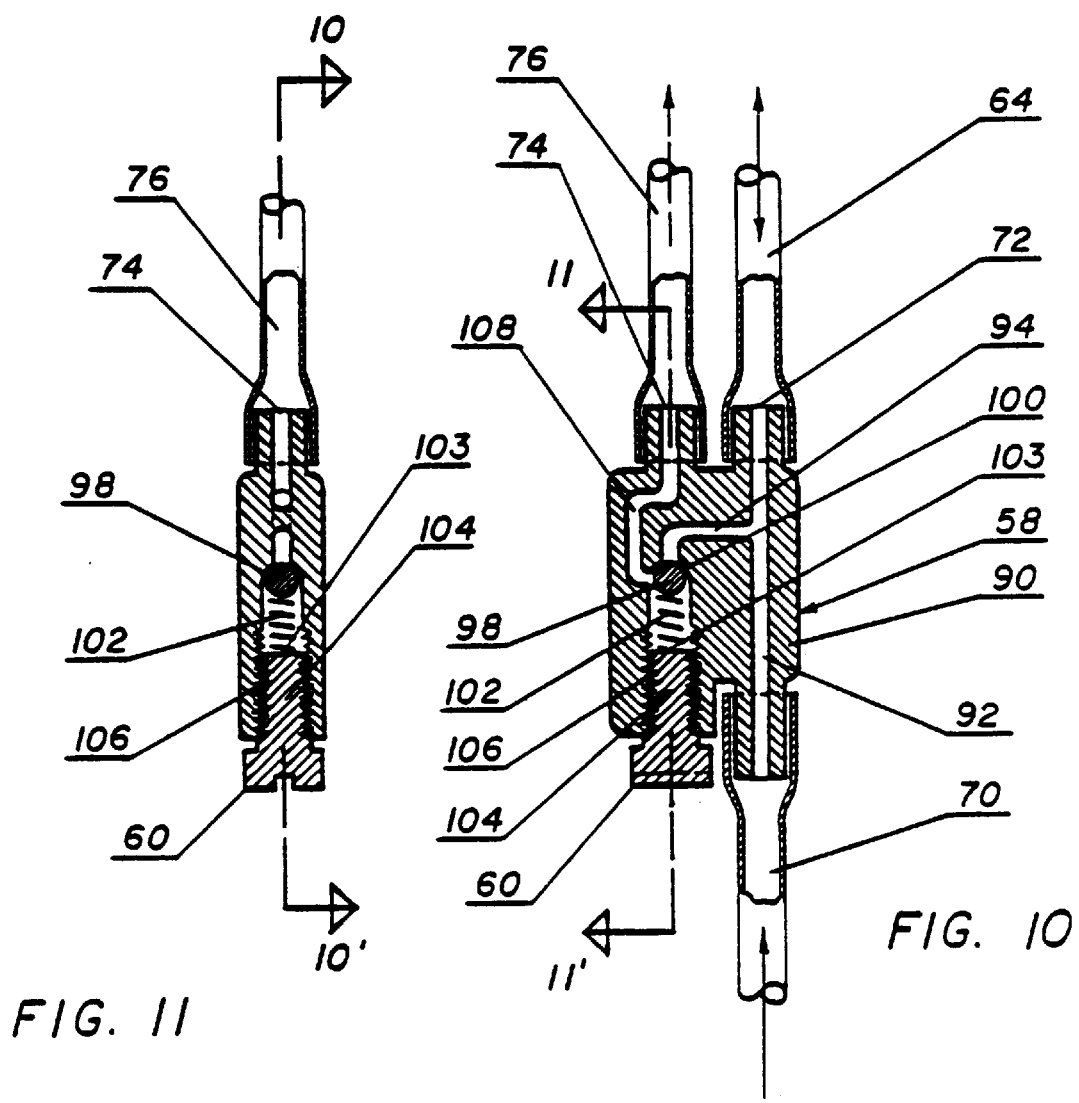
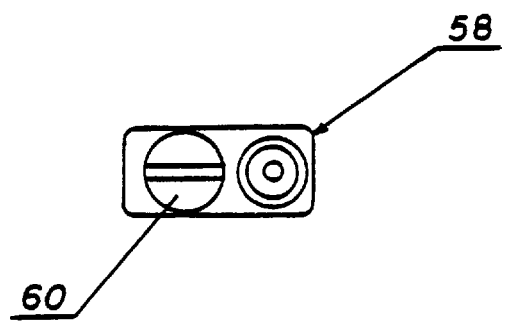
FIG. 12

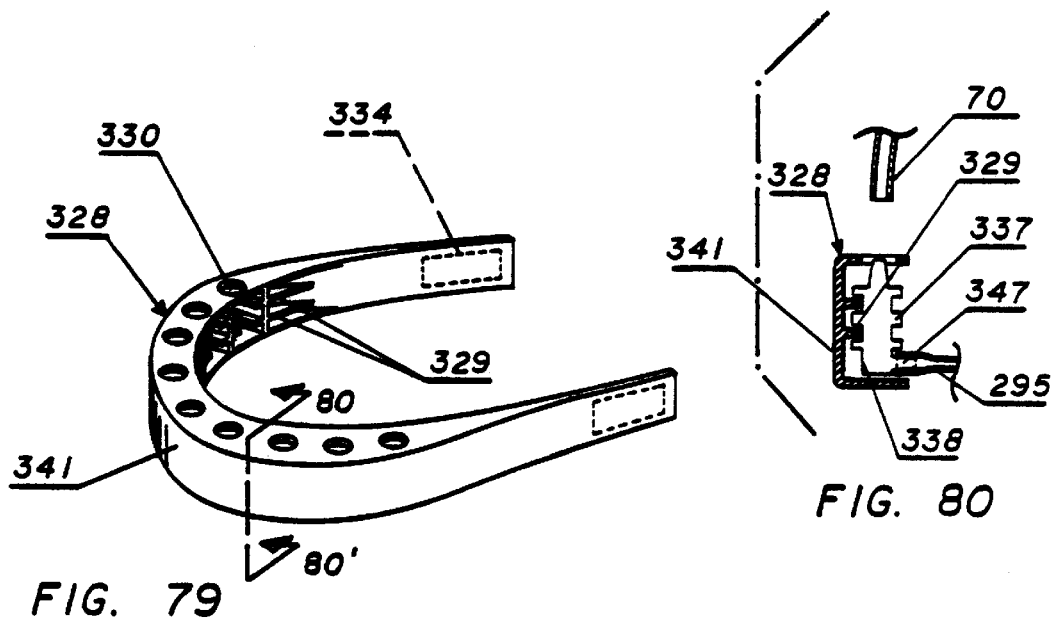
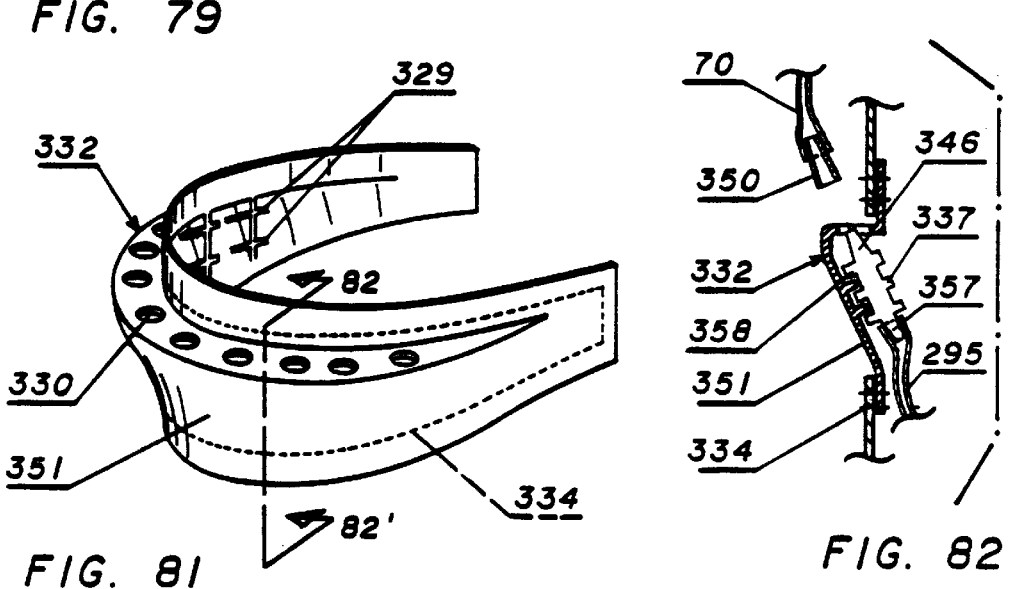
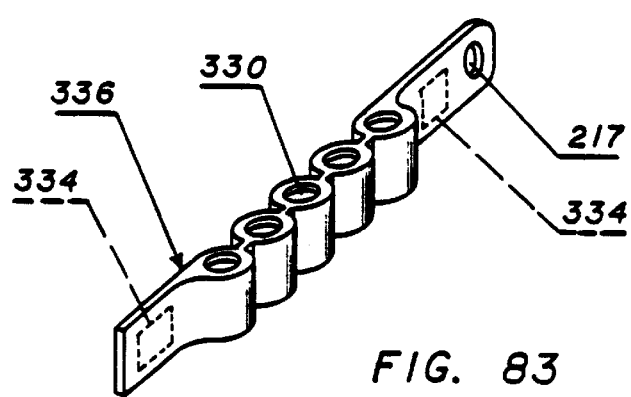

INFLATABLE SOLE LINING FOR SHOES AND BOOTS

RELATIONSHIP TO OTHER APPLICATIONS

This application is a continuation of my application, Ser. No. 636,603, filed on Dec. 31, 1990, now abandoned which is a continuation-in-part of my application, Ser. No. 539,978 filed on Jun. 18, 1990, now abandoned which is a continuation in part of Ser. No. 427,515, filed on Oct. 27, 1989, now U.S. Pat. No. 5,025,575 which is a continuation-in-part of my prior application, Ser. No. 323,340, filed on Mar. 14, 1989, now U.S. Pat. No. 4,991,317, which is a continuation-in-part of my prior application, Ser. No. 262,749, filed on Oct. 28, 1988, now abandoned which is a continuation-in-part of my prior applications Ser. No. 230,908, filed on Aug. 11, 1988, now U.S. Pat. No. 4,941,271, and Ser. No. 177,410, filed Apr. 4, 1988, now U.S. Pat. No. 4,845,338, and Ser. No. 93,579, filed Sep. 4, 1987, now U.S. Pat. No. 4,823,482, and Ser. No. 54,189, filed May 26, 1987, now U.S. Pat. No. 4,782,602.

BACKGROUND OF THE INVENTION

1. Field of the Invention

This invention relates to an inflatable lining for shoes, boots and the like, and in particular, relates to an inflatable lining having a pump to pressurize the lining and to induce air circulation through the shoe, and with independent compartments within the lining which are provided with pressure control valves to control the pressure and, hence, the firmness, shock absorbency, stability, resiliency and comfort of each compartment of the lining.

2. Brief Statement of the Prior Art

Inner soles have been provided for shoes and boots which are formed of a compressible, elastic material such as cellular plastic foams, foam rubber, etc. These inner soles have provided only limited shock absorbency, resulting in little or no significant improvement in wearer comfort.

Some prior investigators have provided inner soles with inflated cushions at either the toe and heel areas, and some have provide cushions at both areas with circulation between the two cushions. The cushions have been provided with mechanisms to circulate air and ventilate the shoe or boot during walking activities. Examples of these are: U.K. Patents 2,189,679 and 357,391; U.S. Pat. Nos. 3,180,039, 2,716,293, 1,213,941 and German Patent 3,144,207.

In some foot apparel, notably in ski boots, an outer shell is molded from plastic and is lined with an inner shoe. Adjustment has been made to the tightness of the outer shell and air bags have been provided across the instep region of the shoe, and elsewhere, and have been provided with an air pump to pressure the air bags, creating pressure about the foot and snugness of the fit of the ski boot. U.S. Pat. No. 4,730,403 and German Patent 2,321,817 are representative of these ski boots.

A water-filled inner sole for shoes has recently been marketed under the tradename "Walk On Water". While this is an attempt to increase wearer comfort, water is heavy, non-compressible and the inner sole cannot be adjusted for firmness, and cannot provide shock absorbency. Additionally, water is unsuited for use in freezing climates. Also, a leak will wet the inside of the bootwear, and this inner is not breathable.

Another recently marketed innovation is that disclosed in U.S. Pat. Nos. 4,183,156; 4,340,626 and 4,817,304 in which an inflatable inner sole or sole insert is permanently inflated with halogenated hydrocarbon gases. Since it is impossible to preclude diffusion of gases through the plastic, the inflatable insert or inner sole is acknowledged to experience a rapid increase in pressure shortly after manufacture, followed by a slowly declining pressure, thus failing to provide a stable condition. The pressure of the inflatable member also can not be adjusted by the wearer for varying conditions of use and comfort.

None of the aforementioned prior devices provides a simple, inexpensive solution to comfortable wear and walking in a shoe or boot. The foam inner soles have only a limited value and limited shock absorbency. The remainder of the prior devices, including the pressurization system for ski boots are relatively complex and costly and are often too bulky and cumbersome. Consequently, these devices are not readily acceptable for everyday activities.

OBJECTIVES OF THE INVENTION

It is an objective of this invention to provide an inflatable lining for footwear with an integral air pump for pressurization.

It is also an objective of this invention to provide the aforementioned inflatable lining with a plurality of compartments which are provided with independent pressure control valves whereby the pressure, and hence softness of the lining of each compartment can be controlled.

It is a further objective of the invention to provide the aforementioned lining and air pump strategically located such that the normal walking activities will inflate and pressurize the inner sole, and if desired, induce forced air circulation through the footwear.

It is a further objective of this invention to provide the aforementioned inflatable lining with an inexpensive construction.

It is also a further objective of this invention to provide an inflatable lining which includes an inflatable inner sole.

It is an additional objective of this invention to provide an inflatable lining which is subdivided into separated sealed chambers, each of which is provided with a pressure control valve, and/or a separate air pump.

It is also an additional objection of this invention to provide an inflatable inner sole for footwear such as shoes, boots and sandals, having an arch pillow and a contour conforming to the wearer's foot, which preferably will massage the wearer's foot.

It is a further additional objective of this invention to provide air circulation channels and apertures in the aforementioned inner sole and/or upper lining whereby normal walking activities will force air circulation through the inner sole and footwear.

It is also a further additional objective of this invention to provide an inflatable inner sole with an integral air pump which can be operated manually.

It is another further additional objective of this invention to provide an inflatable lining for the sole, or uppers, or both, which can be inserted into footwear.

It is another objective of this invention to provide a liner for footwear such as a shoe or boot that provides an inflatable inner sole and an inflatable upper lining which also can be pressured with an air pump and which can provide forced air circulation through a boot.

It is another further objective of this invention to provide a liner for footwear such as a shoe or boot that provides an inflatable upper lining which is pressured with an air pump to a pressure controlled with a pressure relief valve.

It is still a further objective of this invention to provide a light weight, shock-absorbing resilient inner sole for footwear which enhances the stability and comfort of the footwear to the wearer.

It is yet another objective of this invention to provide footwear with an inflatable inner sole having an air pump which has an internal spring to facilitate its pumping action, and to enhance the shock absorbency of the footwear.

It is still another objective of this invention to provide the aforementioned air pump with an internal spring which can be replaced to provide adjustable spring force to accomodate varied weights of wearers and special activities.

Other and related objectives will be apparent from the following description of the invention.

BRIEF DESCRIPTION OF THE INVENTION

This invention comprises an inflatable lining for selected inner surfaces of footwear which is formed of first and second plastic sheets having the shape and size of the selected inner surface, such as the sole or upper sides or rear of the shoe. The lining can be an integral part of the footwear, or can be an insertable lining for footwear. The plastic sheets are bonded together in a continuous seam about their peripheral edges thereby forming a sealed interior chamber. A plurality of discontinuous seams are formed between the first and second sheets to create within the sealed interior chamber a plurality of interconnecting tubular passageways, and at least one continuous seam is provided which transverses the sealed interior chamber, forming two or more subdivided sealed interior chambers or compartments. The inflatable liner is provided with an air pump that preferably is contained within a preselected region of the liner, preferably directly beneath the heel when the liner includes an inner sole. For this purpose, an opening is formed in the plastic sheets to receive the air pump, and a continuous seam is provided, preferably in the form of a circular seam, about the opening. The air pump is a flexible resilient bulb with an inlet valve and has a discharge port opening into a flexible tube which extends, preferably, to a pressure relief valve and then to the interior chambers of the inflatable inner sole through a plurality of pressure relief valves which permit independent adjustment of the pressure within each interior chamber. The pressure relief valves are normally closed valves, which can be manually opened. In some applications, the relief valves automatically relieve pressure in their respective chambers, and most preferably, the valves are manually adjustable to permit variation of the relief pressures, thus providing a controlled adjustability of the pressures within each chamber of the inflatable liner. Excess air from the pressure control valve can be vented out of the shoe, but preferably is directed into channels formed between the inflatable liner and the inside surfaces of the shoe, where it discharges through sealed apertures in the liner and passes about the wearer's foot.

In other embodiments of the invention, the air pump can be provided at one side of the inflatable inner sole for manual, hand manipulation or the inner sole can be provided with one or more side flaps to line upper portions of footwear. In these embodiments a manual or hand pump can also be incorporated on the side flaps.

Preferably the seams are provided with a plurality of through perforations extending entirely through the first and second sheets to provide air and fluid communication through the liner.

BRIEF DESCRIPTION OF THE DRAWINGS

The invention will be described with reference to the figures of which:

FIG. 3 illustrates the pump and relief valve assembly which is used with the inflatable inner sole of FIG. 1;

FIG. 4 illustrates an alternative air pump and relief valve assembly for the use with the inflatable inner sole of FIG. 1;

FIGS. 6 and 7 are sectional elevational and plan views of the pump used in the inner sole of FIG. 1;

FIGS. 8 and 9 are sectional elevational and plan views of the alternative pump shown in FIG. 4;

FIGS. 10, 11 and 12 are views of the adjustable pressure control valve used in the invention;

FIGS. 79 and 80 illustrate a collar housing for the footwear of FIG. 73 which contains the connector/control valves of the inflatable liners;

FIGS. 81 through 83 illustrate alternative housings for the connector/control valves;

DESCRIPTION OF PREFERRED EMBODIMENTS

Figure 1:
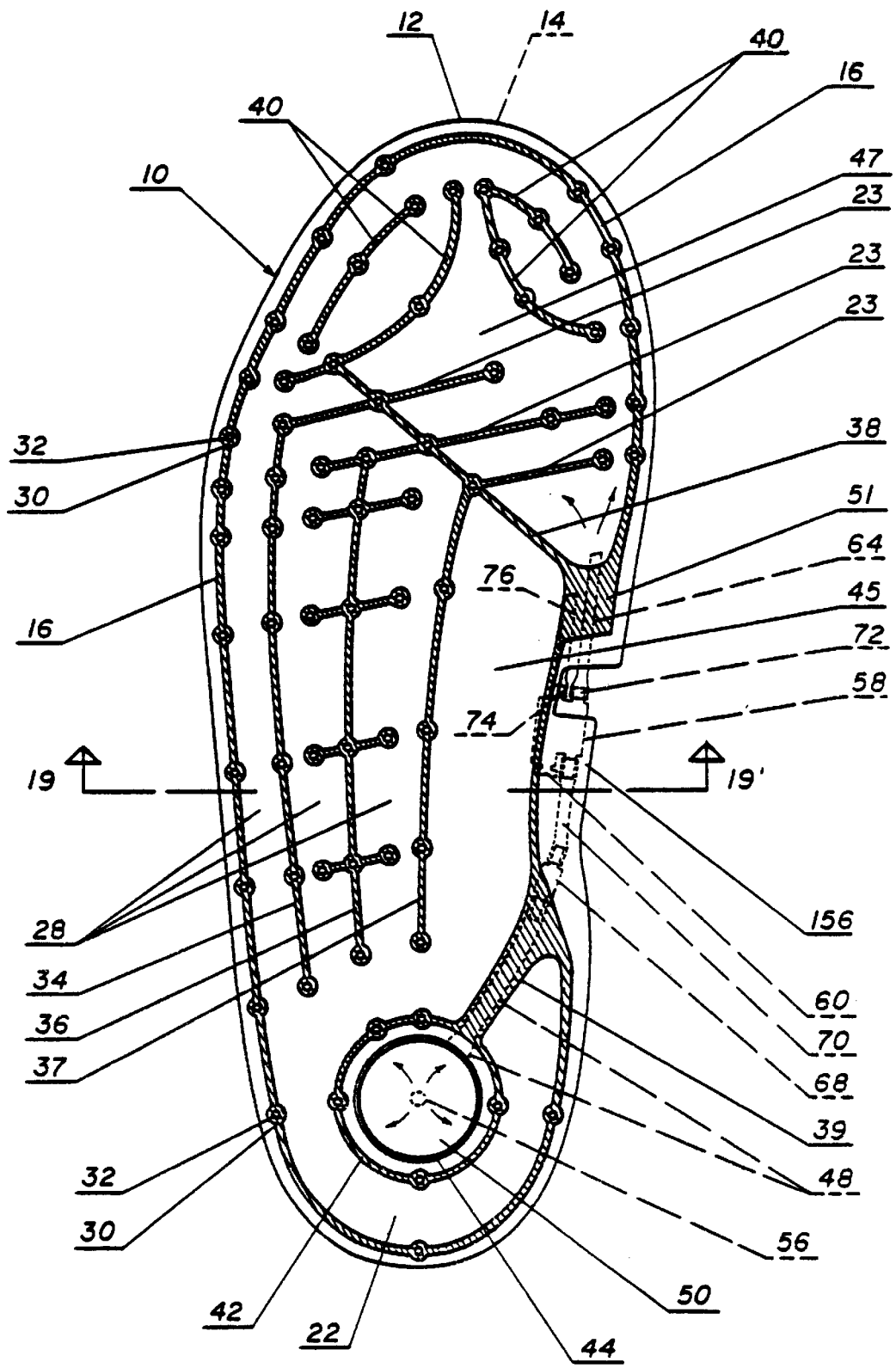
FIG. 1 is a plan view of an inflatable inner sole with a pump and adjustable relief valve.

Referring now to FIG. 1, the inflatable insole 10 of the invention is shown in plan view. The inner sole 10 is formed by a first sheet 12 and a coextensive second sheet 14 of substantially the same shape and size. The first and second sheets 12 and 14 are bonded together in a continuous peripheral seam 16 that extends about the toe, the lateral side of the inner sole 10, the heel and medially about the instep. The seams are shown in the figures as cross hatched areas. This is intended to show seamed areas only and not to represent sectional views.

The first and second sheets 12 and 14 are preferably plastic and most preferably are thermoplastic, so that conventional heat sealing can be used for forming the seams. The most preferred thermoplastic material is polyurethane, however, other suitable materials include ethylene, and ethylene vinyl acetate copolymers, polyethylene, polypropylene, polyvinyl chloride, etc. Natural or synthetic rubber can also be used.

The first sheet 12 and second sheet 14 are also bonded together with a plurality of discontinuous seams 34, 36 and 37 which form tubular, interconnecting passageways 28 through the inner sole 10. The spacing between adjacent seams controls the size (diameter) of the passageways 28. Also, unseamed expanses will form air pillows such as the arch pillow 45 and toe pillow 47. The size and space of the pillows can easily be varied during manufacture to adapt the inner sole to the particular shoe. Thus, if intended to fit conventional shoes with integral arch supports, the arch pillow can be reduced in size. It can also be enlarged for use with shoes having flat or near flat soles, to provide an arch support, the firmness of which can be regulated by adjustment of the air pressure within the inner sole.

Preferably, the seams have a plurality of through perforations or apertures 32 which extend entirely thorough the first and second sheets 12 and 14 and are entirely surrounded by a seamed area 30. For this purpose, the seams can be expanded to provide an annular seam area 30 that entirely surrounds each circular aperture 32 through the first and second plastic sheets. Each seam and seamed channels along the first and second sheets, described with reference to FIGS. 19–21, and the apertures 32 establish communication between the channels above and below the inner sole 10.

As illustrated, the instep is provided with several longitudinal discontinuous seams 34, 36 and 37 which extend to a generally transverse discontinuous seam 38 that subdivides the instep from the toe of the inner sole 10. The toe is also subdivided into tubular passageways by additional discontinuous seams such as 40. Seams 23 are provided transversely across the area between the toe and instep to improve the flexing of the inner sole 10 in this area. The spacing, size and number of these discontinuous seams can be varied greatly, as desired, to provide the maximum comfort and convenience to the wearer of a shoe fitted with the inflatable inner sole.

At the heel of the inflatable inner sole 10, a continuous loop seam 42 is provided, preferably as a circle surrounding a circular aperture 44 which extends through the first and second plastic sheets. The circular aperture 44 receives the air pump 50 of the invention. The air pump 50 has an inlet port along its bottom surface with a flapper valve 56 (described in greater deal hereinafter) and is functional to discharge air through an integral flexible tube 48 toward pressure control valve 58. The flexible tube 48 is placed beneath a wide seam 39, lying in the channel formed on the undersurface of the inner sole 10 by seam 39. Check valve 68 is also connected between tube 48 and flexible tube 70 which is connected to the pressure control valve 58.

The pressure control valve 58, also described in greater detail hereinafter, has a manual adjustment knob 60 for the controlled fixed adjustability of the pressure within the inflatable inner sole 10. The pressure control valve 58 has a discharge port 72 which is connected to a flexible tube 64 that extends through the continuous peripheral seam 16 and discharges directly into the sealed interior chamber between the first and second plastic sheets, preferably into the toe of the inflatable inner sole.

Figure 2:
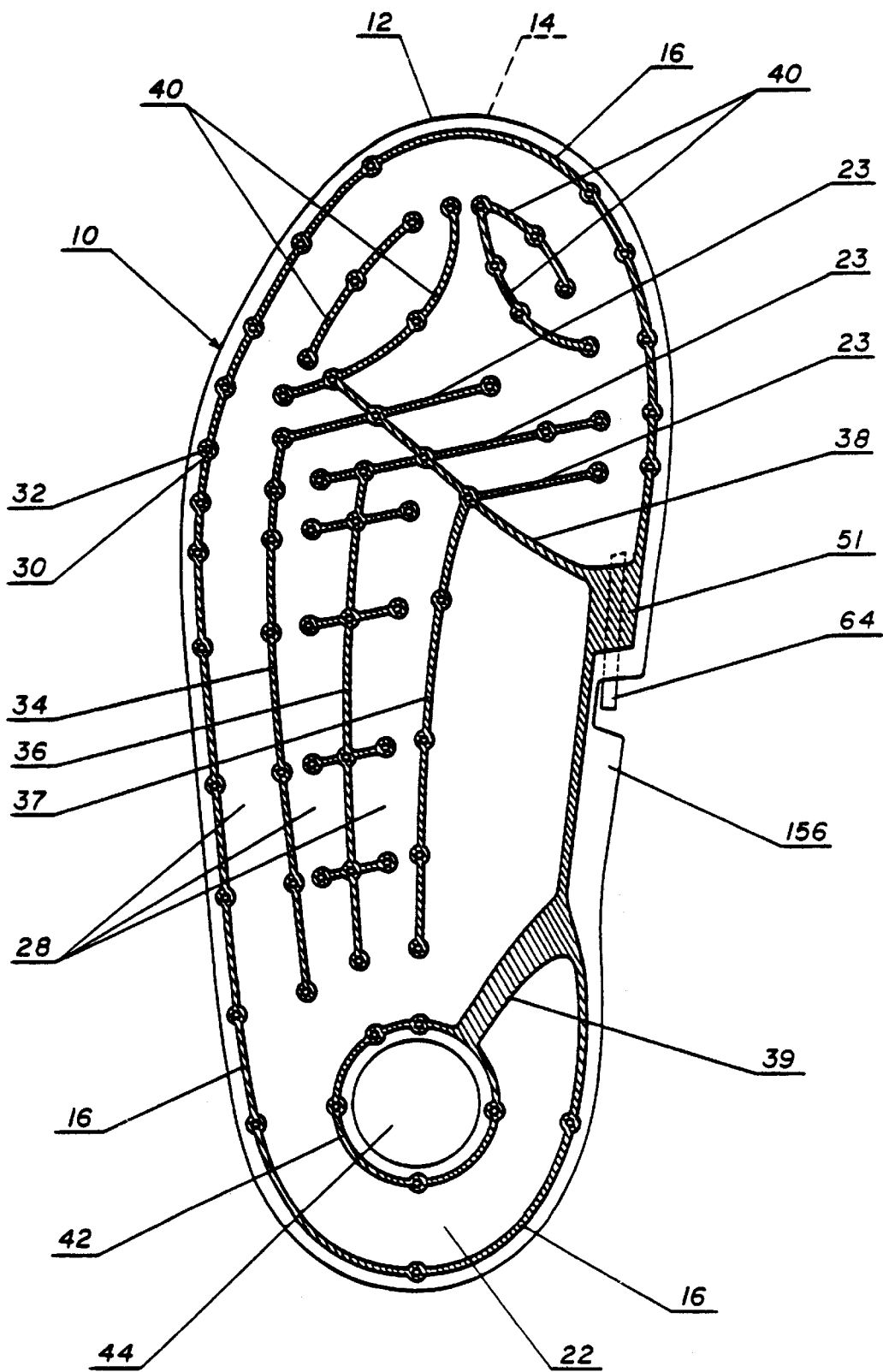
FIG. 2 is a view of the inner sole of FIG. 1 without the air pump and pressure relief valve.

Referring now to FIG. 2, there is illustrated a plan view of the inflatable inner sole 10 without the pressure relief valve and the air pump. As there illustrated, the flexible tube 64 which communicates through the peripheral seam 16 is permanently positioned in the inflatable liner.

Referring to FIG. 3, there is illustrated a plan view of the air pump 50 and pressure control valve 58 used in the inflatable inner sole shown in FIG. 1. As there illustrated, the air pump 50 comprises a generally flat, flexible, resilient bulb 66 that has an internal flapper valve 56 that seals an inlet port, aperture 52, in its bottom wall. The air pump is integrally connected to a flexible tube 48 that discharges through a check valve 68 and into a short flexible tube 70 which is connected to the pressure relief valve 58. The pressure relief valve 58 has two discharge ports 72 and 74. Discharge port 72 is in direct communication to the flexible tube 64 that discharges into the toe of the inflatable liner 10, while discharge port 74 is connected to a short flexible tube 76 that discharges externally of the inflatable liner 10. As shown in FIG. 1, tube 76 is preferably placed beneath a wide seamed area 51, lying within the channel formed in the undersurface of the inner sole 10, thereby directing the excess air through these channels where it will flow upwardly through the apertures 32 of the inner sole 10. This establishes a forced air circulation in the shoe. Alternatively, the excess air could be vented to the outside of the shoe. Access to the second port 74 is controlled by the internal pressure regulation of the valve 58 which is fixedly adjustable by the adjustment knob 60.

FIG. 4 illustrates an alternative embodiment of an air pump 57 used in the invention. In the embodiment shown in FIG. 4, the flapper valve and inlet port in the bottom surface of the bulb has been removed and an inlet port 78 is provided in a Y-branch 80 of flexible tubing which is connected to a check valve 82 to serve as a fresh air inlet to the system. The remainder of the structure is substantially as described with reference to FIG. 3.

Figure 5:
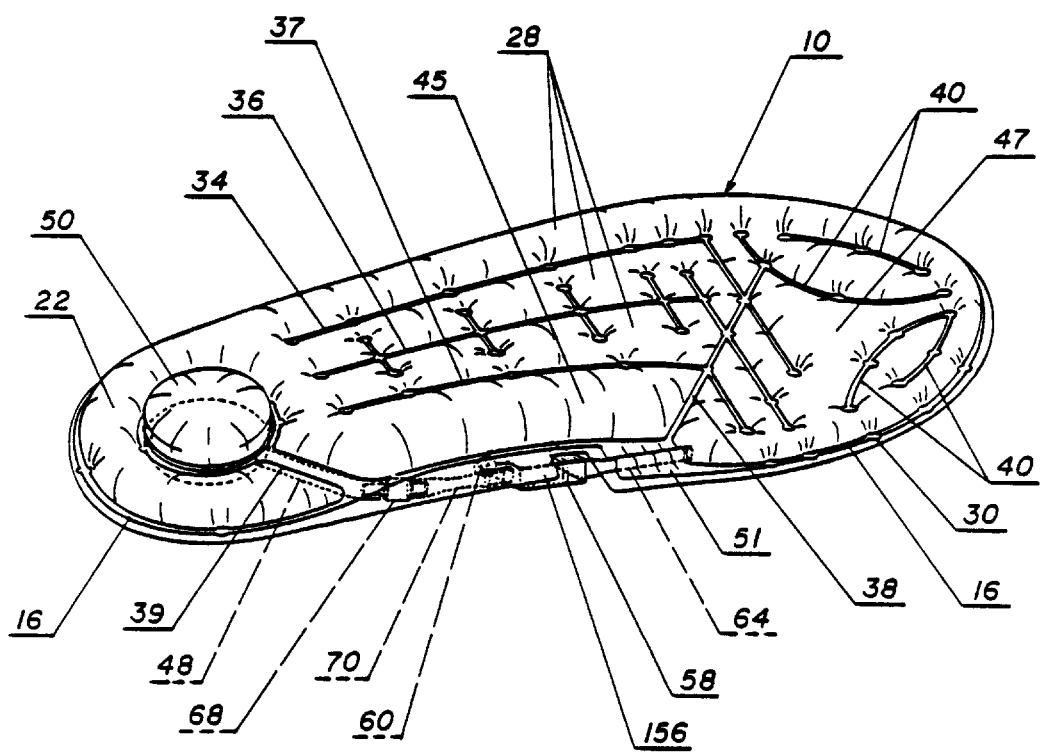
FIG. 5 is a perspective view of the inflatable inner sole of FIG. 1.

The inflatable inner sole 10 of FIG. 1 is shown in perspective view in FIG. 5. The circular aperture 44 at the heel which houses the air pump 50, and the tubular passageways which are formed between the discontinuous seams of the inner sole are apparent in this illustration. Also, the size and position of the pressure control valve 58 and adjustment knob 60 can be seen in the illustration.

Referring now to FIGS. 6 and 7, the structure of the air pump 50 shown in FIG. 1 will be described in greater detail. FIG. 6 is a sectional view through the air pump 50 and illustrates that the air pump 50 is provided with a plurality of protrusions 84 on the undersurface of its bottom wall to permit free air passage beneath its undersurface. The bottom wall of the air pump is perforated with a single aperture 52 to provide an inlet port to the interior of the air pump and a single flap 86 of flexible plastic extends over this aperture and is hinged at one side edge thereof to function as a flapper valve 56.

Referring now to FIGS. 8 and 9, the alternative air pump 57 which is shown in FIG. 4 has no protrusions on its bottom wall and does not have the aperture 52 in its bottom wall and the flapper valve 56, as these functions are supplied by the externally mounted check valve 82, previously described with reference to FIG. 4.

FIGS. 10 through 12 illustrate the pressure control valve 58. The pressure control valve 58 has a housing 90 with a single through longitudinal passage 92 that is intersected by a lateral passage 94 which communicates with a pressure valve. The pressure valve has a ball 98 as its valve member that is seated against a valve seat 100 of the lateral passage 94. The ball 98 is resiliently biased to a normally closed position by a coil spring 102 that has a spring stop 103 on the end of a threadable plug 104 that is received in an internally threaded bore 106 that opens into the lateral passage 94. By threadable adjustment of the plug 104, the tension of the spring 102 which compression the ball 98 against the valve seat 100 can be fixedly adjusted, thereby controlling the degree of pressure required to lift the ball off the valve seat. The internally threaded bore has a discharge passage 108 that communicates upstream of the pressure valve and that discharges through a discharge port 74 into the flexible tube 76.

Figure 13:
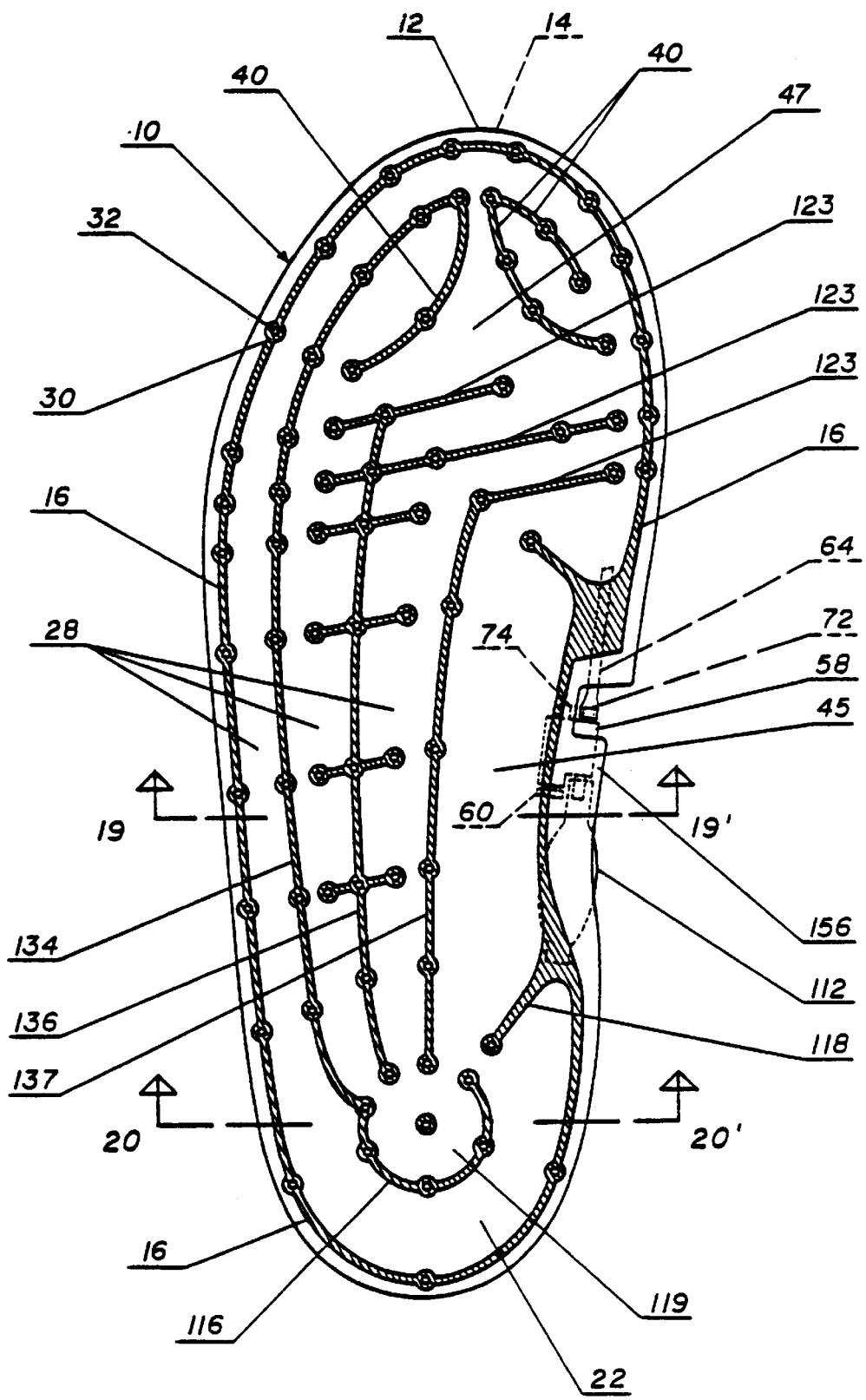
FIG. 13 is a plan view of an alternative inflatable inner sole with a hand pump and pressure relief valve.
Figure 14:
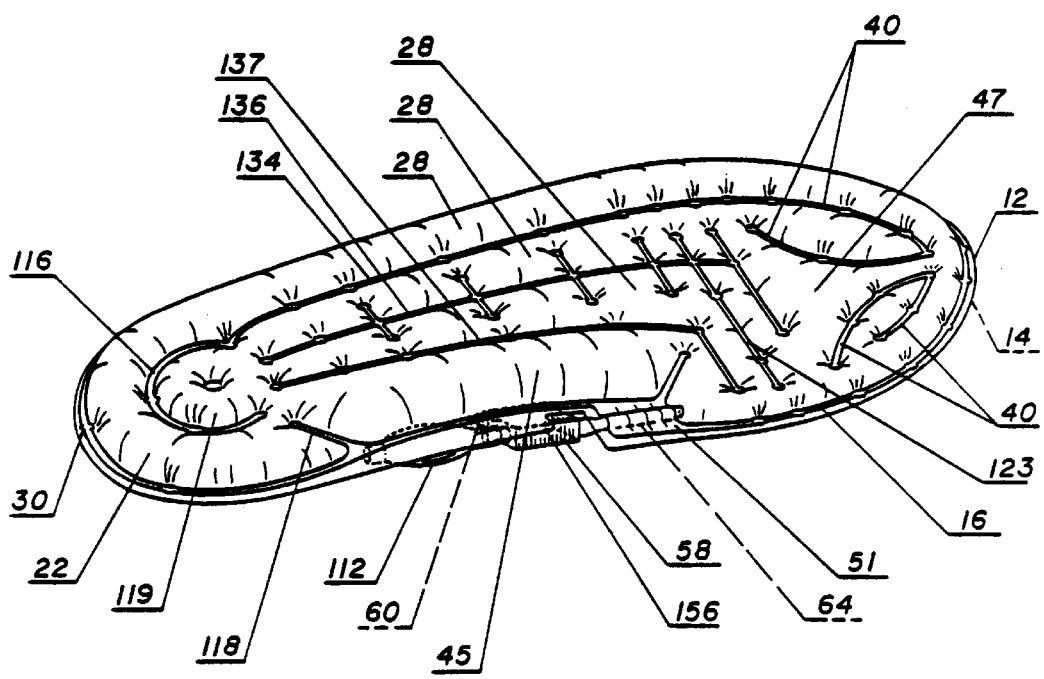
FIG. 14 is a perspective view of the inner sole, hand pump and pressure relief valve shown in FIG. 13.
Figure 20:
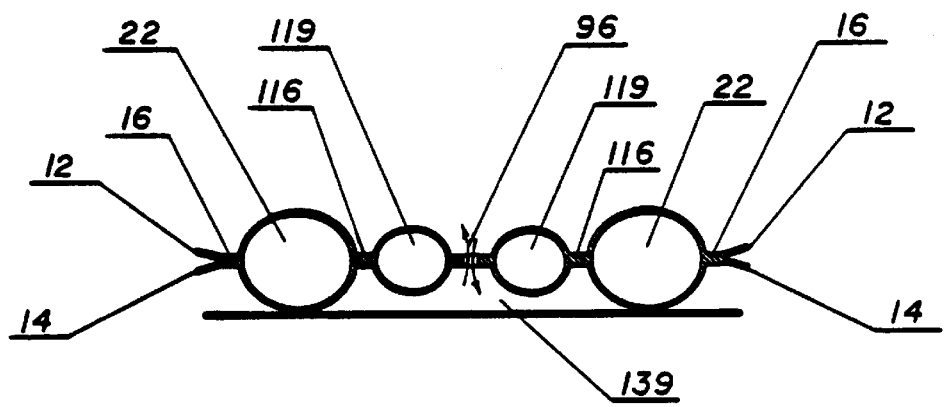
FIG. 20 is a sectional view along line 20—20' of FIGS. 13, 22 and 29.

Referring now to FIGS. 13 and 14, an alternative embodiment of the inflatable inner sole is shown in plan view. This embodiment is shown in perspective view in FIG. 14. The first sheet 12 and the second sheet 14 are bonded together with a continuous peripheral seam 16 extending entirely about these two sheets and forming a sealed interior chamber. A flexible tube 64 is molded in the seam. The flexible tube 64 is connected to a pressure regulation valve 58 and to a manually operated air pump 112. These elements are shown in greater detail in FIGS. 15–18. The air pump 112 is positioned medially of the inner sole 10 in a position where it can be manipulated by hand to permit pressurization of the inflatable inner sole. At this location, the hand pump doesn't contact or abrade the wearer's foot. As with the previous embodiment, the inflatable inner sole shown in FIG. 13 has a plurality of discontinuous seams 134, 136 and 137 that are spaced at preselected locations across its surface. Preferably a first seam 134 extends from the toe, laterally to the heel. At the heel, a semi-circular seam 116 is provided with a medially extending discontinuous seam 118 which extends to the peripheral seam 16, and two additional longitudinal seams 136 and 137 extend from the heel across the instep to the toe of the inner sole. A plurality of transverse seams such as 123 are provided to provide for laterally extending tubular passageways between the first and second sheets. These transverse seams 123 impart a flexing capability to the inner sole 10. An arch pillow 45 and a toe pillow 47 are also provided. Referring to FIG. 20, the enclosed space 139 which lies beneath the seam 116 and tubular passage 119 will collapse when the wearer's weight is placed on the area about seam 116 and will flex into the illustrated configuration when the wearer's weight is removed. The result is that the enclosed space 139 continuously varies in volume during walking, and thus functions as an air blower to induce flow of air down the channels beneath the insole and through the apertures 32.

Figure 15:
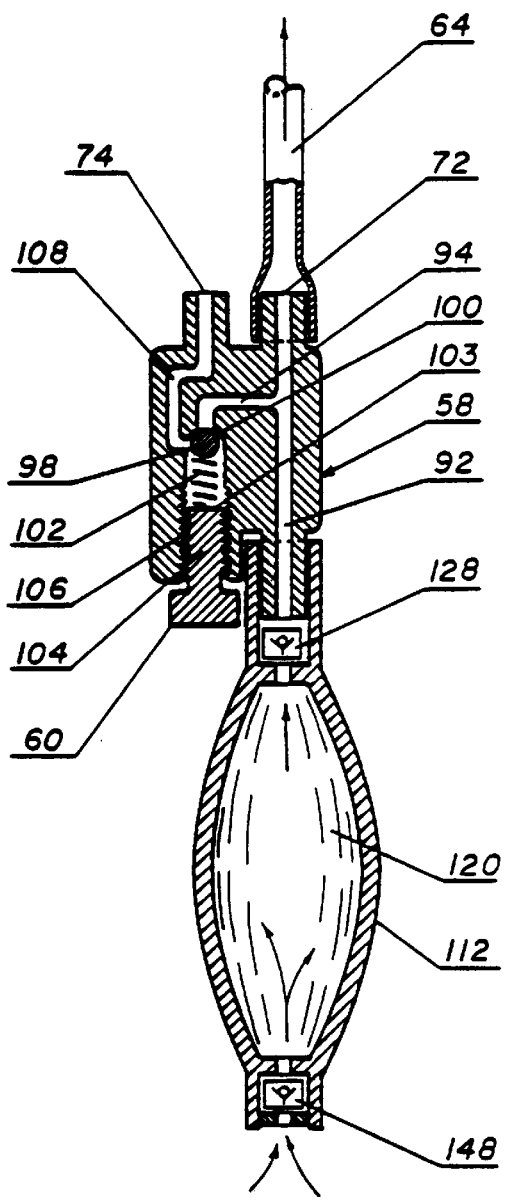
FIG. 15 is a sectional plan view of the air pump used in the embodiment shown in FIG. 13.

Referring now to FIGS. 15 through 18, the subassembly of the pressure regulation valve 58 and air pump 112 will be described. As shown in FIG. 15, the pressure regulation valve 58 is substantially the same as previously described with reference to FIGS. 10–12. The air pump 112, however, is a generally ovaloid, flexible and resilient bulb 120 which is placed laterally against the inside ankle of the wearer of the shoe. At its opposite ends, the air pump 112 is provided with check valves which can be of varied design and configuration.

Figure 16:
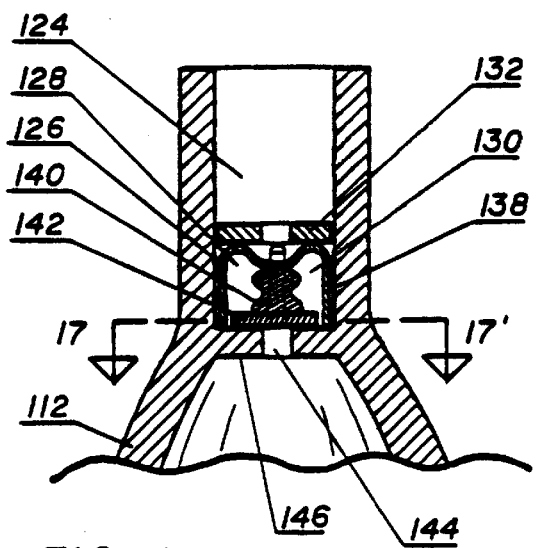
FIGS. 16 and 18 are sectional elevational views of the check valve of he pump of FIG. 15.
Figure 17:
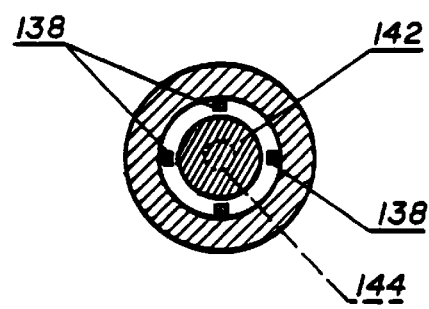
FIG. 17 a view along line 17—17' of FIG. 16.

FIG. 16 illustrates a suitable discharge check valve 128 which has a valve chamber 130 formed by a washer 132 placed across the discharge passageway 124 of the air pump 112. A support spider 126 with vertical legs 138 is placed within the chamber 130 and supports at its center a valve member formed by resilient plug 140 and a flat disc 142 that seats against a port 144 in the bottom wall 146 of the valve chamber 130.

Figure 18:
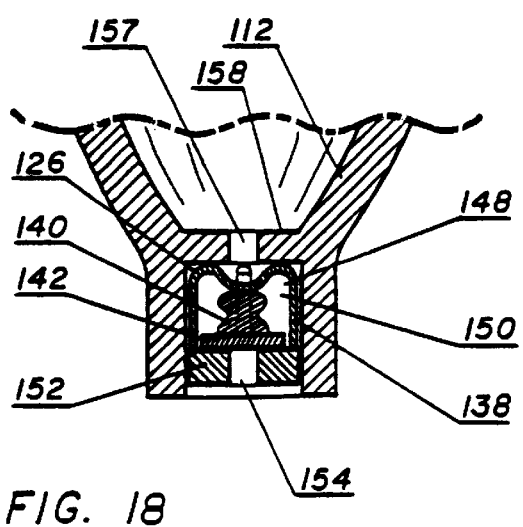

Referring now to FIG. 18, substantially the same valve configuration is used to provide an inlet check valve 148 of the air pump 112. The air pump 112 has an inlet valve chamber 150 with an annular disc 152 which extends across the chamber 150. This disc is fixedly secured within the chamber. A spider member 126 with support legs 138 is provided within the chamber and positions from its center a resilient valve plug 140 with a disc 142 that seats against a port 154 in the annular disc 152 and functions as the valve member of the inlet valve. The bottom wall 158 of the flexible resilient bulb 120 has a port 157 which communicates with the valve chamber 150.

Figure 19:
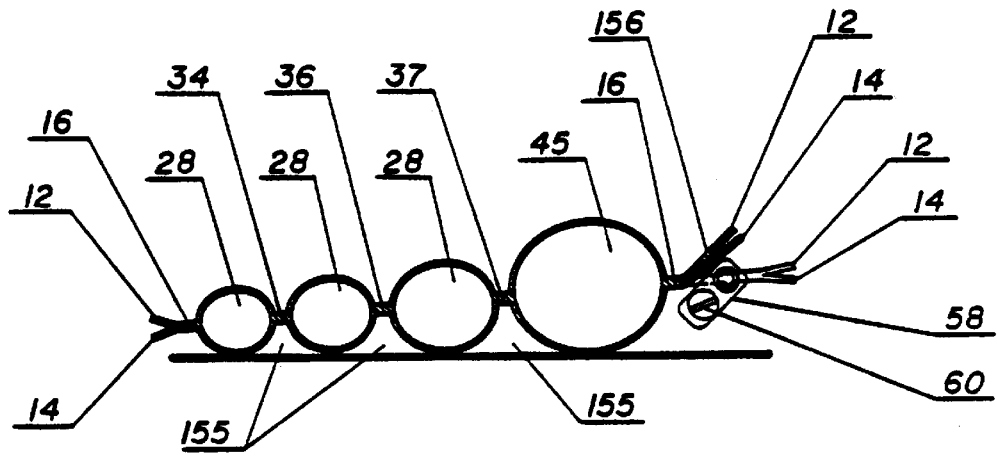
FIG. 19 is a sectional view along line 19—19' of FIGS. 1 and 13.

As previously mentioned, the various seams between the first and second plastic sheet form tubular passageways when the inner sole is inflated. FIG. 19 is a sectional view along line 19—19' of FIGS. 1 and 13, and illustrates the inflated shape or contour of the inner sole. As there illustrated, the peripheral seam 16 secures the upper sheet 12 and second sheet 14 together while the discontinuous inner seams 34, 36 and 37 form generally tubular passageways 28 and arch pillow 45. As there illustrated, the first sheet 12 and second sheet 14 are also shown beyond peripheral seam 16. Also, they could be cut flush with peripheral seam 16, except at the area which forms flap 156. Seam 16 can be made sufficiently wide to provide a seaming or bonding area to secure the inner sole to the footwear.

FIG. 19 also shows that the pressure control valve 58 in the assembly is located beneath an upwardly folded flap 156 of the first and second plastic sheets, thereby avoiding any rubbing contact between the valve 58 and the wearer's foot. Also, the valve could be increased by a soft fabric or sponge layer (not shown). Also, as previously mentioned, the seams form coextensive channels 155 which are indented into the undersurface of the inner sole 10. These channels 155 interconnect in a communicating network on the pattern of the seams shown in FIGS. 1 or 13. This network forms a distributor for forced air circulation in a shoe fitted with the inner sole 10.

Figure 22:
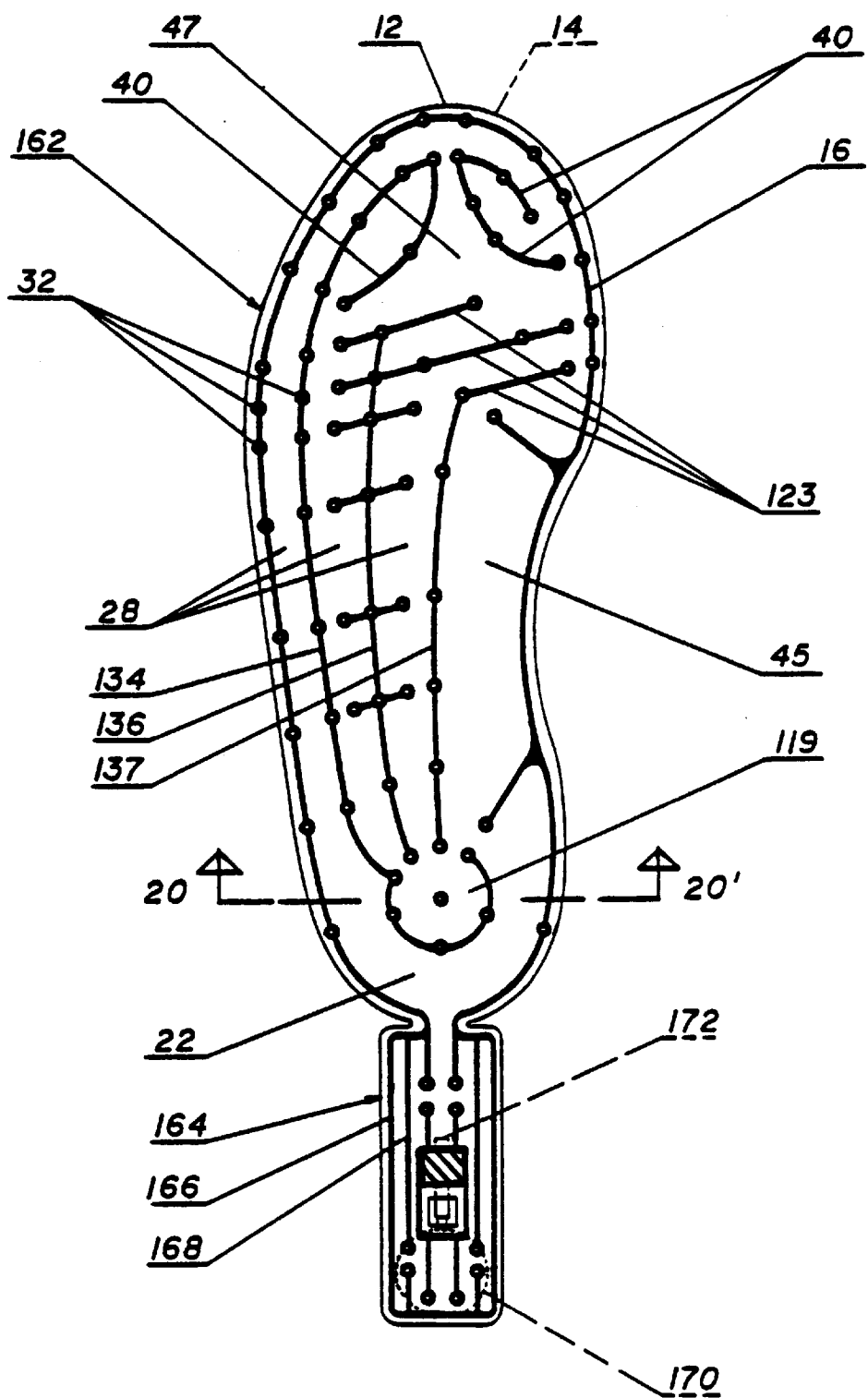
FIG. 22 is a plan view of an alternative inflatable inner sole having an inflatable side flap at its heel.
Figure 29:
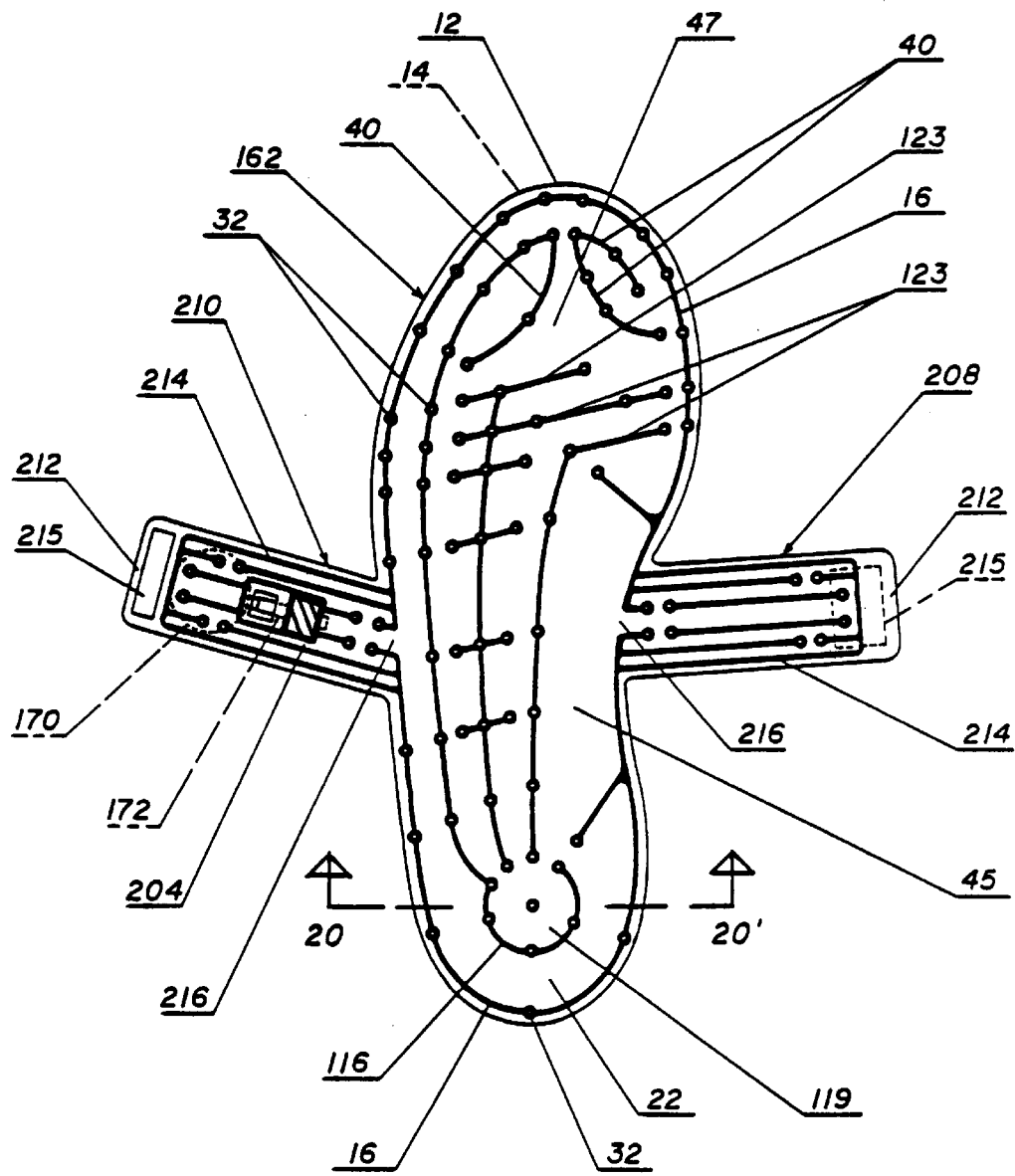
FIG. 29 is a plan view of an alternative inflatable inner sole with medial and lateral inflatable flaps which fold over the instep of the shoe.

FIG. 20 is a sectional view along line 20—20' of FIGS. 13, 22 and 29. As there illustrated, the semi-circular seam 116 forms annular tubular passageways 119 and 22 of substantial dimensions at the heel. As previously mentioned, apertures 32 are provided through the seams between the first and second sheets at various locations and air and/or moisture passes through the apertures as shown by the arrowhead lines 96.

Figure 21:
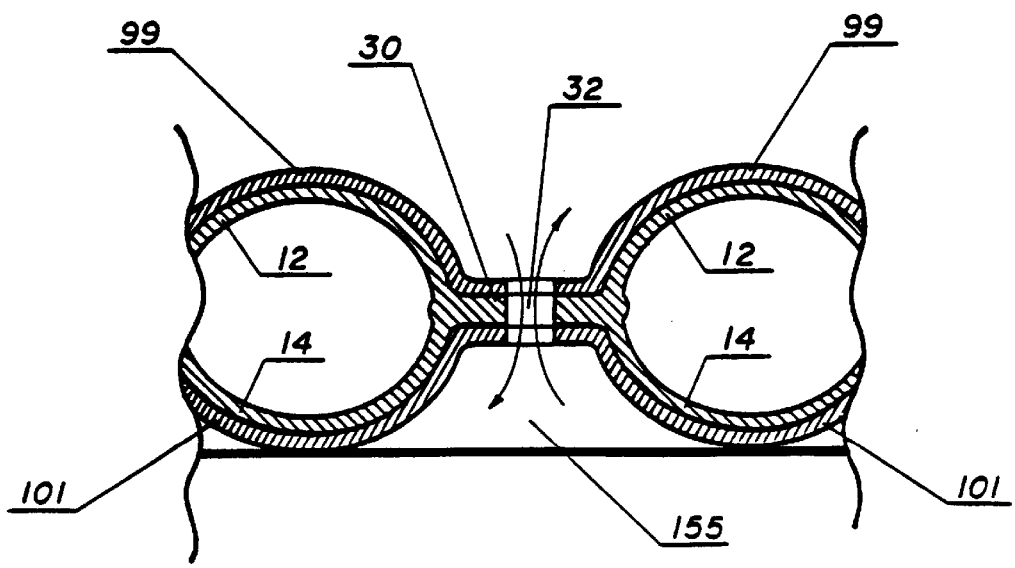
FIG. 21 is an enlarged sectional view through an aperture of an alternative embodiment having a lining about the inner sole.

FIG. 21 is a sectional view through a typical aperture 32. The seam between the first sheet 12 and second sheet 14 welds these sheets into a homogeneous band. In a preferred embodiment, the sheets 12 and 14 can be covered by outer layers 99 and 101 of fabric, plastic foam, etc., to enhance the comfort of the inner sole 10. Also, if desired, the outer layer 101 can be an insulation layer, e.g., a reflective insulating film such as a film of polypropylene between aluminum foil sheets specially for boot liner FIG. 30 to keep heat inside the liner.

Referring now to FIG. 22, there is illustrated an inflatable inner sole 162 which has substantially the same construction as that previously described with reference to FIG. 13, however, this inflatable inner sole also has a side flap 164 at its heel. The flap 164 is folded flat and shown in plan view. As there illustrated, both the first and second plastic sheets are provided with rearwardly extending generally rectangular shaped flaps that are sealed together with a peripheral continuous seam 166 that is preferably continuous with the peripheral seam 16 about the inner sole. Additionally, a plurality of longitudinal seams 168 are provided within the side flap 164 to provide a plurality of internal passageways therein. These seams are closely spaced to provide thin or narrow passageways so that the thickness of the inflated flap will not be excessive. The side flap 164 also supports the air pump 170 generally indicated by the broken lines which discharges through a flexible tube 172. Tube 172 is permanently secured in flap 164.

Figure 24:
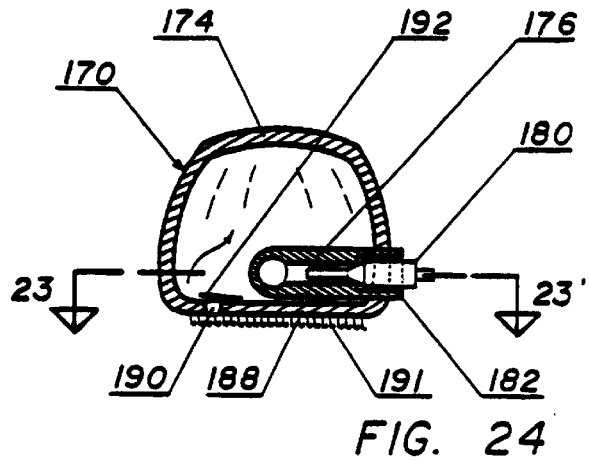
FIG. 24 is a sectional elevational view along line 24—24' of FIG. 23.
Figure 25:
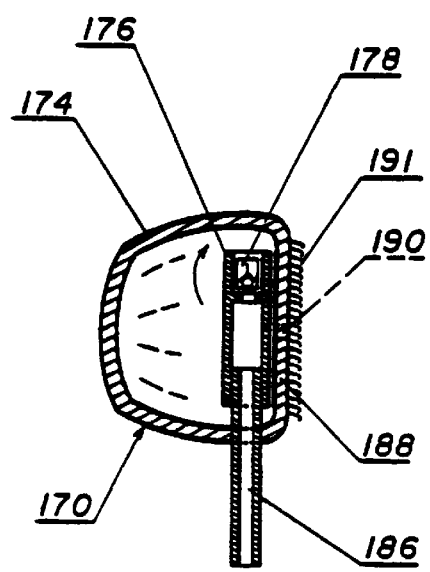
FIG. 25 is a sectional elevational view along line 25—25' of FIG. 23.
Figure 23:
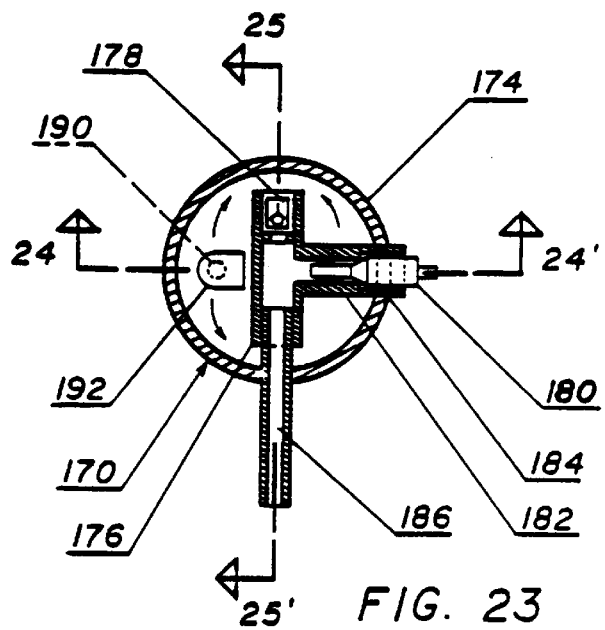
FIG. 23 is a sectional plan view along line 23—23' of FIG. 24, showing the hand pump used in the alternative inflatable inner sole of FIGS. 22, 29 and 30.

The air pump 170 which is used in the embodiment of FIG. 22 is generally illustrated in sectional views in FIGS. 23 through 25. FIG. 23 is a plan view of the air pump and shows a generally circular flexible bulb 174 which has a tubular tee 176 internally received within the bulb 174. Tee 176 contains the discharge check valve 178 and the release valve 180 for the pump. The base leg 182 of the tee 176 extends through the sidewall 184 of the bulb 174 of the pump and receives a conventional pressure release valve 180 such as available commercially as a tire valve core part No. 7595, from Schrader Automotive, Inc. Nashville, Tenn. The other end of the tee 176 is internally contained in the bulb 170 and houses a small check valve 178 that is directed to prevent fluid flow into the bulb 170. This valve receives air from the bulb 170 and discharges the air into the tee 176 for passage through the flexible tube 172 to the inflatable inner sole. Preferably, a Velcro band 191 is attached to the undersurface of wall 188 to secure the pump to flap 164.

The third end of the tee 176 receives tube 186 which connects to flexible tube 172, previously described. The bottom wall 188 of the bulb 174 also has an inlet port in the form of an aperture 190 with a flapper valve 192 hinged along one side on its internal bottom surface to serve as the inlet valve.

Figure 26:
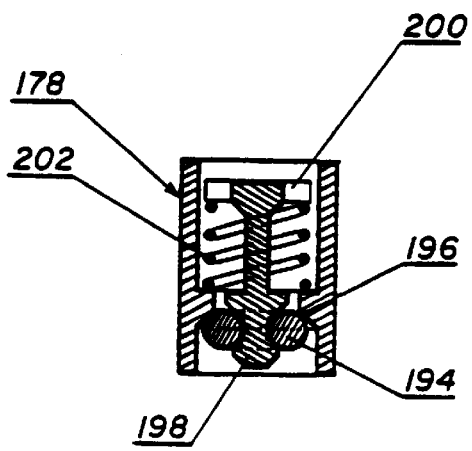
FIGS. 26 and 27 are sectional views through the check valves used in the pump of FIGS. 23-25.
Figure 27:
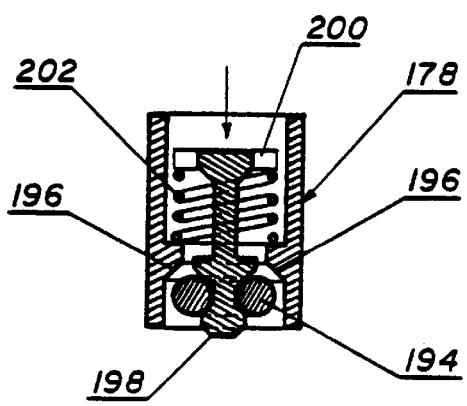

The check valve 178 used for the air pump are shown in FIGS. 26 and 27. In FIG. 26, the check valve 178 is shown in its closed position with the valve member in the form of an O-ring 194 being resiliently biased against the valve seat 196 by the valve stem 198 that is dependent at its upper end from a disc 200 that serves as a retainer to capture the compression coil spring 202 between the retainer and the bottom surface of the valve chamber. When the air is discharged into the tee 176, the air dislodges the valve member against the tension of resilient spring 202, permitting air to flow into the tee 176 and through the flexible tube 172 to the inflatable inner sole, as shown in FIG. 27.

Figure 28:
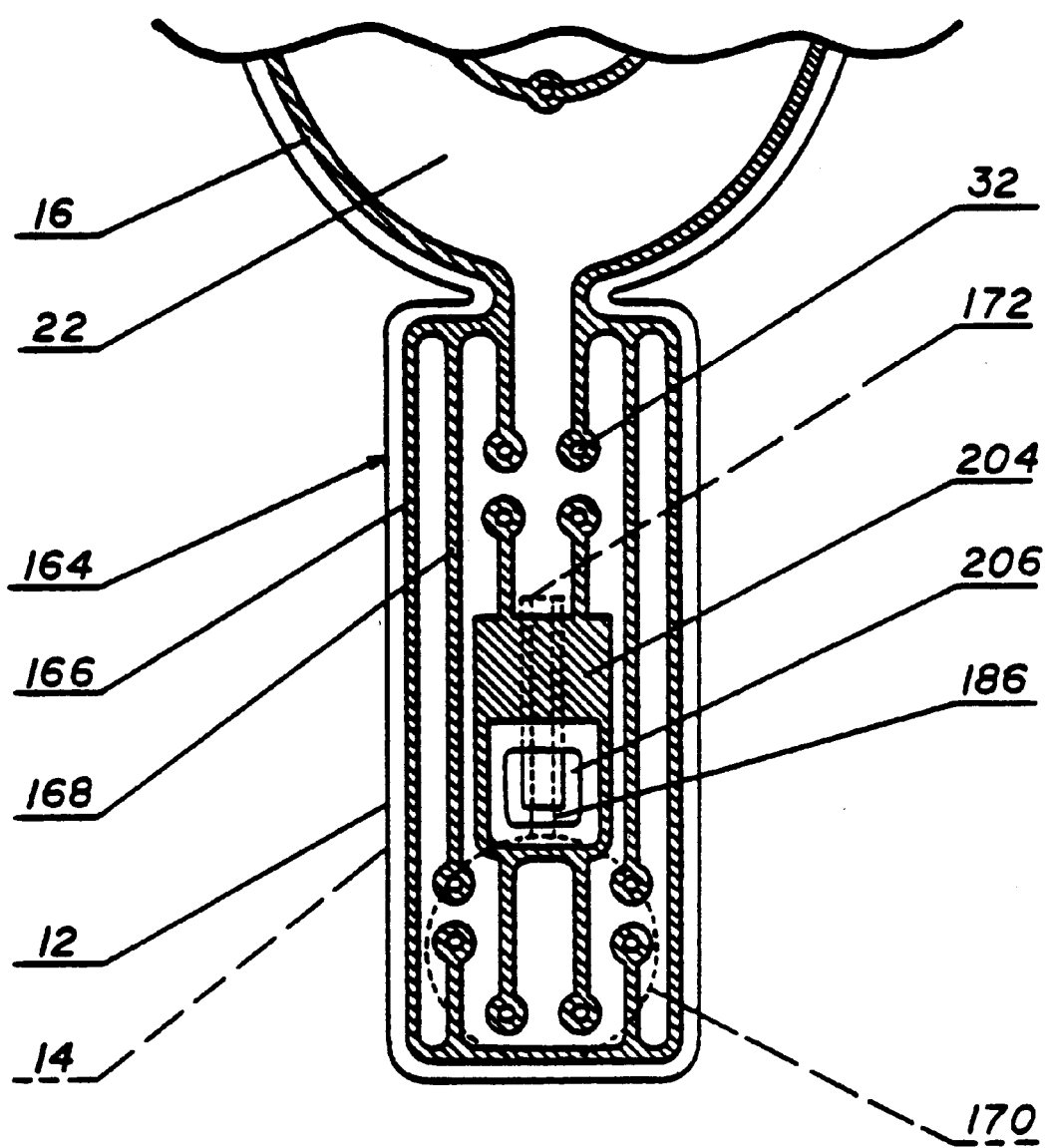
FIG. 28 is an enlarged plan view of the inflatable side flap located at the heel of the inflatable inner sole shown in FIG. 22.

Referring now to FIG. 28, there is illustrated an enlarged view of the side flap 164 of the inner sole. The flexible discharge tube 172 extends through a center seamed area 204 which is sufficiently large to provide security and support for the tube and the assembly of the air pump 170 shown in FIGS. 23 through 25. The air pump 170 is shown by the broken line. An opening 206 through flap 164 provides access to permit securing the pump 170 to the flexible tube 172. This mounting also biases the flexible resilient bulb of air pump 170 against the flap 164.

The inflatable inner sole 10, alternatively, be provided with one or more side flaps such as the medial side flap 208 and the lateral side flap 210 shown in FIG. 29. Preferably these side flaps are of sufficient length and are located at the instep to permit folding over the instep of a wearer's foot and these side flaps can be attached together, preferably by providing bands 212 which carry hook-fabric attachments 215 such as Velcro, at each of their ends so that they will be fastened together when folded over the wearer's foot. Each of the side flaps is provided with a peripheral seam 214 that forms a sealed interior chamber which communicates through an opening 216 in the peripheral seam 16 of the inflatable inner sole whereby the side flaps 208 and 210 are also inflated. The inner sole can be secured to the footwear by stitching or cementing seam 16 to the inside sole of the footwear and, where appropriate, to the inside of the uppers of the footwear.

One side flap, 210, carries the air pump 170 shown in broken line. The pump is previously described with reference to FIGS. 23 through 25. The pump discharges into a flexible tube 172 that is also secured within a central sealed area 204 between the first and second plastic sheets. Preferably, the air pump is located at the instep area of the shoe where the air pump will be readily accessible for hand operation. For this application, an opening can be provided on the upper part of the outer shoe.

Figure 30:
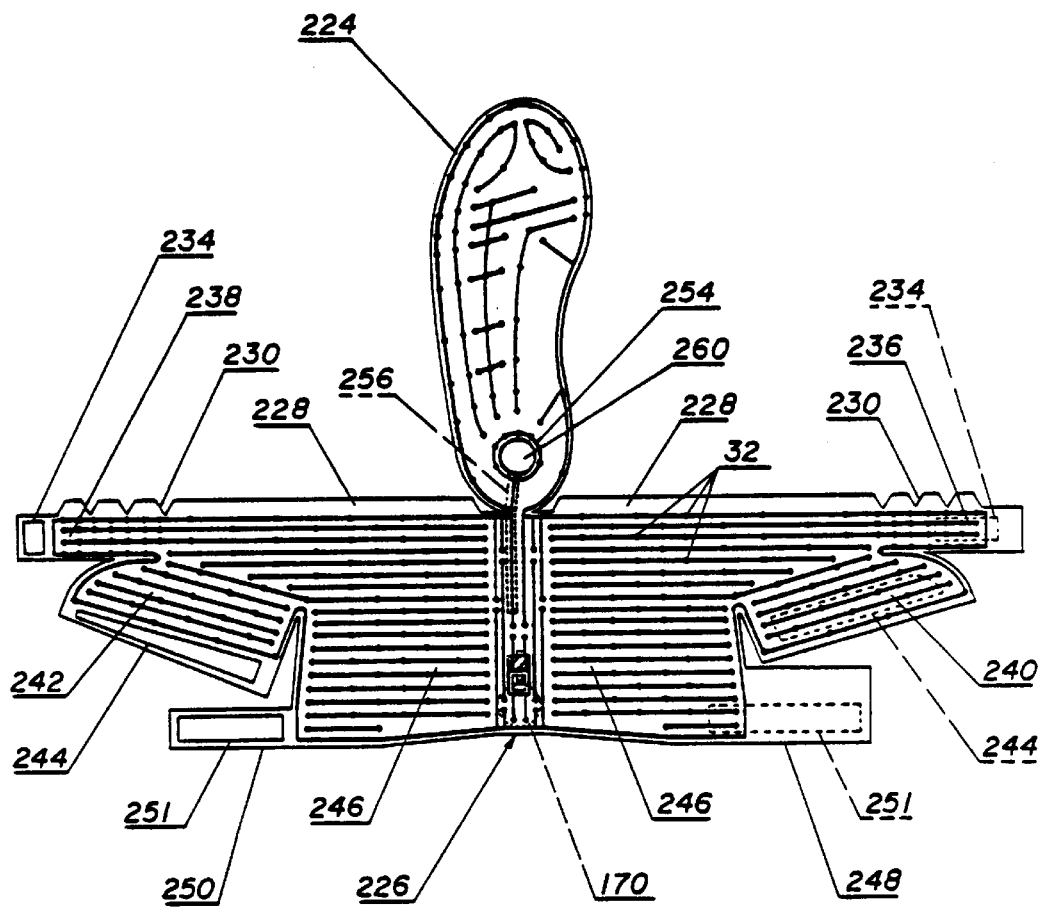
FIG. 30 is an inflatable boot liner which has an air pressurization and forced air circulation system.

Referring now to FIG. 30, there is illustrated an inflatable inner sole 224 which is integral with an inflatable liner for the entire upper region of a boot. The inner sole 224 is shown in a simplified view, it could include all the elements and features previously described. For this purpose, the inner sole 224 has, at the rear of its heel portion, an integral flap 226 that extends laterally and medially a sufficient distance to permit the flap 226, when folded vertically to extend entirely about the toe of the inner sole. Preferably this large flap forms a liner for the upper of the boot. The flap 226 has a coextensive tab 228 which can fold beneath the inner sole and also can be glued to the inner sole. As the tab must be formed about the curved toe, this co-extensive tab can have a plurality of V-shaped notches 230 to permit folding about this curved surface without forming creases. The vertical flap 226 is provided with a plurality of fabric attachment bands 234 such as Velcro to secure its opposite ends 236 and 238. Thus, a band of Velcro is provided at the medial end 236 of flap 226, and a co-acting Velcro band is placed on the opposite side of the flap 226 on its lateral end 238, thereby permitting the ends of the flap 226 to be secured together when wrapped about the toe of the inner sole. Preferably flaps 240 and 242 are provided at the medial and lateral sides of the instep to fit over the instep of the boot and each of these flaps also is provided with a co-extensive Velcro band 244 on its opposite sides whereby the flaps can be folded over the instep of the wearer and secured together with the bands of Velcro attachment fabric. The upper portion of the ankle area 246 of the flap 226 also preferably has medial and lateral extending tabs 248 and 250 which carry co-extensive Velcro bands 251, again on opposite sides to permit securing of these tabs about the ankle of the wearer.

An air pump 170 is provided in the flap 226 and this air pump is shown by the broken lines similar to that shown on FIGS. 23 through 25 and mounted similarly to the mountings shown in FIGS. 22 and 29. In addition, the heel of the inner sole preferably includes a continuous circular seam 254 to form an opening that will receive an air blower 260 which induces forced air circulation through the shoe. The air inlet to the blower is flexible tube 256 which extends along flap 226 and is shown in a broken line in FIG. 30.

Figure 31:
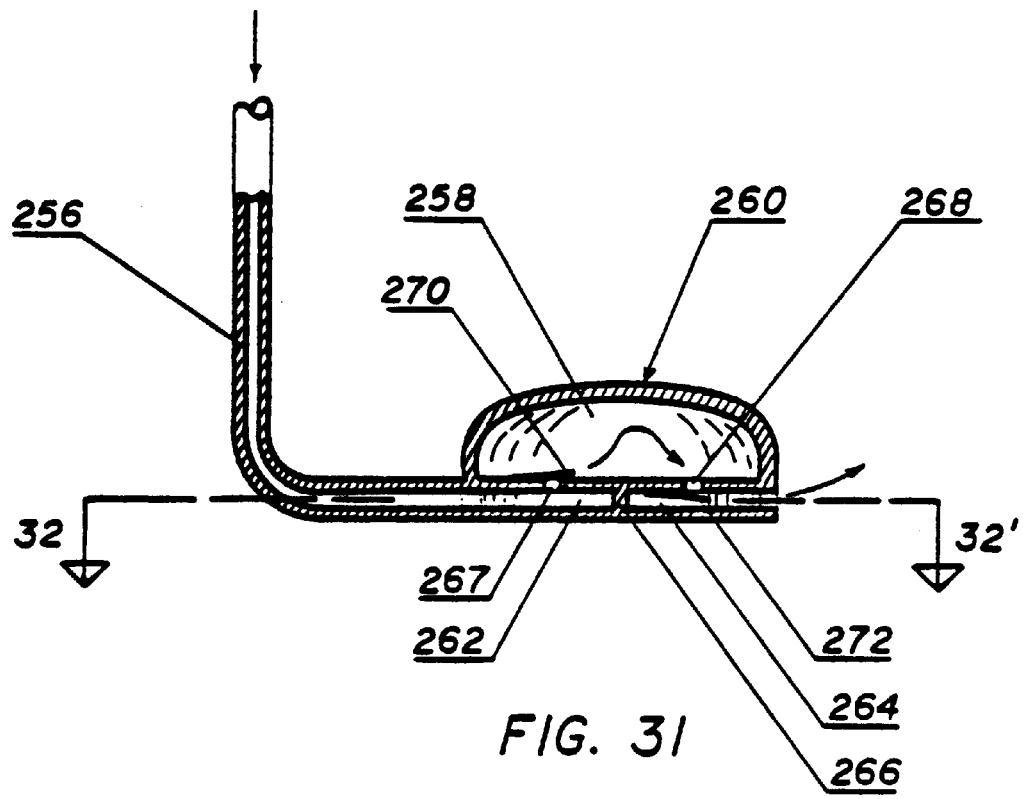
FIG. 31 is an enlarged sectional elevational view along line 31—31' of FIG. 32 showing a blower to circulate air in the boot liner of FIG. 30.
Figure 32:
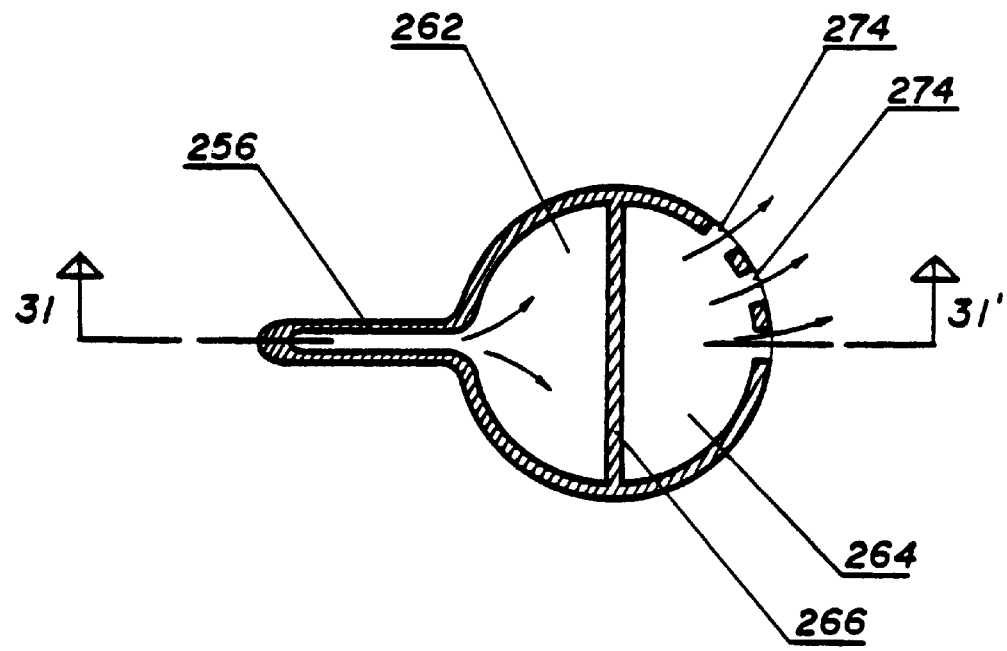
FIG. 32 is a sectional view along line 32—32' of FIG. 31.

The blower is shown in greater detail in FIGS. 31 and 32, and includes the aforementioned flexible tube 256 for the fresh air inlet that communicates with an inlet chamber 262, an upper chamber 258 within the flexible bulb 260 of the blower, and outlet chamber 264. Inlet chamber 262 and outlet chamber 264 are separated by a transverse wall 266. Apertures 267 and 268 are provided, one each in the top wall of each subjacent chamber 262 and 264, opening into the chamber 258 of the flexible and resilient bulb 260 of the air blower. A flap 270 of flexible plastic sheet material is mounted over the aperture 267 communicating with the inlet chamber 262 and is hinged to the bottom surface of the flexible bulb to thereby function as an inlet flapper check valve. A similar flap 272 of flexible sheet material is mounted on the undersurface of the bottom wall of the flexible bulb to function as a discharge flapper check valve.

As shown in FIG. 32, preferably a plurality of apertures 274 are provided about the periphery of the outlet chamber 264 to permit air to be discharged into the shoe, beneath the inner sole thereby serving to force air down the channels which are formed between the tubular passageways of the inflatable inner sole thereby permitting the air to be circulated through the plurality of through apertures of the inner sole thereby establishing forced air circulation through the shoe above and below the inner sole.

The inflatable inner sole shown in FIGS. 33–39 is substantially similar to that shown in FIG. 1, however, a greater number of seams 25 are provided, which decreases the diameters of the air channels 21 which are formed between the seams, thereby reducing the thickness of the inner sole. This is desirable to permit use of the inner sole with existing footwear, as it can be easily inserted or removed from existing footwear. This effect is apparent in the sectional view which appears as FIG. 34. In this embodiment, the peripheral channel 20 is slightly larger than the other channels 21 to provide greater stability and gripping.

Figure 35:
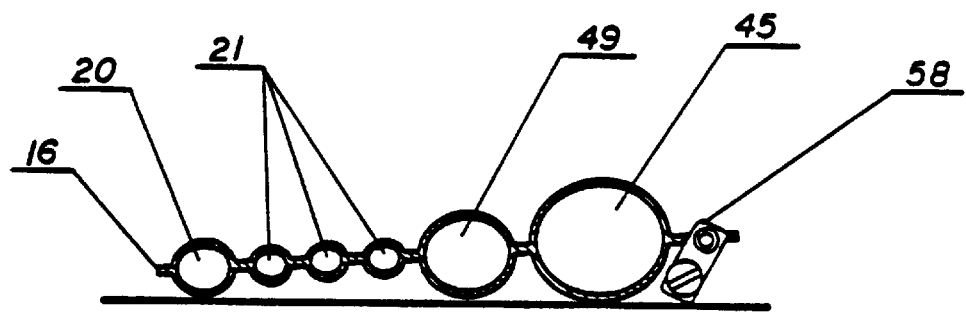
FIG. 35 is a sectional view along line 35—35' of FIG. 33.

Referring now to FIG. 35, the sectional view through the instep of the inner sole shows channels 45 and 49, which provide large pillows that give arch support to the wearer.

Figure 33:
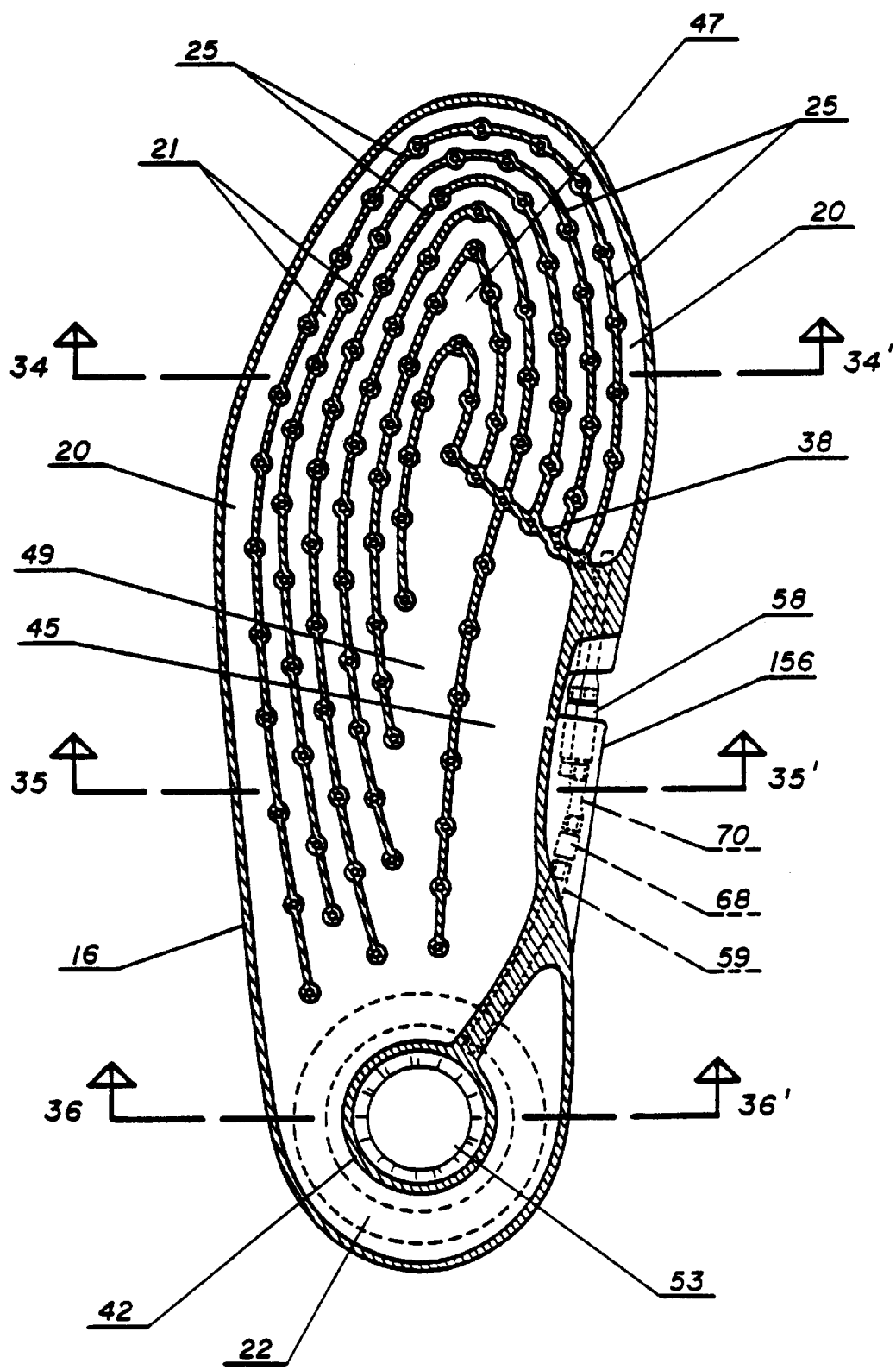
FIG. 33 is a plan view of an alternative inflatable inner sole.
Figure 34:
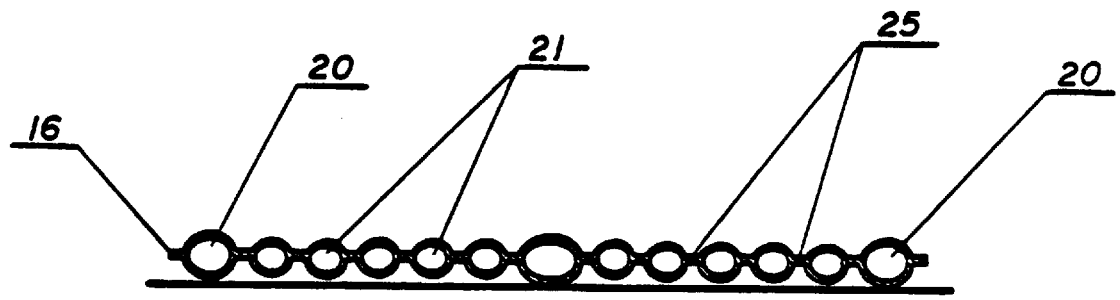
FIG. 34 is a sectional view along line 34—34' of FIG. 33.
Figure 36:
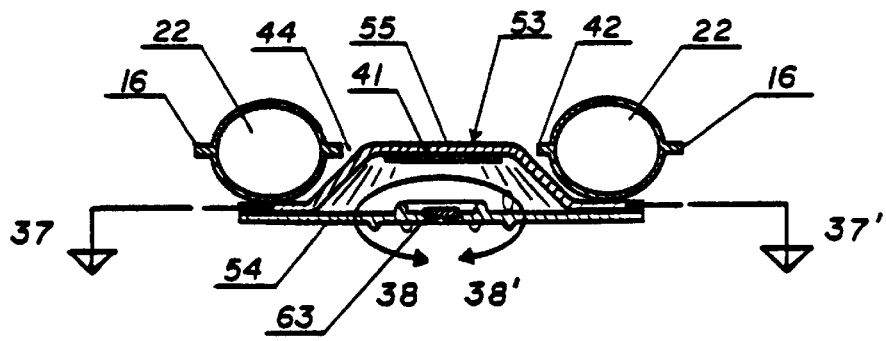
FIG. 36 is a sectional view along line 36—36' of FIG. 33.
Figure 37:
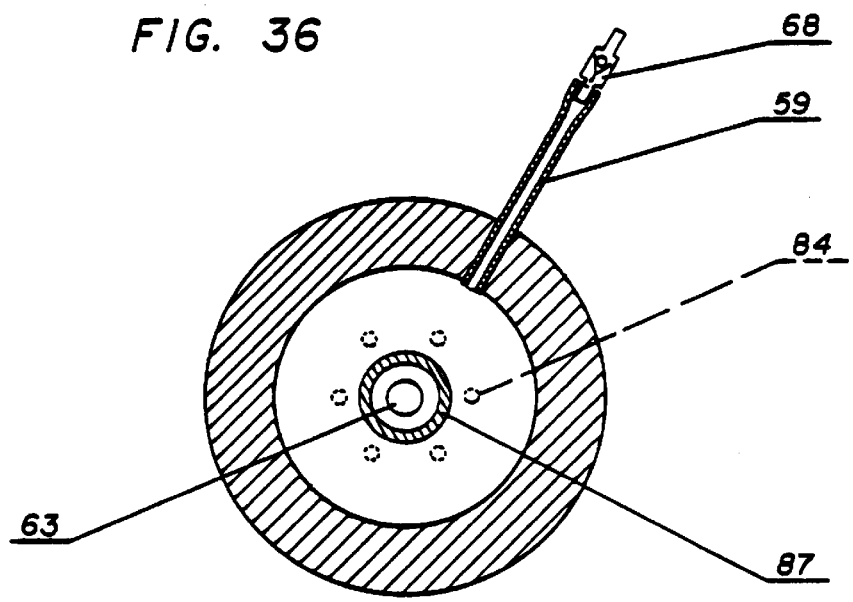
FIG. 37 is a sectional view along line 37—37' of FIG. 36.

FIG. 36 is a sectional view through the internal inflation pump 53 of the inflatable inner sole shown in FIG. 33. The pump 53 is an expandable chamber pump, and fits within the well or recess formed by circular seam 42 which surrounds aperture 44 through the sheet materials from which the inner sole is manufactured. This pump 53 is retained beneath the aperture as its diameter is greater than that of the aperture 44. The pump 53 is similar to pump 50, previously described with reference to FIGS. 6 and 7 and has a plurality of protrusions 84 on its undersurface to provide a clearance for air passage. The pump 53 is formed with a bottom sheet 54 to which is bonded the upper sheet 55. Preferably the bottom sheet has a substantial diameter to provide an annular flat seam which has sufficient width (see FIG. 39) to prevent extruding through the aperture 44 of the inner sole. A flexible tube 59 communicates with the air pump 53 and passes to the check valve 68 and pressure control valve 58, shown in FIGS. 33 and 39. An aperture 61 (see FIG. 38) in the side wall of pump 53 opens into tube 59. These elements are described in detail with reference to the same elements of FIG. 1.

Figure 38:
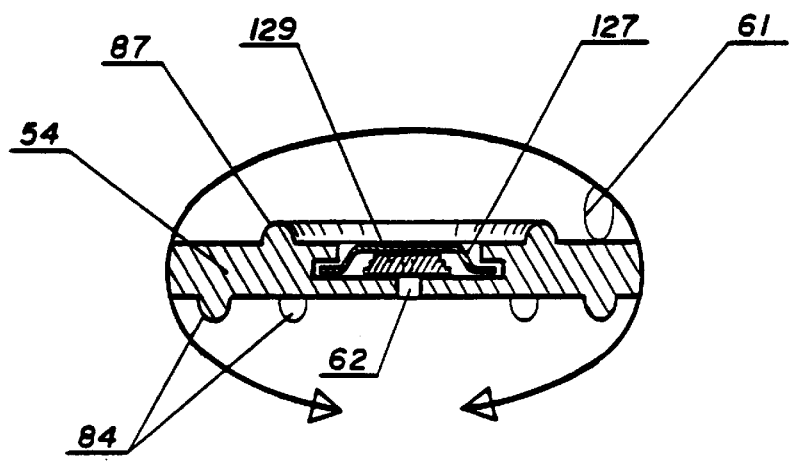
FIG. 38 is an enlarged view of the area within the line 38—38' of FIG. 36.
Figure 39:
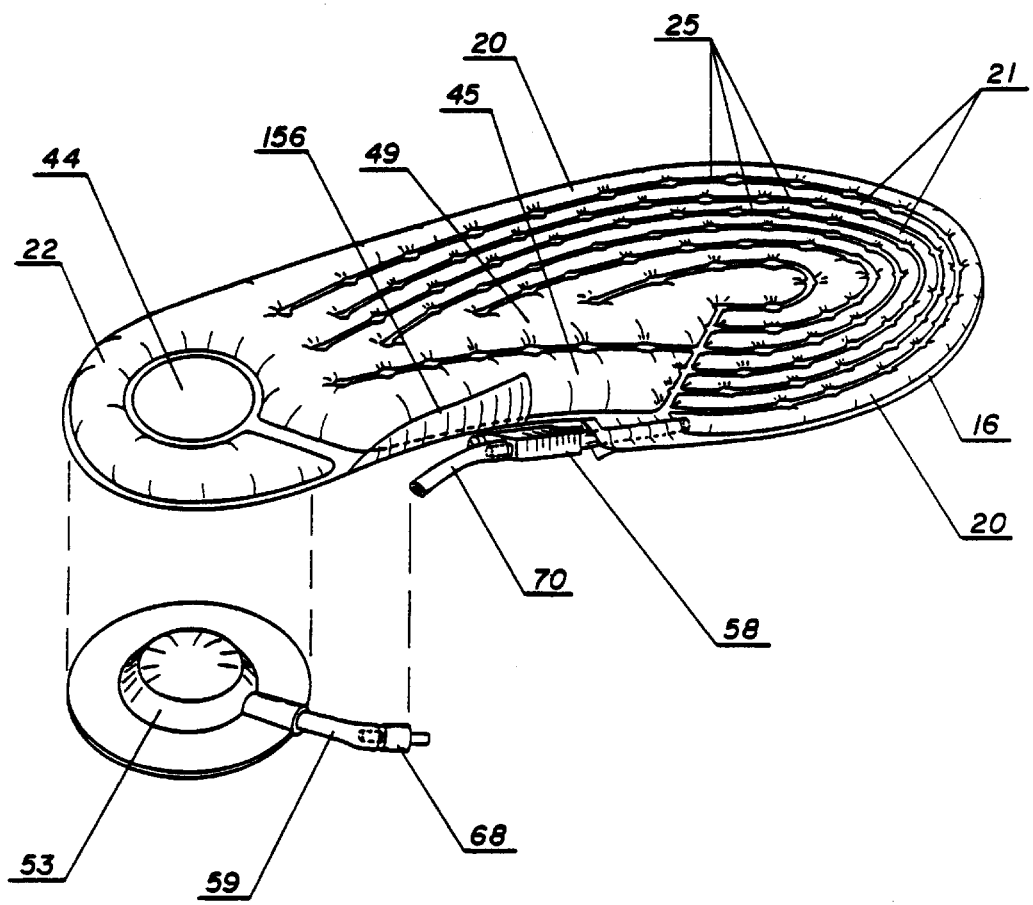
FIG. 39 is a perspective view of the inflatable inner sole shown in FIG. 33.
Figure 40:
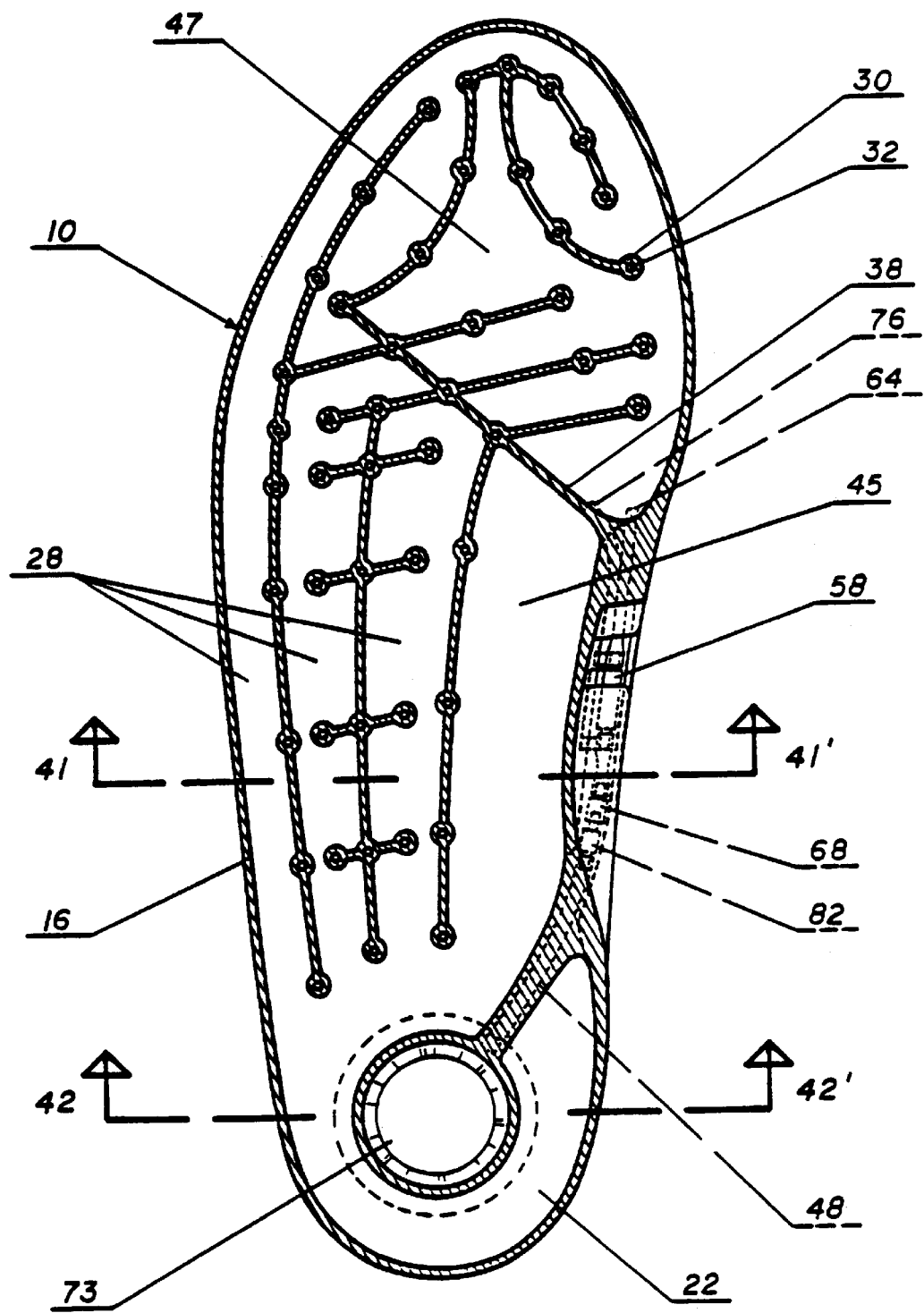
FIG. 40 is a plan view of an alternative inflatable inner sole.

The inlet valve to the air pump 53 is shown in detail in the enlarged sectional view of FIG. 38. As there illustrated, the bottom wall 54 of the air pump has an aperture 62 which is closed by the resilient plug 129 that is supported by spider 127. When a partial vacuum is formed within the pump 53, by expansion of the chamber of the pump, air flows past valve plug 129 and into the chamber of the pump. When the wearer's heel compresses the pump 53, the plug 129 seals the aperture 62 and forces the air through tube 59 and check valve 68. Preferably, the valve structure is surrounded by a raised circular rib 87 to prevent damage to the spider 127 and plug 129 when the air pump is entirely compressed. Preferably, a plate 41 is placed beneath the upper surface of the pump 53 to reinforce and stiffen this surface.

The plug 129 also functions to seal the inlet aperture against water intrusion, particularly when the inner sole, or footwear with the inflatable sole is washed or cleaned. Water cannot intrude past the plug 129 as there is no partial vacuum developed within the air pump 53.

Figure 41:
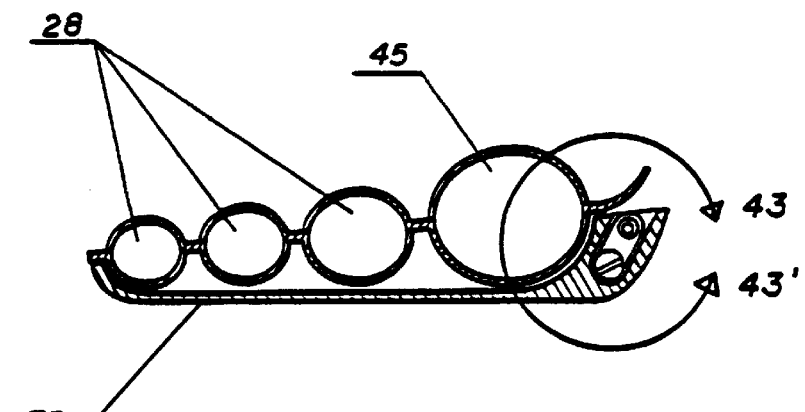
FIG. 41 is a sectional view along line 41—41' of FIG. 40.
Figure 42:
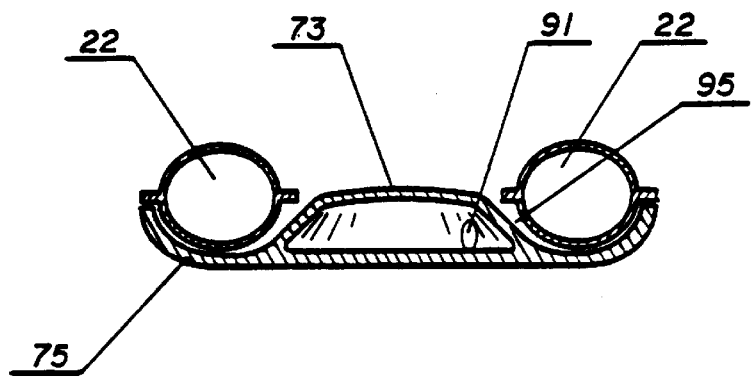
FIG. 42 is a sectional view along line 42—42' of FIG. 40.
Figure 43:
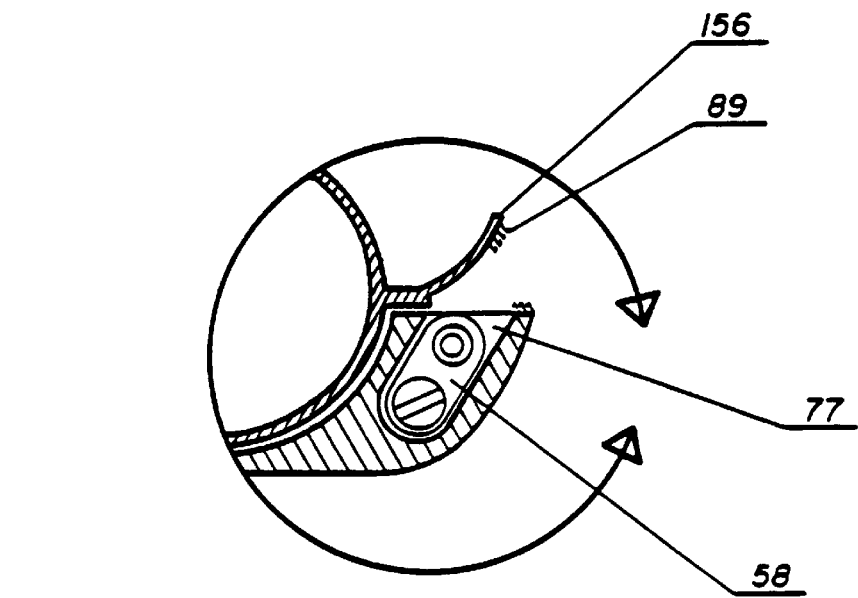
FIG. 43 is a an enlarged view of the area within the line 43—43' of FIG. 41.
Figure 44:
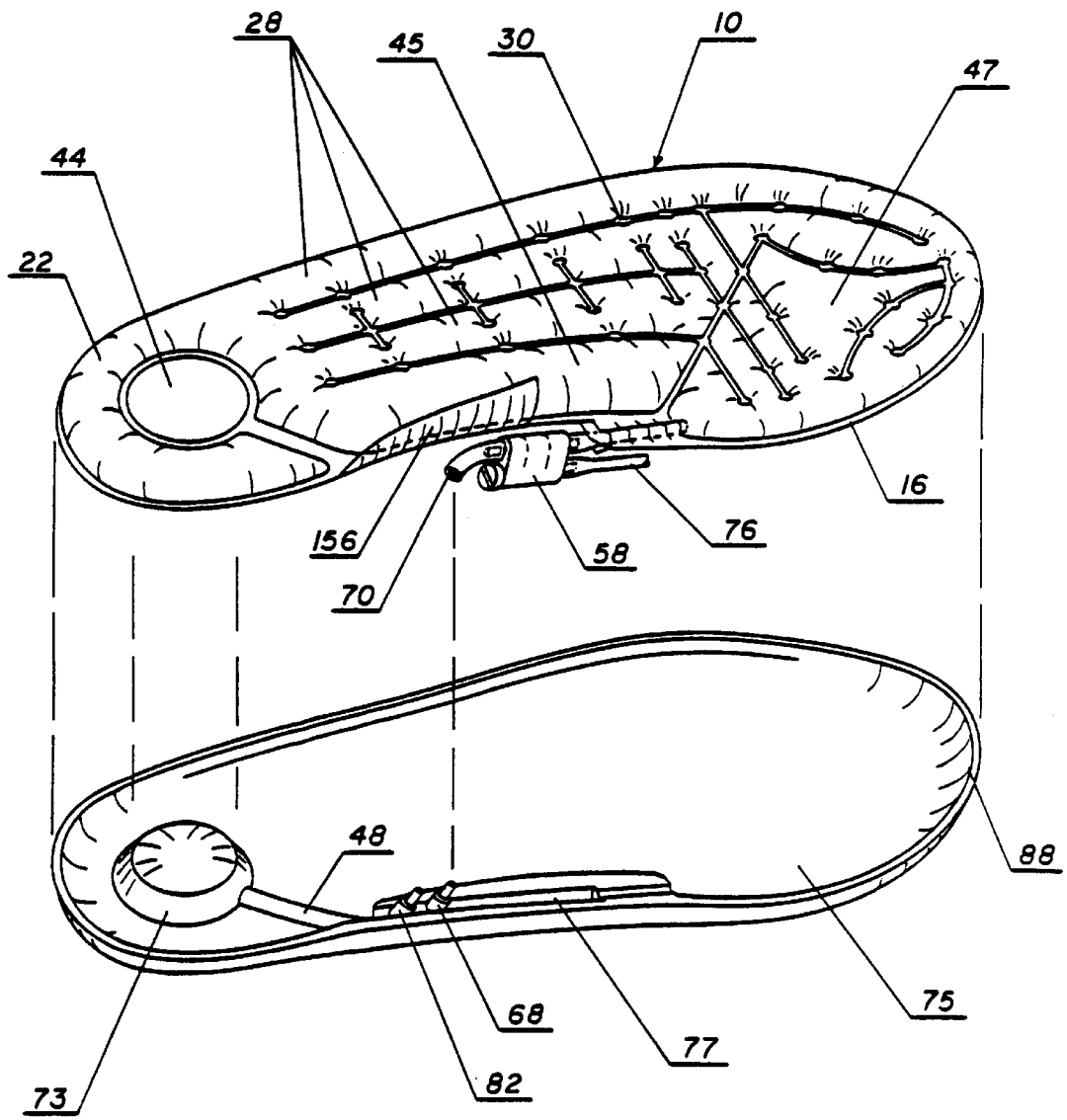
FIG. 44 is an exploded perspective view of the inflatable innersole of FIG. 40.
Figure 45:
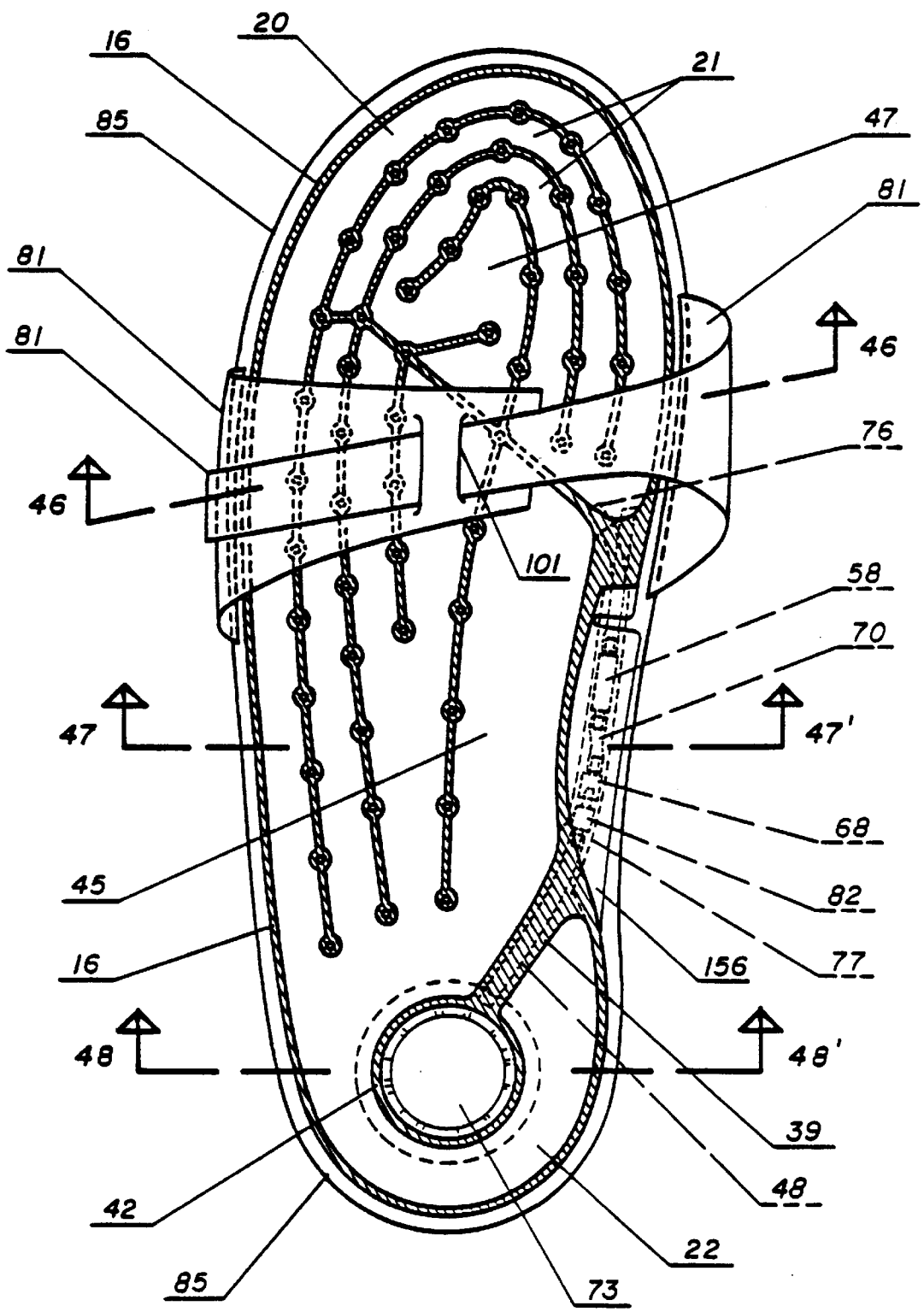
FIG. 45 is a plan view of an alternative inflatable inner sole for a sandal.
Figure 46:
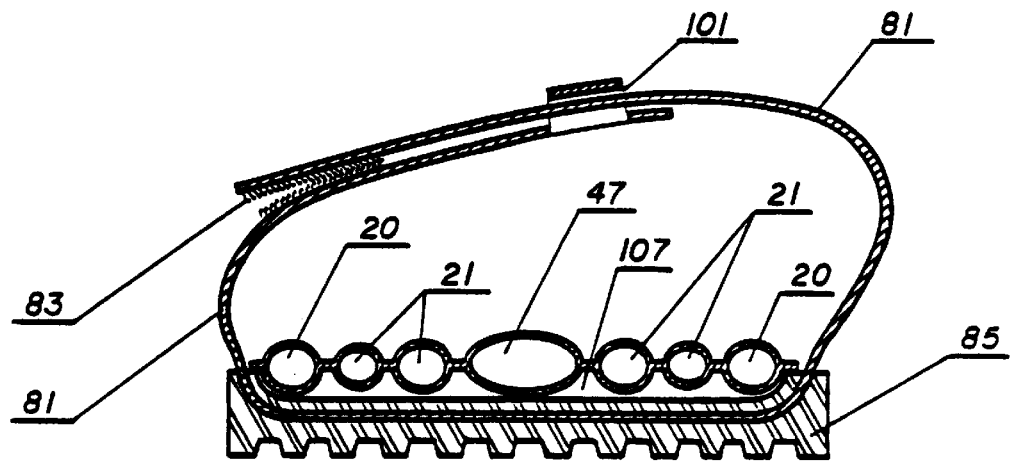
FIG. 46 is a sectional view along line 46—46' of FIG. 45.
Figure 47:
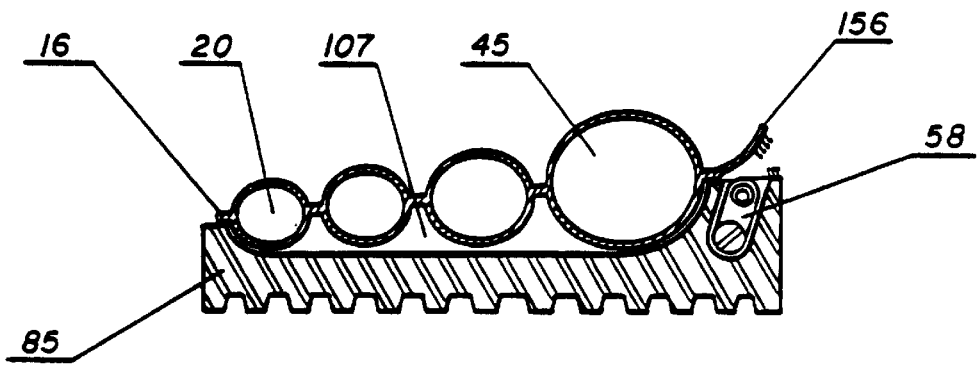
FIG. 47 is a sectional view along line 47—47' of FIG. 45.

Referring now to FIGS. 40 through 44, there is illustrated an embodiment of an inflatable inner sole which includes a support underlayment for the inner sole. This embodiment can be for a removable inner sole for foot wear. It is especially useful, however, as a permanent member in footwear, particularly in athletic footwear or in house shoes, e.g., slippers, moccasins, etc. Some slippers now on the market have two fabric soles separated by a space which is filled with a removable foam sole. This embodiment can be inserted as a substitute for the foam sole. The inner sole 10 is substantially identical to that shown and described with reference to FIG. 1. As shown in FIG. 44, the inner sole is used in combination with a supporting underlayment 75 which has an upwardly curled edge 88 extending entirely about its periphery, conforming to the shape of the inner sole. The air pump 73 can be integrally formed with the underlayment 75, and as shown in FIG. 42, the circular channel 22 of the inner sole 10 is received within the circular trough 95 formed between the upwardly curled peripheral edge 88 and the air pump 73. Alternatively, the air pump can be formed separately as shown in FIGS. 8 and 9 and can be assembled to the underlayment 75. In this embodiment, the inlet valve to the air pump is located at the medial edge of the underlayment 75; see FIG. 44. The pump 73 has a communicating tube 48 which has a Y-shaped end similar to pump 57 shown in FIG. 4. This tube 48 can be integrally molded into the underlayment 75. The inlet check valve 82 has its open end within the shoe. The outlet, or discharge, check valve 68 is coupled to tube 70 that extends to the pressure control valve 58. As shown in FIG. 41, a pocket 77 is molded adjacent the medial edge of the underlayment along the instep region. This pocket receives the pressure control valve 58 (see FIGS. 41 and 43) and the check valves 68 and 82 (see FIG. 44). The pocket is preferably closed with a flap 156 that can be retained closed by Velcro bands 89.

The invention can also be incorporated in footwear as an integral inflatable sole. FIGS. 45 through 49 illustrate the incorporation of the invention as a permanent member of footwear. For illustration purposes, a sandal, or clog, is shown. It is apparent, however, that the upper portions of a conventional shoe or boot could also be permanently attached to the illustrated sole. In such application, the inner sole could also include inflatable upper liners such as shown in FIGS. 29 and 30. In the illustrated application, the sandal has a conventional outer sole 85 that is provided with treads on its undersurface, and with conventional straps 81 which extend from opposite, medial and lateral sides of the upper edges of the outer sole. The straps can be molded into the outer sole 85, as shown in the sectional view of FIG. 46. The straps 81 interconnect above the arch or toes of the wearer and for this purpose can be provided with slots such as 101 and/or Velcro attachment bands 83 on opposite mating surfaces, all in a conventional manner.

The outer sole 85 can have a recess 107 in its upper surface and the inflatable liner 10 of the invention can be received within this recess. This liner is substantially as previously described with flow passageways 21 and a toe pillow 47. Preferably, the liner is permanently secured to the upper surface of the outer sole 85 with stitching, bonding with a suitable cement or glue, or by solvent welding. The permanent attachment is along the peripheral edge 16 of the inflatable inner sole. Alternatively, the inflatable inner sole can be removably attached by Velcro attachment fabric bands which can be applied to the underside of peripheral edge 16 of the inner sole and about the mating peripheral edge of the outer sole 85.

Figure 48:
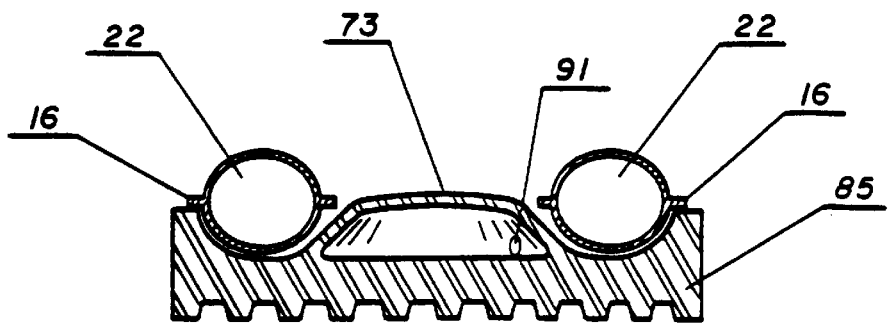
FIG. 48 is a sectional view along line 48—48' of FIG. 45.
Figure 49:
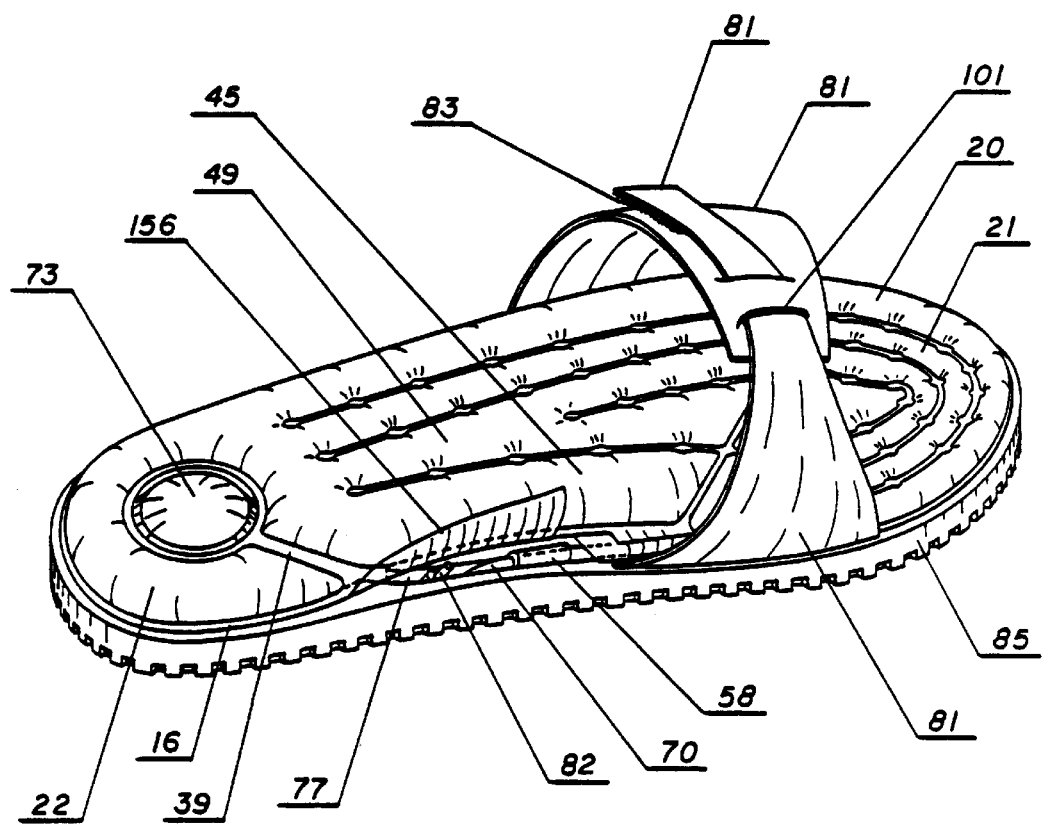
FIG. 49 is a perspective view of the inflatable inner sole of FIG. 45.

As shown in FIG. 48, the air pump 73 can be integrally molded into the outer sole 85. This is especially advantageous for a sandal as the pump is thus integral with the heel of the sandal, and no additional flap or band is needed for mounting of the pump. An aperture 91 in the sidewall of the air pump 73 communicates with a tube 48 that has a Y-shaped end (see FIG. 4) which has an inlet check valve 82 and a discharge check valve (not shown) which is connected to tube 70. As shown in FIGS. 44 and 49, tube 48 is beneath seam 39. The outer sole is preferably formed with a pocket along its medial edge adjacent the instep region to provide a recess that receives the pressure control valve 58 and the check valves 68 and 82. This pocket can be closed with flap 156 of the inner sole 10 and secured with Velcro fabric bands (not shown). In some applications, e.g., beachwear, the apertures 32 can be eliminated and the discharge tube 76 from the pressure relief valve 58 can be directed outside of the recess 107. As shown in FIG. 10, tube 76 is connected to the excess pressure relief port 74 of the pressure relief valve 58.

Figure 50:
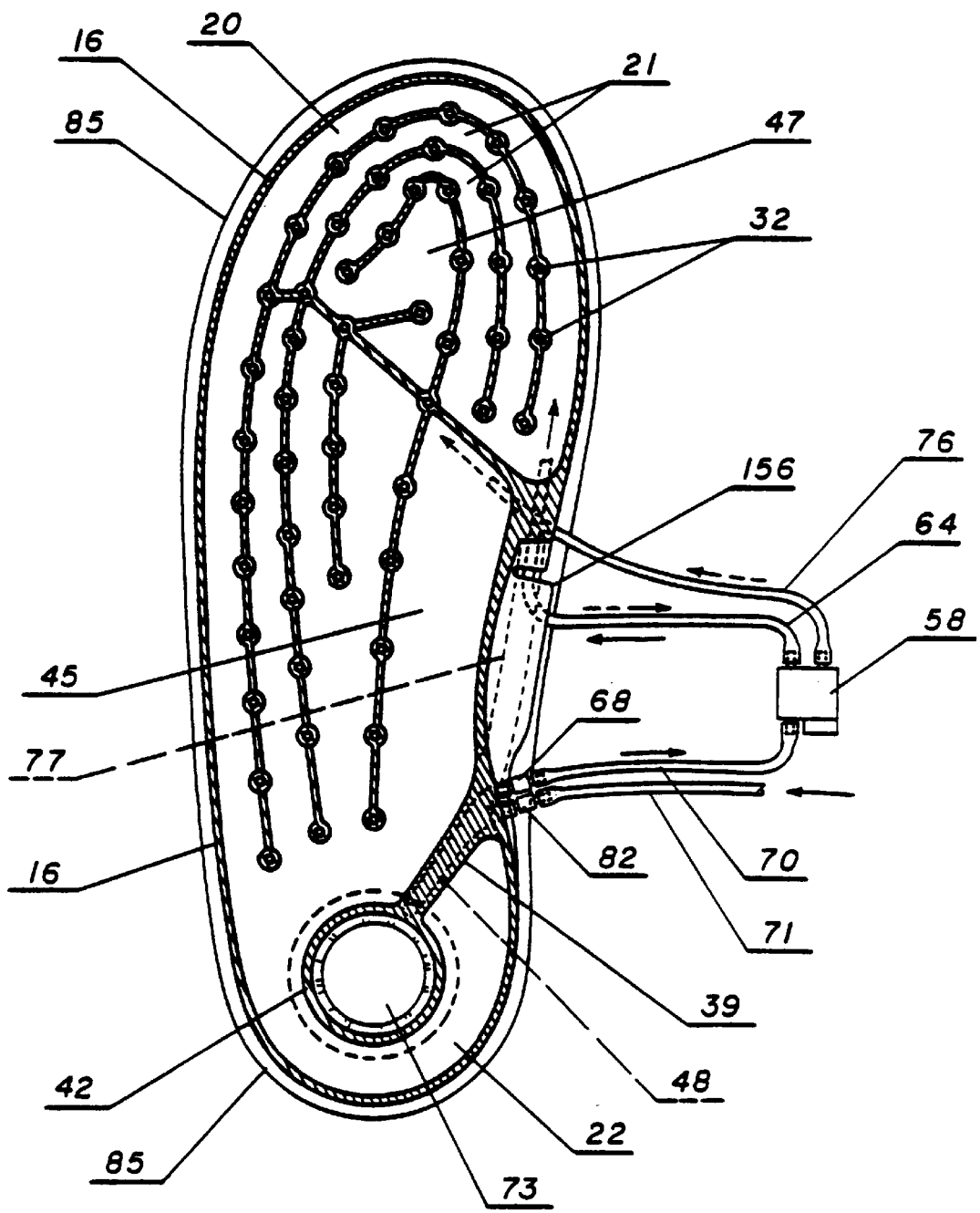
FIG. 50 is a plan view of an inflatable inner sole with a heel pump and a remotely-located, adjustable relief valve.

Referring now to FIG. 50, there is illustrated a plan view of an inflatable inner sole according to the invention which is provided with a remotely located pressure control valve 58. For this purpose, the flexible tube 70 which extends from the air pump check valve 68 has sufficient length to extend beyond the region of the sole. Similarly, the flexible tube 64 which directs pressure controlled air from valve 58 to the sealed interior chamber of the inner sole, and the flexible tube 76 which directs excess air from the pressure control valve 58 to beneath the inner sole, also have sufficient length to extend beyond the region of the sole. This permits the pressure control valve 58 to be located remotely from the sole of the shoe, e.g., the valve 58 can be located on the sides of the upper portion of the shoe where it is readily accessible to the wearer. If desired, the inlet flexible tube 71 can also be of sufficient length to extend to a location remote from the sole.

Figure 51:
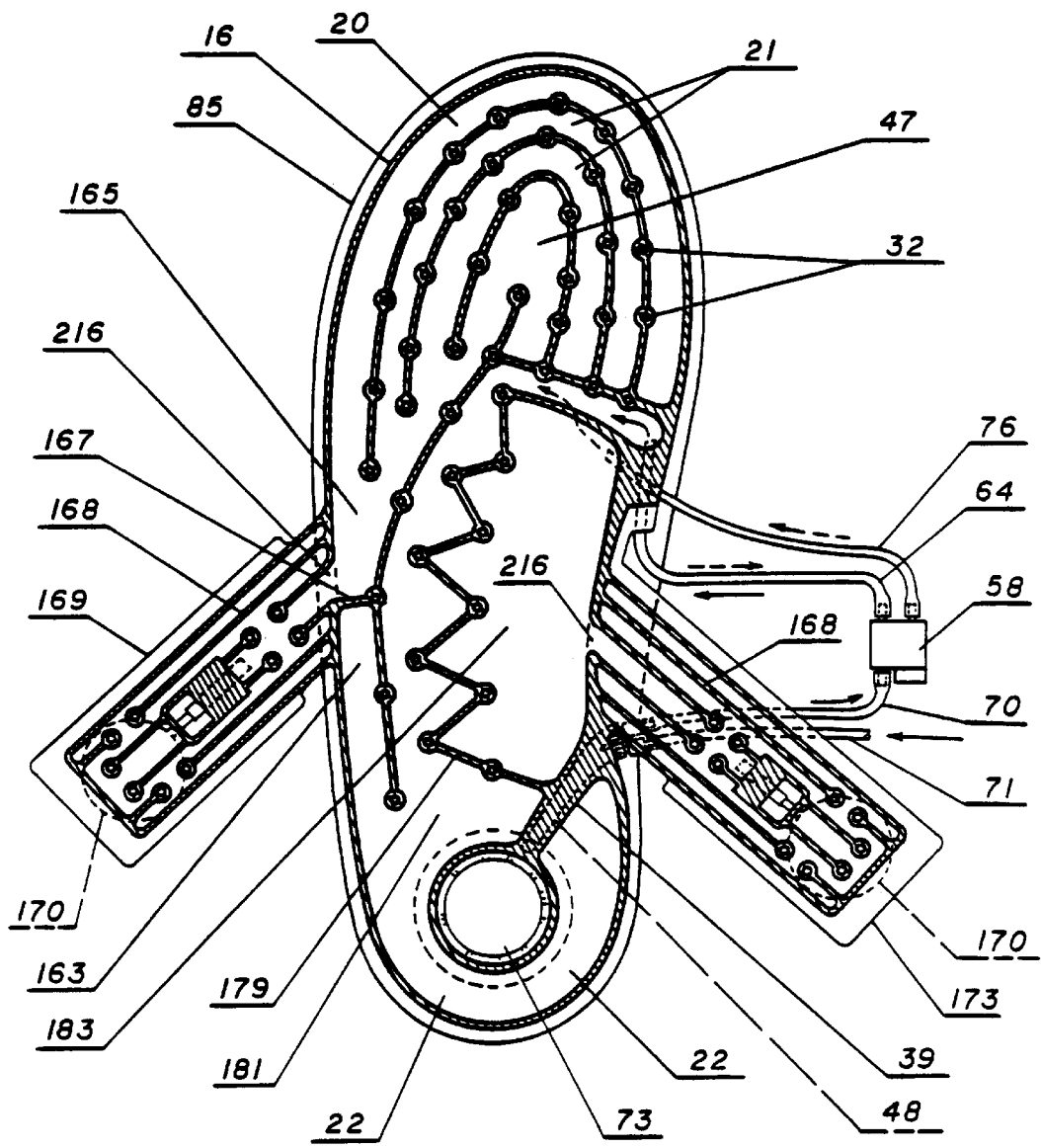
FIG. 51 is a plan view of an inflatable inner sole with three interior chamber and separate air pumps for each interior chamber.

Referring to FIG. 51, the inner sole previously described with reference to FIG. 50 is further modified by the provision of a lateral flap 169 and a medial flap 173. These flaps are substantially the same as flaps 164 of FIGS. 22 and 28 and 210 of FIG. 29. These flaps are formed by overlying extensions of the first and second plastic sheets, and they are seamed about their peripheries to provide sealed interior chambers, and have a plurality of discontinuous seams 168 which form tubular passageways within each flap. Preferably, a manual actuated air pump 170 is provided on each flap so located to orient its discharge into the sealed interior chamber of the flap. Each flap has at least one tubular passageway 216 open into the sealed interior chamber of the inner sole.

The inner sole has a continuous seam 179 which completely transverses the sealed interior chamber of the inner sole, thereby creating sealed interior chambers 181 and 183. The sealed interior chamber 183 provides an arch pillow in the inner sole. Another continuous seam 167 further subdivides interior chamber 181 into a forward or toe sealed interior chamber 165, and a heel sealed interior chamber 163. The medial side flap 173 has one tubular passageway open to sealed interior chamber 183 and lateral side flap 169 has a tubular passageway open to the sealed interior chamber 181, whereby the manual air pumps 170 can be used to adjust, independently, the inflation pressure in each of the sealed subdivided interior chambers. The heel pump provides inflation pressure which is controlled in the controlled pressure relief valve for the heel sealed interior chamber 163. Excess air discharged from the pressure relief valve 58 is passed by tube 76 to a discharge beneath the inner sole and the underlayment of the shoe, e.g., the outer sole of the shoe, where it can flow along the channels formed on the undersurface of the inner sole and pass through the apertures 32 of the inflatable sole, thereby providing air circulation within the shoe in the same manner as previously described with reference to FIG. 1. Alternatively, tube 76 could extend outside of the shoe so that the excess air would be vented outside of the shoe.

Figure 52:
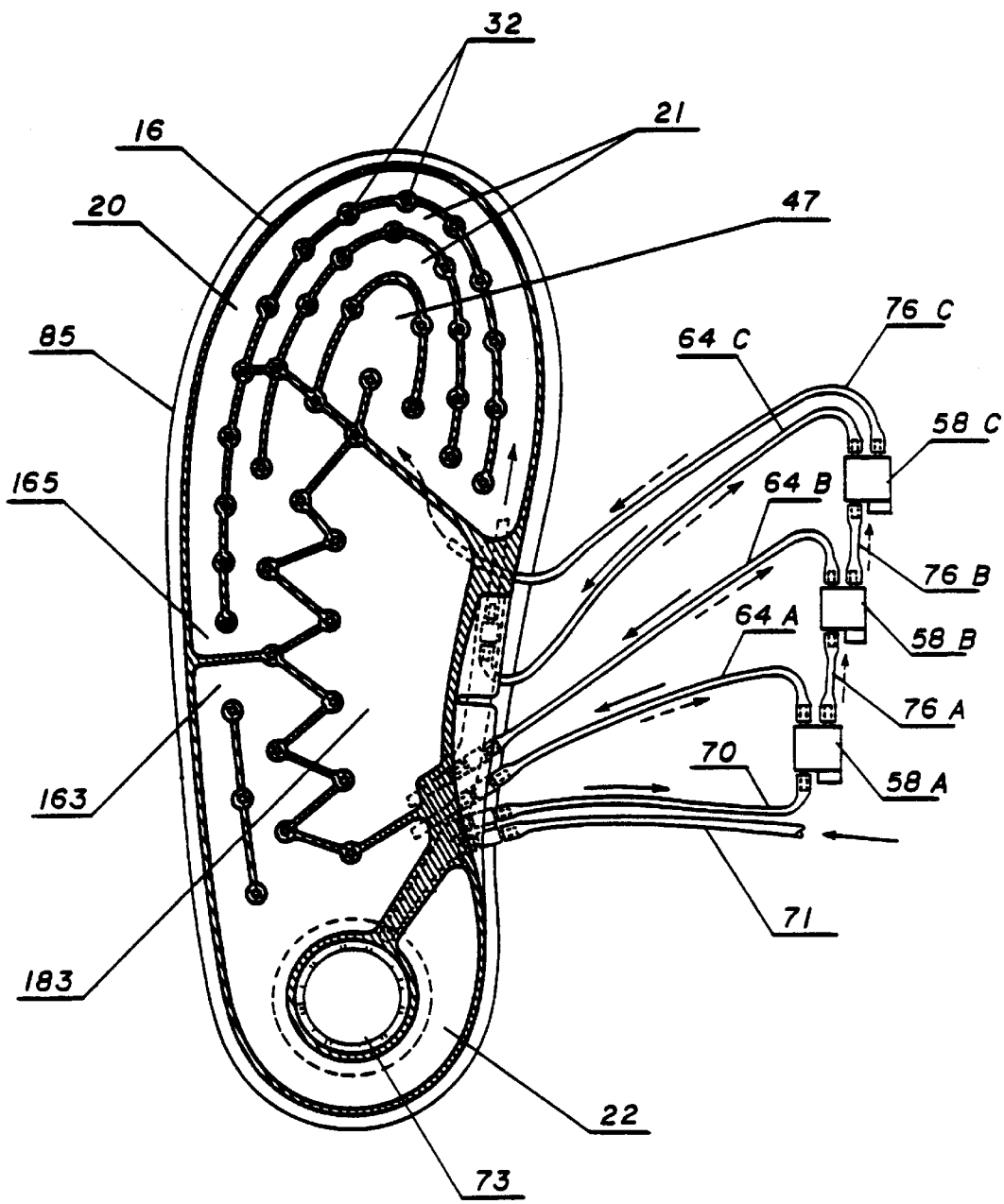
FIG. 52 is a plan view of an inflatable inner sole with three interior chambers, and separate, remotely located pressure control valves for each of the three interior chambers.

Referring now to FIG. 52, there is illustrated an embodiment in which the same three subdivided sealed interior chambers, 163, 165 and 183 are pressured with a single air pump 73, and are each provided with separate and independent pressure control valves 58a, 58b and 58c. In this application, the pressure control valves are serially connected, in tandem, with the excess air from valve 58a being passed by flexible tube 76a to the succeeding valve 58b, and the pressure controlled air being passed by tube 64a to sealed subdivided interior chamber 163. The valve 58b is set for a slightly lower pressure than valve 58a and discharges air at its controlled pressure into sealed interior chamber 183 (arch pillow) through tube 64b and discharges excess air through tube 76b to the succeeding valve 58c. The latter valve discharges air at its control pressure through tube 64c into the sealed interior chamber 165, while passing excess air through tube 76c to a location beneath the inner sole, i.e., between the inner sole and the sole of the shoe. Although the valves 58a through 58c are shown in connection to provide the highest pressure in the heel, lowest in the toe and intermediate pressure in the instep, regions, the relative pressures in these regions could be varied by switching the discharge locations of the tubes 64a, 64b and 64c. Also, as previously discussed with regard to FIG. 51, the excess air from valve 58c is preferably vented into the shoe, beneath the inflatable inner sole to provide forced air circulation through the shoe.

Figure 53:
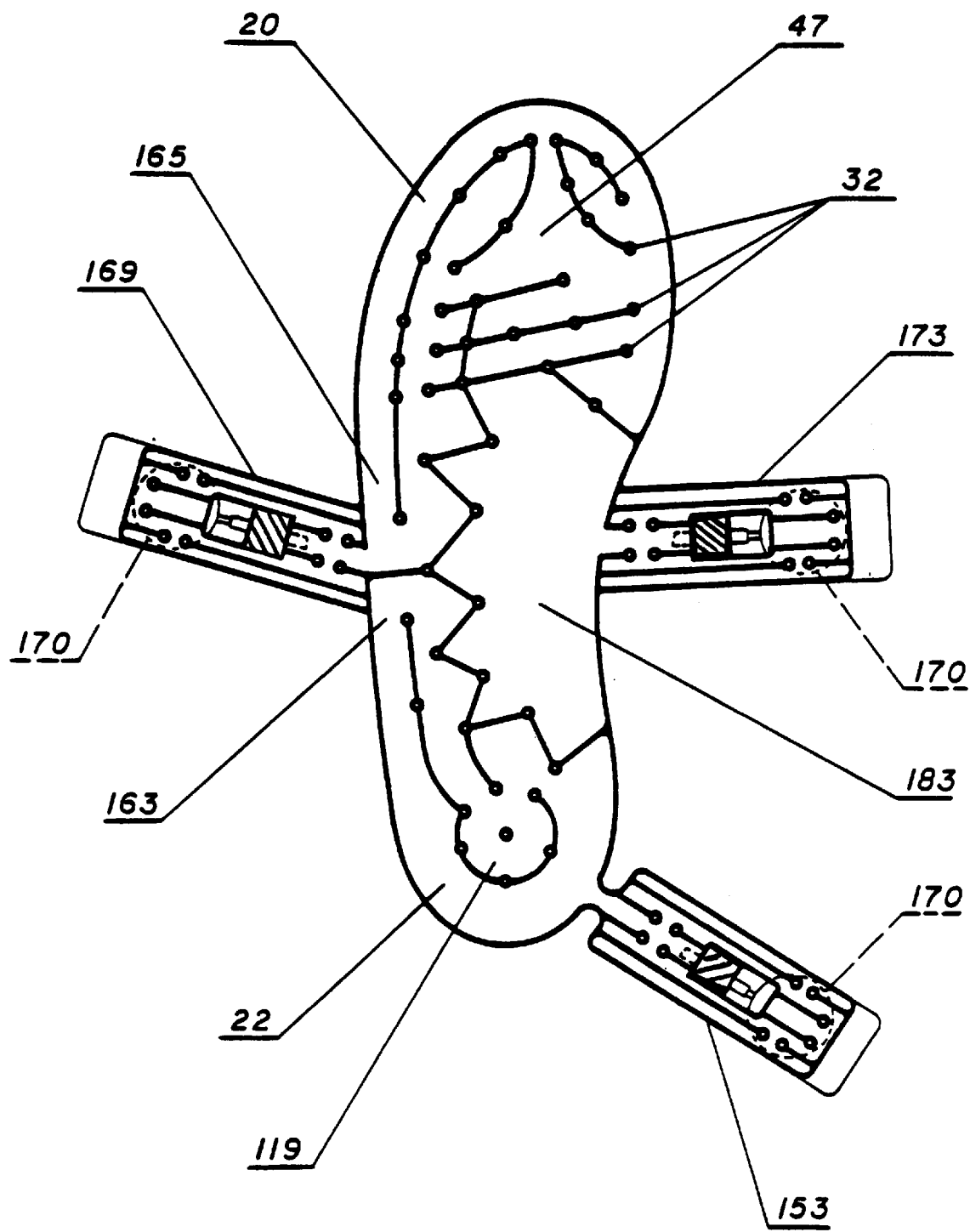
FIG. 53 is a plan view of an inflatable inner sole without a heel pump and with three interior chambers, and a separate, manual air pump for each of the three interior chambers.

Referring now to FIG. 53, the invention is shown as applied to an inner sole which has three separated sealed interior chambers 163, 165 and 183. The interior chambers 163 and 165 have discontinuous seams forming tubular passageways within each chamber. Chamber 183 is preferably unseamed, thereby forming an inflatable arch pillow. Each of the sealed interior chambers has an adjacent flap such as medial flap 173, lateral flap 169 and heel flap 153. Each of the flaps is formed of overlying appendages of the first and second sheets which are sealed about their peripheral edges, and each is provided with a plurality of discontinuous seams to form internal, tubular passageways. Each of the flaps is provided with a hand pump 170 located to discharge pressured air into the flap and the sealed interior chamber of the sole which is in open communication with the tubular passageways of a flap.

Figure 54:
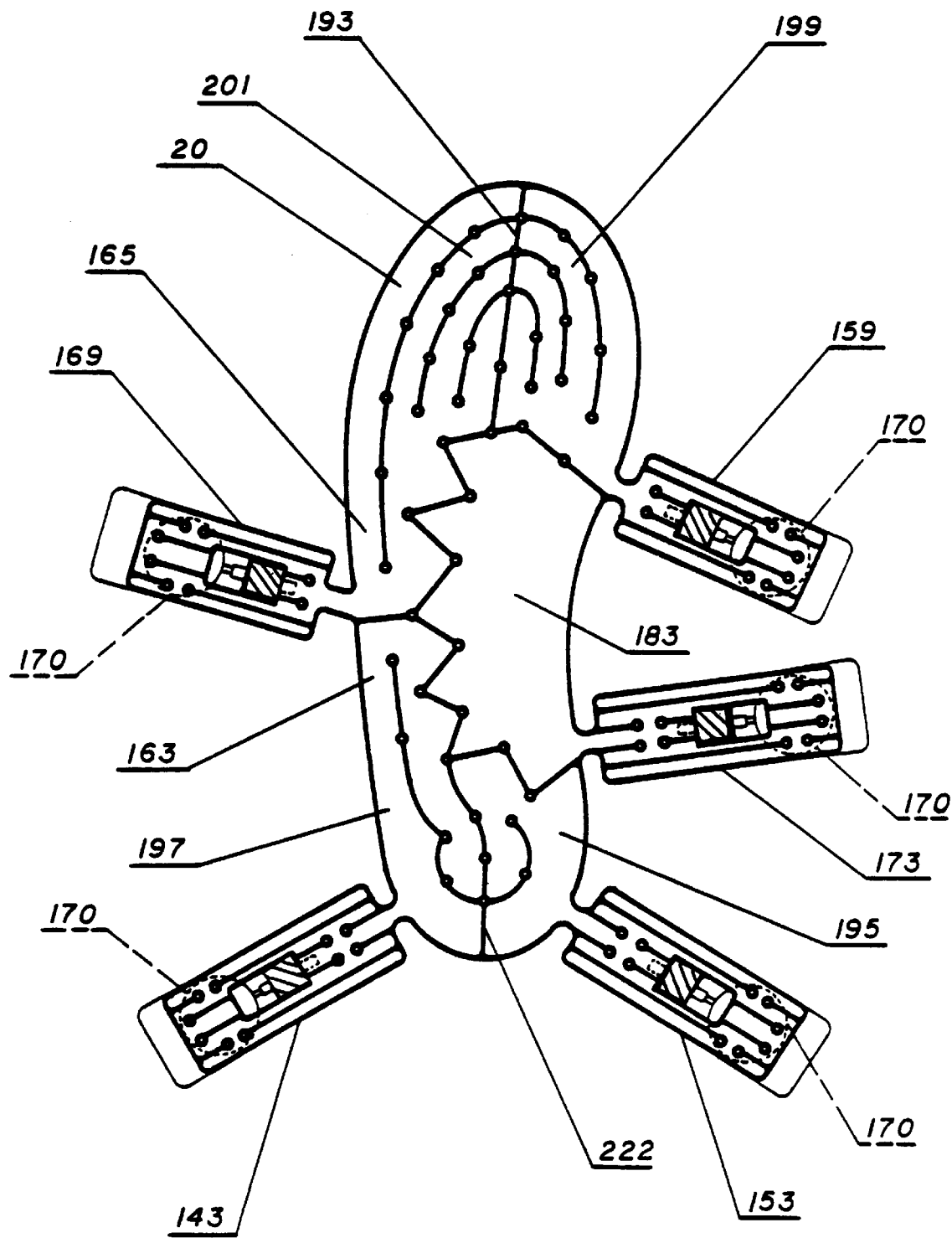
FIG. 54 is a plan view of an alternative inflatable inner sole with rear and medial and lateral inflatable chambers and an arch pillow, each having an independent air pump and pressure relief valve.

FIG. 54 is a plan view of an alternative inflatable inner sole similar to that shown in FIG. 53, however, the sealed interior chambers of the liner are further subdivided by longitudinal continuous seam 222 which divides the heel interior chamber into a right chamber 195 and a left chamber 197 and continuous seam 193 which divides the toe interior chamber 165 into a right toe chamber 199 and a left toe chamber 201. Chamber 183 is as previously described with reference to FIG. 53. Each of these chambers which are formed in the liner has an adjacent flap 169, 173, 153, 159 and 143, and each flap has a plurality of discontinuous seams that form tubular passageways which provide communication from a manual air pump 170 to the interior of its respective chamber. The flaps can be located at convenient and inconspicuous positions along the peripheral edges of the inflatable inner sole, so that the air pumps and associated control valves are accessible, without providing any structure which may obstruct normal activities.

Figure 55:
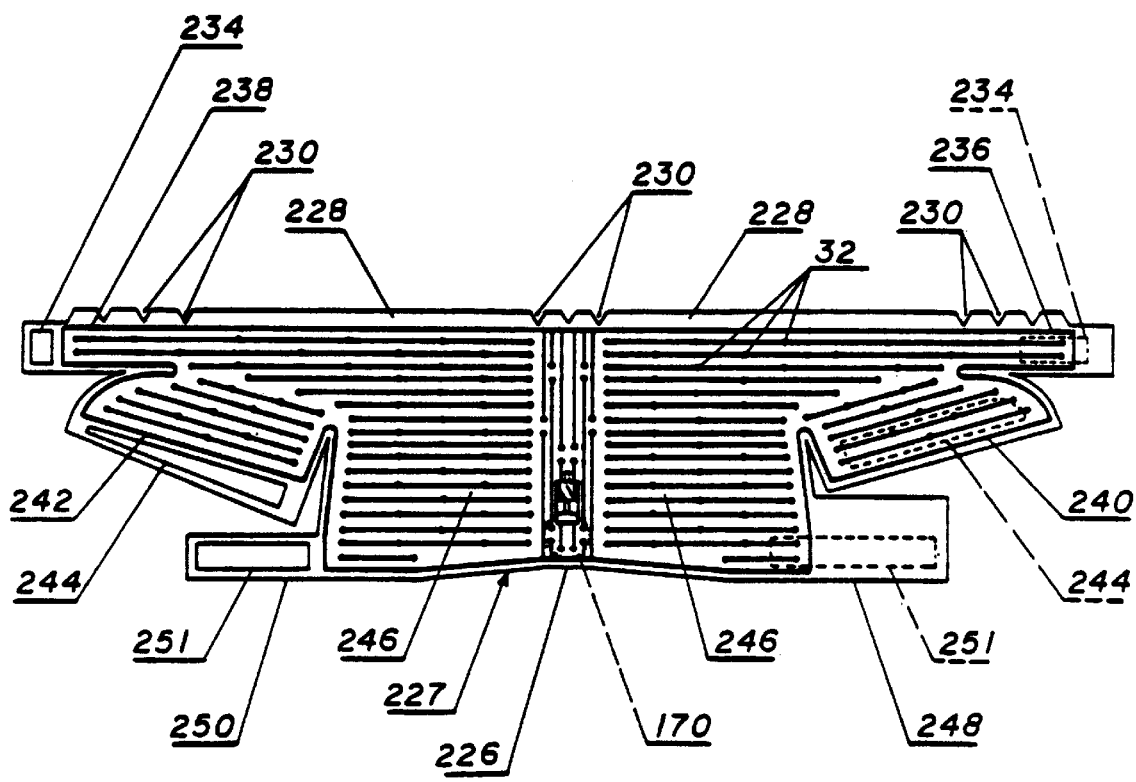
FIG. 55 is a plan view of an alternative inflatable liner with a rear and medial and lateral inflatable flaps which provide linings for the heel and instep sides of the upper inner surfaces of a shoe.

In some applications, it may be desirable to combine any of the aforedescribed inflatable inner soles with an inflatable liner for the upper surfaces of footwear. Alternatively, it may be desirable to provide an inflatable liner only for the upper inside surfaces of the footwear. In such applications, FIG. 55 illustrates a suitable lining 227 which covers the inside surfaces of the upper portion of footwear, only. This lining 227 is substantially the same as that shown in FIG. 30 except the lining has no inner sole. This lining 227 has a heel flap 226 that extends laterally and medially a sufficient distance to permit the flap 226, when folded to extend entirely about the toe of the shoe, forming a liner for the upper of footwear such as a shoe or boot. The flap 226 has a coextensive tab 228 which can fold beneath a normal, or non-inflated inner sole of the footwear, and also can be glued or sewed to that inner sole. Alternatively, it can be folded to lie against the lower edges of the upper portion of the footwear. As the tab 228 must be formed about the curved toe of the footwear, this co-extensive tab 228 can have a plurality of V-shaped notches 230 to permit folding about this curved surface without forming creases. The flap 226 is provided with a plurality of fabric attachment bands 234 such as Velcro to secure its opposite ends 236 and 238. Thus, a band of Velcro is provided at the medial end 236 of flap 226, and a co-acting Velcro band is placed on the opposite side of the flap 226 on its lateral end 238, thereby permitting the ends of the flap 226 to be secured together when wrapped about the toe of the inner sole. Preferably flaps 240 and 242 are provided at the medial and lateral sides of the instep to fit over the instep of the boot and each of these flaps also is provided with a co-extensive Velcro band 244 on its opposite sides whereby the flaps can be folded over the instep of the wearer and secured together with the bands of Velcro attachment fabric. The upper portion of the ankle area 246 of the flap 226 also preferably has medial and lateral extending tabs 248 and 250 which carry co-extensive Velcro bands 251, again on opposite sides to permit securing of these tabs about the ankle of the wearer. A plurality of through apertures 32 are formed in the first and second sheets of the liner and are surrounded by a continuous circular seam, to provide ventilation holes through the lining, permitting free movement of air and moisture.

An air pump 170 is provided in the flap 226 and this air pump is shown by the broken lines similar to that shown on FIGS. 23 through 25 and mounted similarly to the mountings shown in FIGS. 22 and 29.

Figure 56:
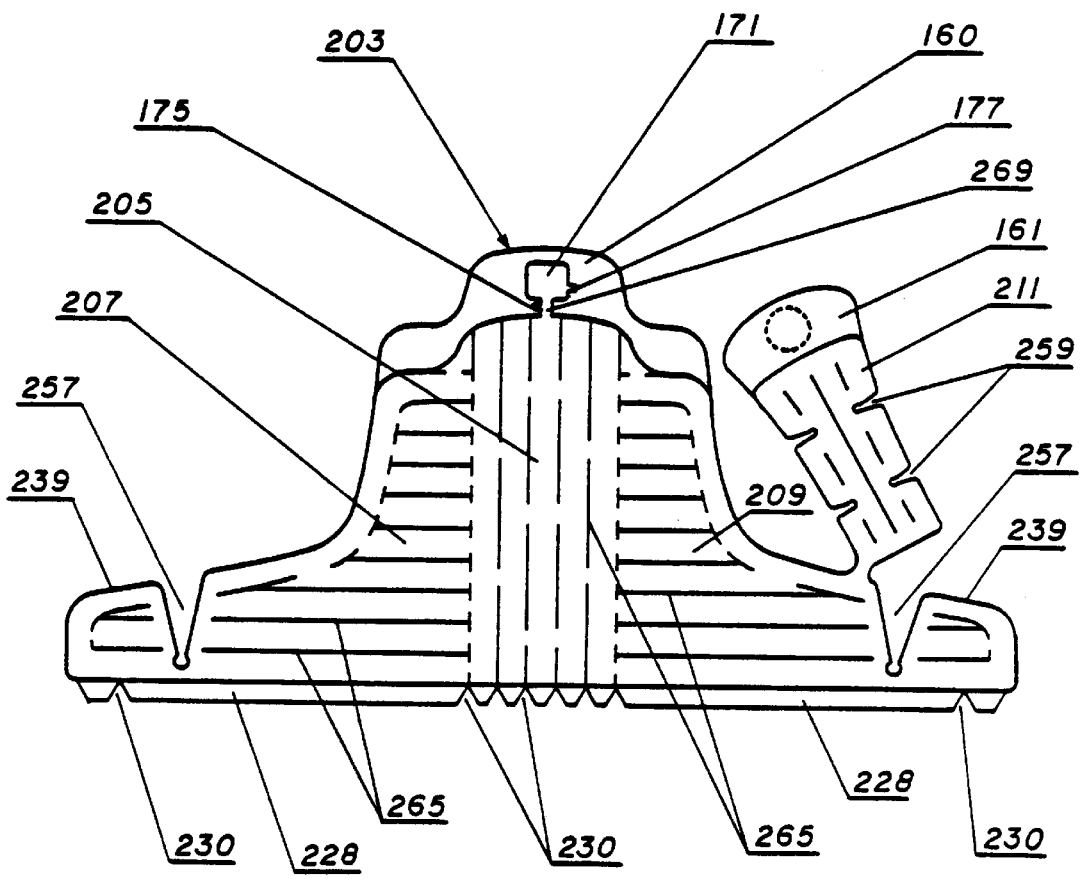
FIG. 56 is an alternative inflatable lining to that shown in FIG. 55.

FIG. 56 illustrates another inflatable lining which is intended for lining only the inside surfaces of the upper portion of footwear. This liner 203 has a heel flap 205 with dependent side flaps 207 and 209, which are intended to overlie the inside sides and instep areas of the upper of footwear. Forward notches 257 form toe linings and permit the lining to flex and conform to the shape of the uppers of the footwear. If desired, an inflatable tongue 211 can be provided as a dependent flap of the liner. Preferably, a manual air pump 171 is located on the base 160 of the lining, adjacent the upper edge of the heel flap 205. The pump 171 is described in detail hereinafter with reference to FIGS. 67 and 68. The base can be an uninflated extension of the lining and can be formed from either or both of the first and second overlying sheets of the lining. This air pump has an inlet 177 and a manual pressure relief valve 175. Alternatively, the air pump, inlet and valve could be located on the upper end of the tongue 211, most preferably on the base 161 of the tongue, as shown by the phantom lines. The tongue can have notches 259 for flexibility. A tab 228 can be provided along the lower edge of the lining to fasten the lining to an interior surface of the footwear. Notches 230 can be provided for flexibility of the tab 228, thereby avoiding creasing of the tab when it is fitted into footwear.

Figure 57:
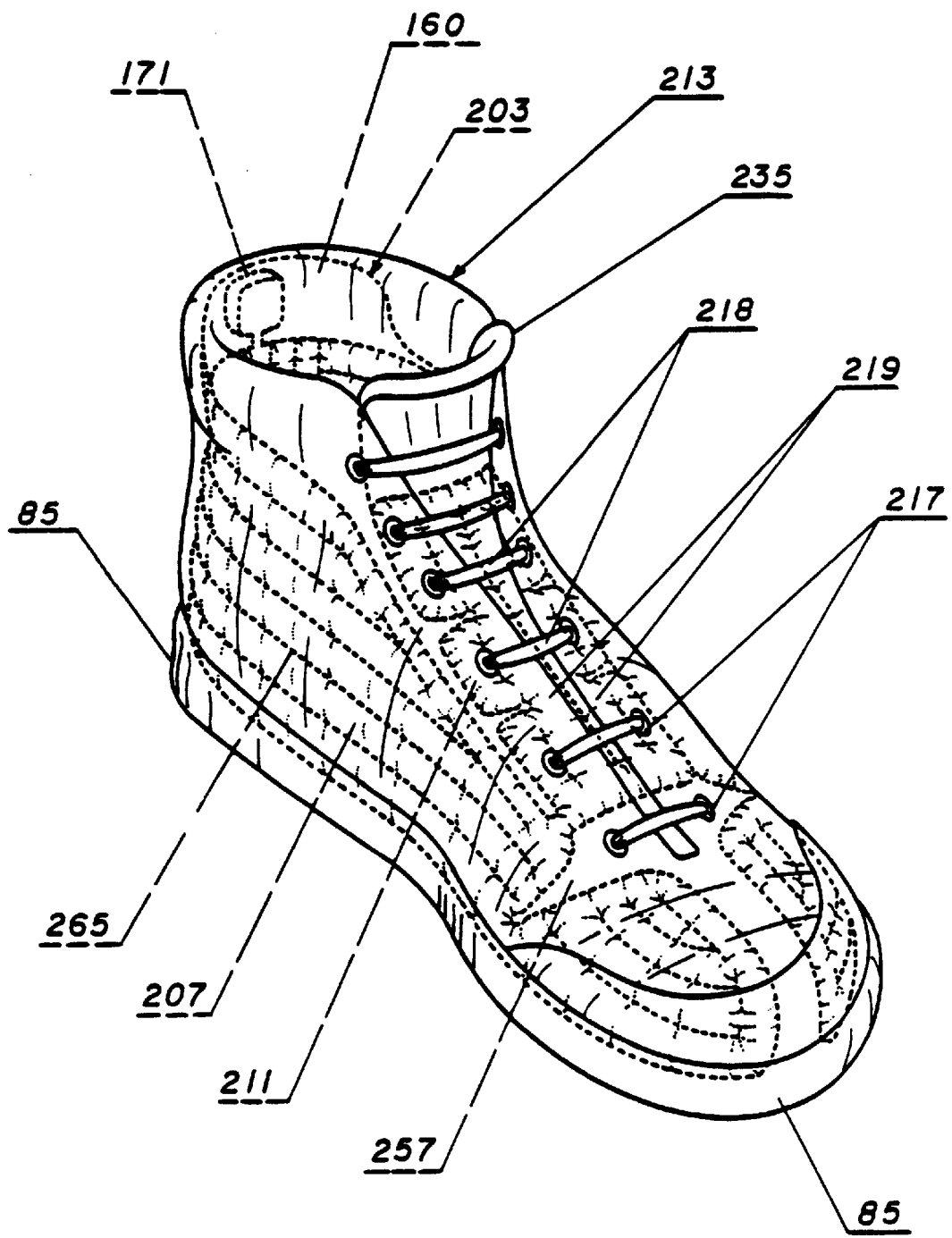
FIG. 57 is a perspective view of a shoe fitted with the upper lining shown in FIG. 56.

FIG. 57 illustrates an athletic shoe 213 which has conventional lacing 218 in eyelets 217 along edge medial edge of opposite vamps 219. The liner 203 (shown in FIG. 56) is shown in hidden object lines, where it is within the shoe and concealed by the sides of the shoe. The air pump 171 is shown as projecting from the rear of the heel of the shoe.

Figure 58:
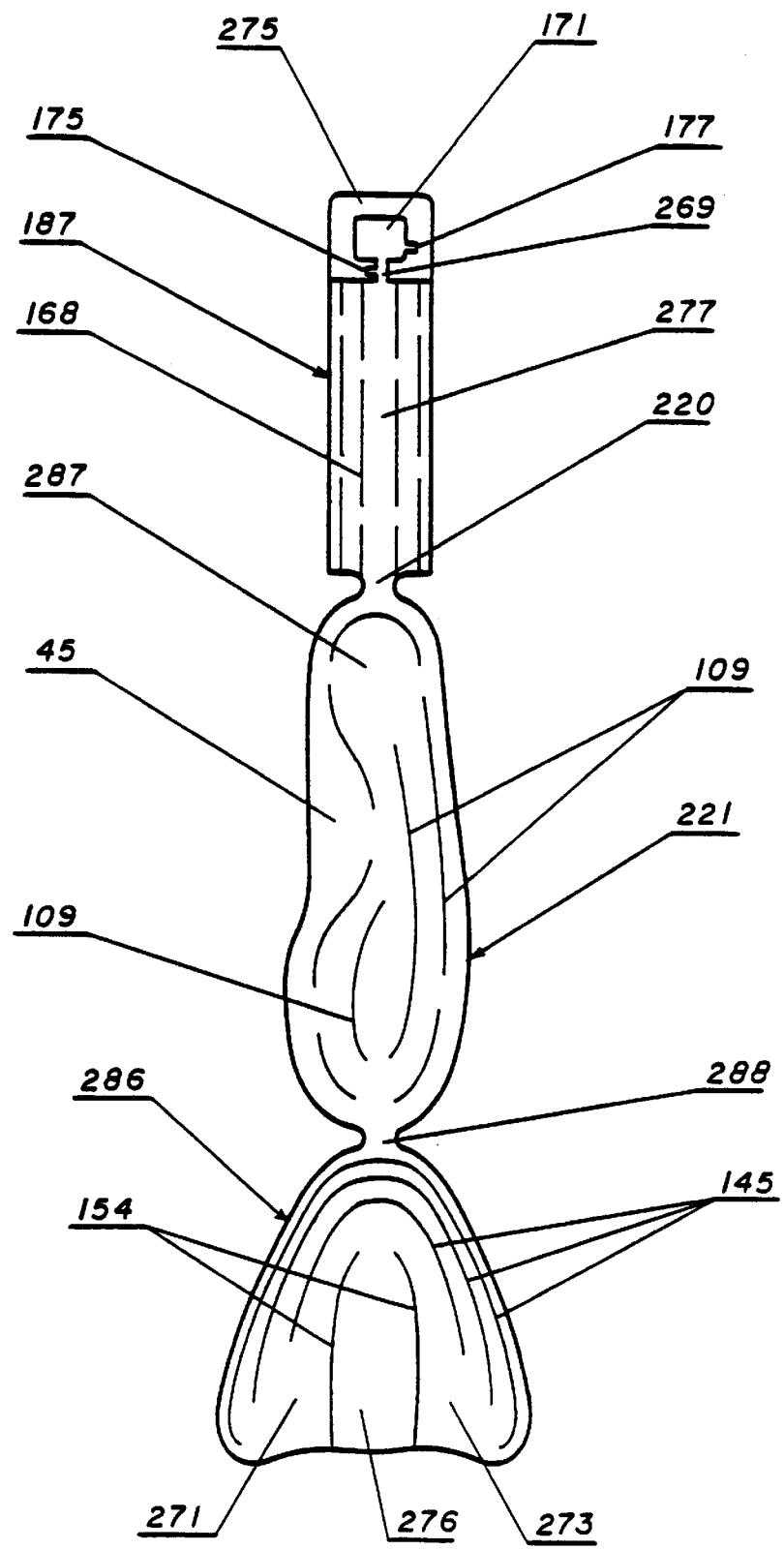
FIG. 58 is a plan view of an inflatable lining having an inflatable inner sole and upper air bag with a manual pump and relief valve.

FIG. 58 illustrates an alternative lining having an inflatable inner sole 221, a heel flap 187, and a frontal air bag 286. The heel flap 187 has a peripheral seam to form a sealed interior chamber and supports a manual air pump 171 adjacent its upper end, preferably on the base 275 of the heel flap 187. The heel flap 187 has a plurality of discontinuous seams 168 to form internal air passageways with the central passageway 277 open at 220 to the sealed interior chamber of the inflatable inner sole 221. The inflatable inner sole has a plurality of discontinuous seams which form air passageways and support pillows such as heel pillow 287 and arch support pillow 45.

An air bag 286 is formed by forward flaps of the first and second sheets of the liner which are seamed together about their peripheries. The seam is open at the toe to provide an air passageway 288 communicating between the inner sole 221 and the forward air bag 286. Air can flow between the inner sole 221 and air bag 286 which lies over the foot, permitting the foot to flex within the shoe while maintaining a constant pressure about the foot and thereby retaining the security of tight lacings. The rate of air flow between the inner sole 221 and the air bag 286 can be controlled by the diameter, i.e., size, of the passageway 288. Preferably the air bag has a plurality of discontinuous seams such as the arch-shaped seams 145 and the curved seams 154 to provide a medial support pillow 271, a lateral support pillow 273 and a support pillow 276 above the instep. The air bag 286 extends to each side so that it also serves as a side lining, as apparent in FIG. 59. If desired, the air bag 286 alone, without the inner sole 221, can be provided.

Figure 59:
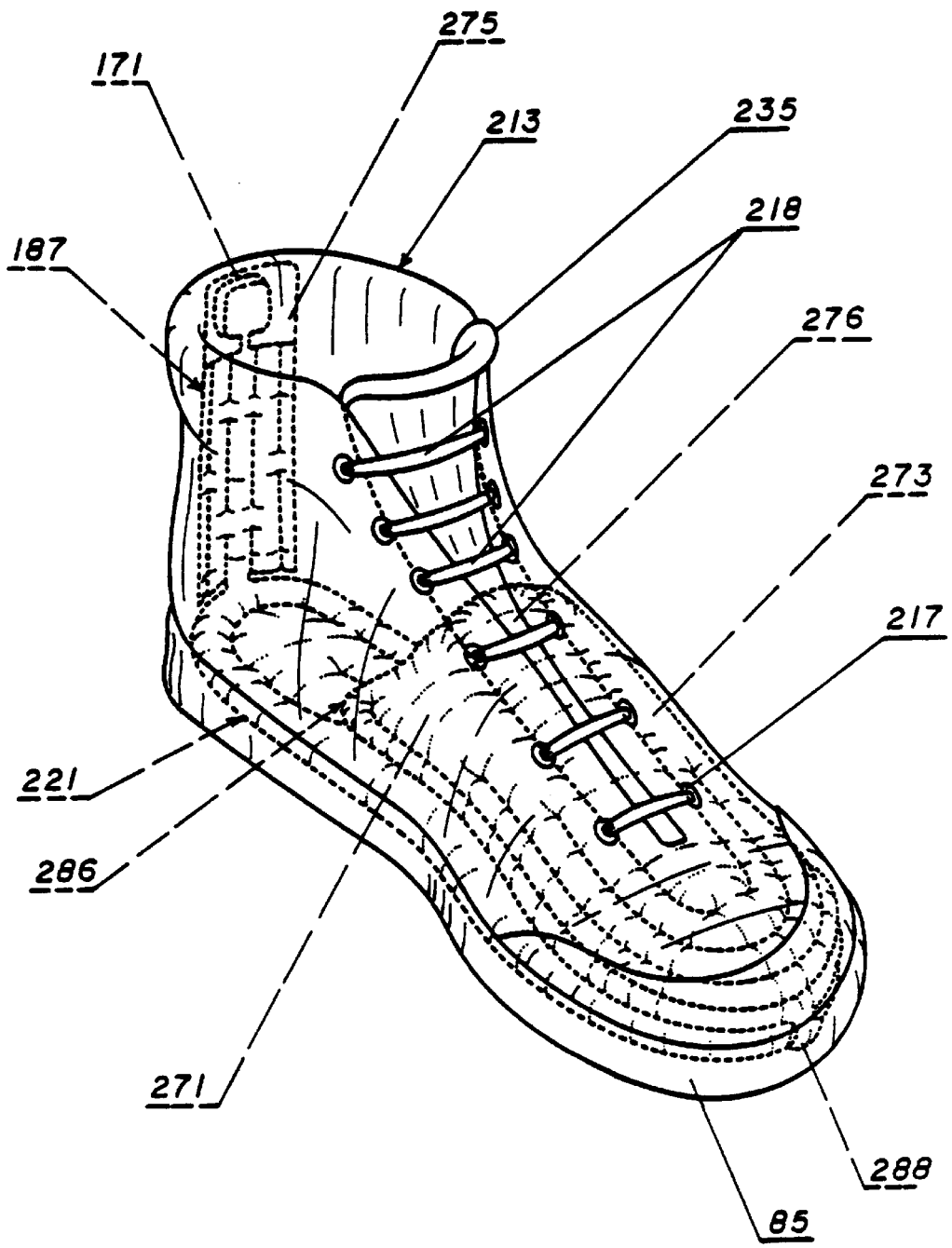
FIG. 59 is a perspective view of a shoe fitted with the lining of FIG. 58.

FIG. 59 illustrates the liner of FIG. 58 within shoe 213. The air pump 171 is supported at the upper edge of the heel of the shoe, and for clarity of the illustration, the inlet and relief valve are omitted from the drawing. The shoe has conventional lacing 218 through eyelets 217 and an outer sole 85. The medial support pillow 271 lies along the medial side and top of the shoe, and the lateral support pillow 273 is in the same position on the opposite side of the shoe. The support pillow 276 underlies the lower portion of the tongue 235 of the shoe, and preferably is bonded or sewn to the tongue 235. The air passageway 288 is shown at the most forward toe end of the inner sole.

Figure 60:
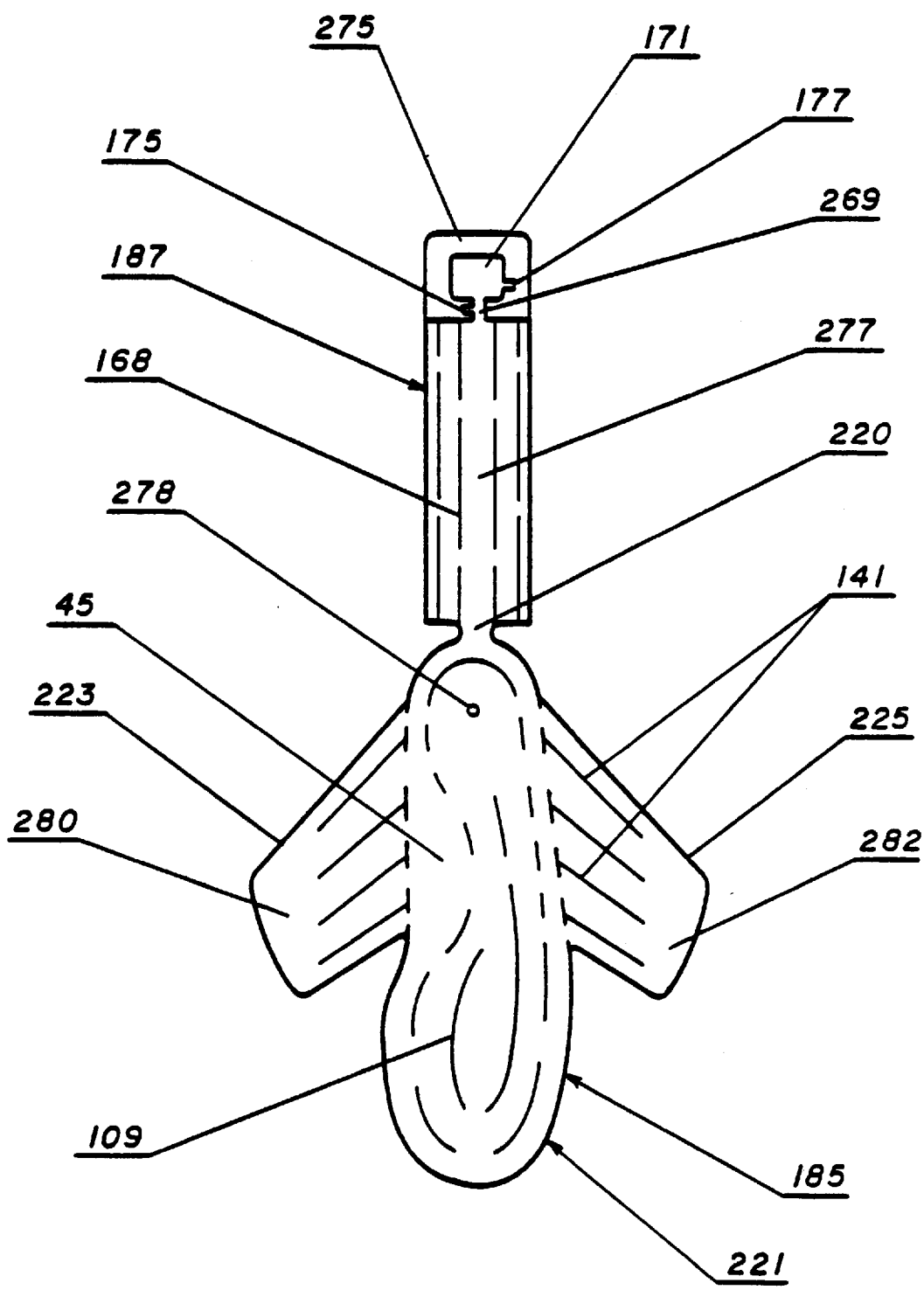
FIG. 60 is a plan view of an alternative lining to that shown in FIG. 58.

FIG. 60 illustrates another liner 185 which has a heel flap 187 with an air pump 171, all as previously described with reference to FIG. 58. The inflatable inner sole 221 has medial inflatable flap 223 and a lateral inflatable flap 225 which are formed by coextensive flaps of the first and second sheets which are seamed together about their peripheries to provide sealed interior chambers. The flaps have a plurality of discontinuous seams 141 which form tubular passageways, and which terminate short of the ends of the flaps to provide pillows, or air bags, 280 and 282. Preferably the peripheral seam about the inner sole 221 is open to each of the tubular passageways of the medial and lateral flaps to provide air communication. The size of the openings between the inner sole 221 and the air bags 280 and 282 can be varied to provide restrictive flow orifices and thereby provide control over the rate of pressure equalization between the inner sole 221 and air bags 280 and 282. Also, the heel of the inner sole can have a centrally located circular seam 278 to enhance the support and stability of the heel pillow.

Figure 61:
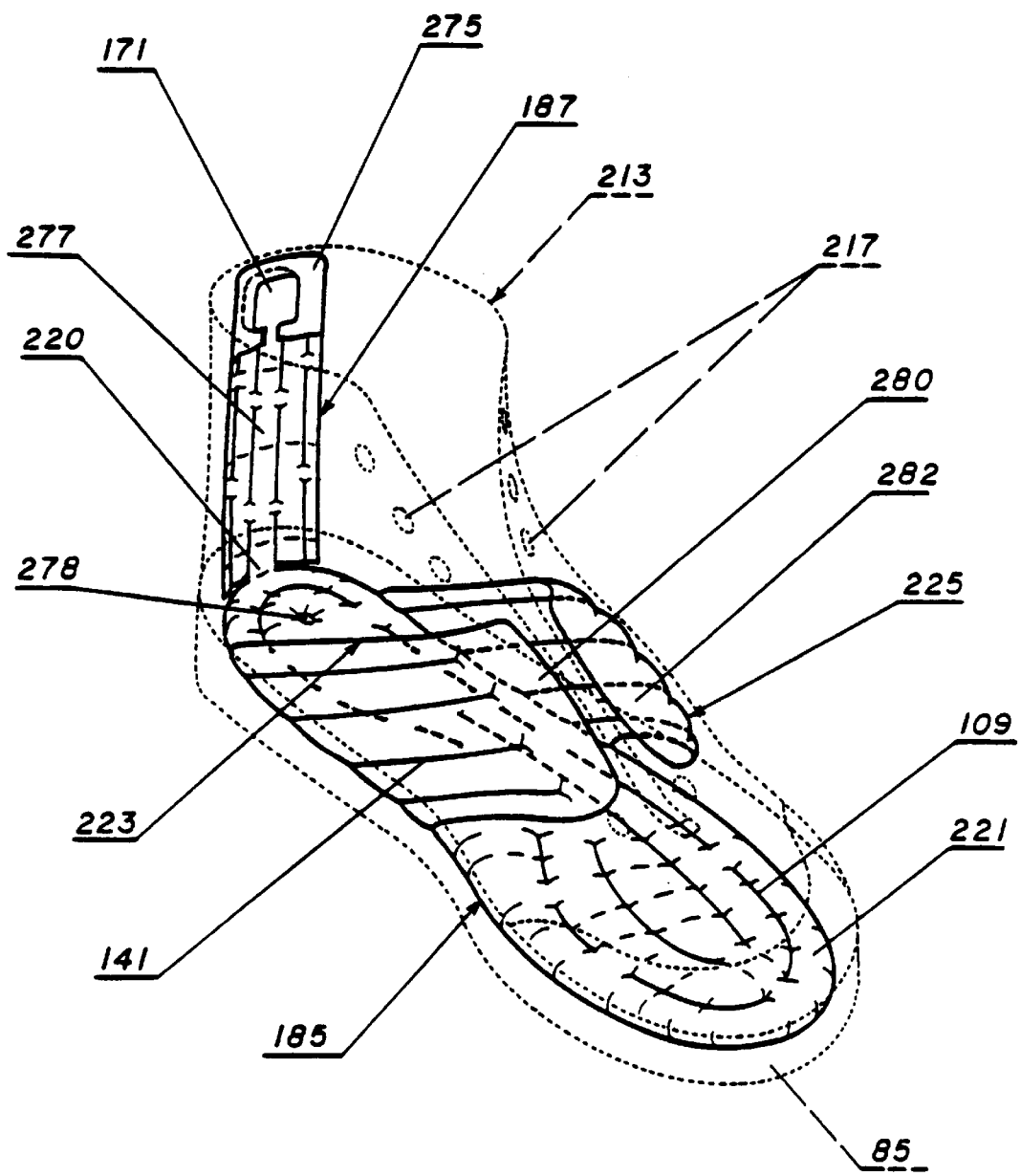
FIG. 61 is a perspective view of a shoe, in phantom outline, fitted with the lining of FIG. 60.
Figure 62:
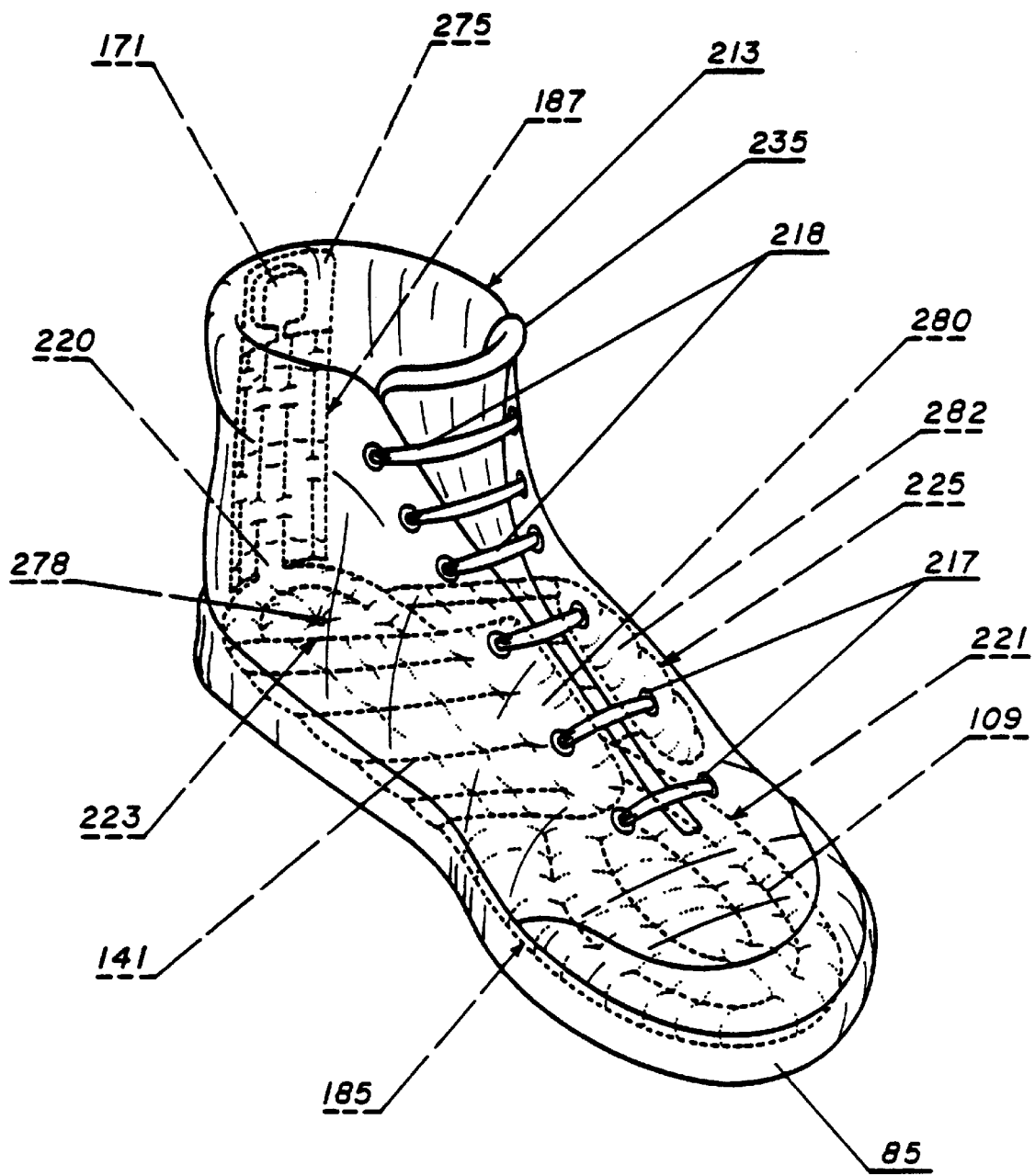
FIG. 62 is a perspective view of the shoe, in solid lines, and liner shown in FIG. 61.

Referring now to FIGS. 61 and 62, the liner 185 of FIG. 60 is shown within a shoe 213. The shoe is outlined by phantom lines in FIG. 61 and is shown in solid lines in FIG. 62. The shoe 213 is as previously described with eyelets 217 and an outer sole 85. The medial flap 223 extends upwardly along the medial side of the shoe, with the medial pillow 280 beneath the medial vamp of the shoe 213. The lateral flap 225 extends similarly on the lateral side of the shoe. The pillows 280 and 282 provide support and an adjustable tightness to the lacing, all controlled by the air pump 171 and its associated manual relief valve 175 (shown in FIG. 60).

Figure 63:
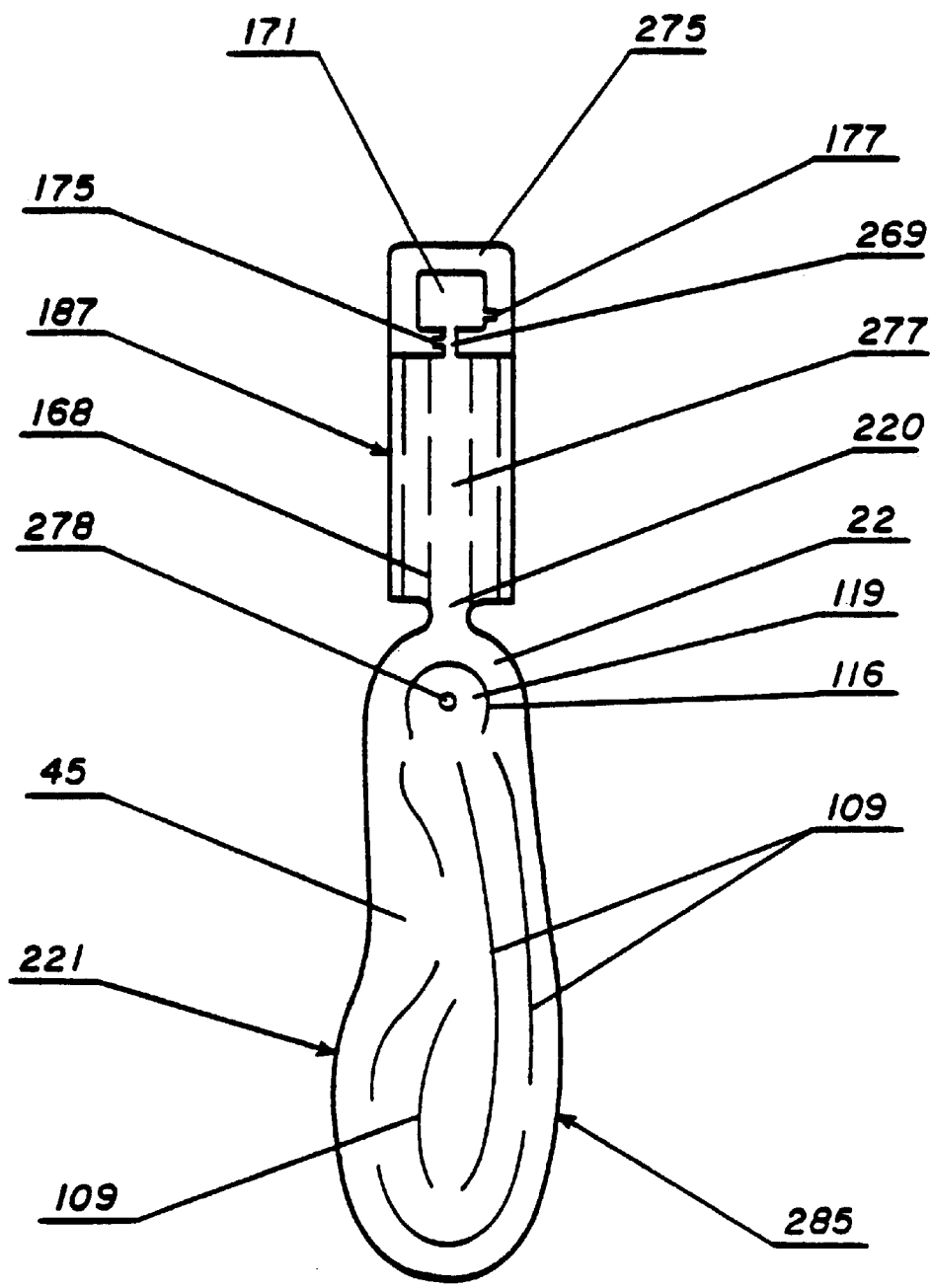
FIG. 63 is a plan view of an alternative inflatable inner sole.

FIG. 63 shows an inflatable liner 285 formed with an inflatable inner sole 221, a heel flap 187, and associated air pump 171 on base 275, all as previously described. The inflated inner sole 221 is attached at its heel end, to vertical heel flap 187 that has a sealed interior chamber with discontinuous seams 168 which form tubular passageways which communicate, at 220, with the sealed interior chamber of the inner sole 221. The base 275 of the heel flap 187 supports a flexible bulb air pump 171 with an air inlet 177 and relief valve 175. The pump discharges into the sealed interior chamber of the heel flap 187.

The inner sole 221 has a plurality of discontinuous seams 109, and preferably has an arch pillow 45 formed by an unseamed area between the first and second sheets. Preferably the heel of the inner sole is provided with a semicircular seam 116 that provides the circular air passageways 22 and 119, all as previously described with regard to FIG. 20.

Figure 64:
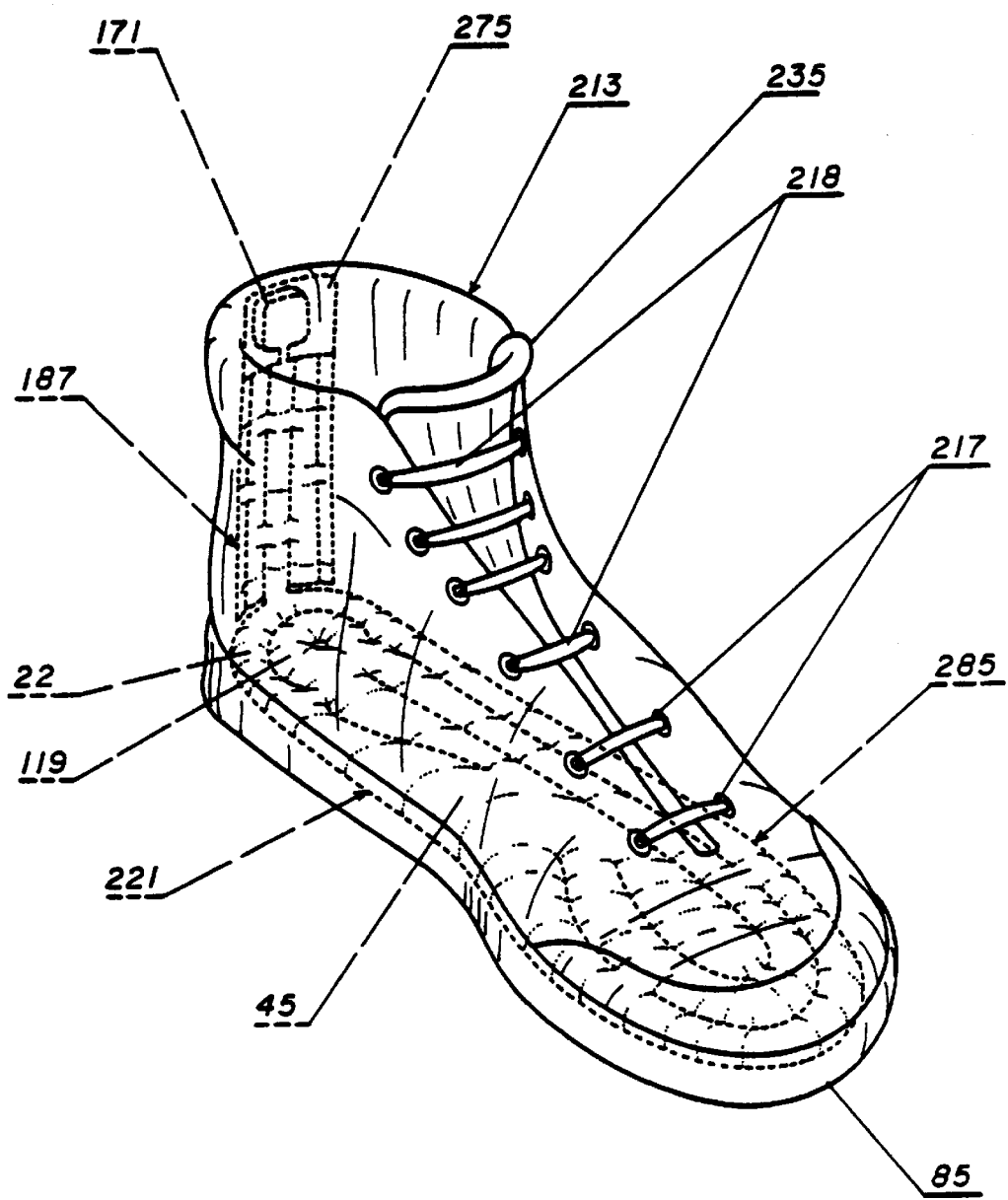
FIG. 64 is a perspective view of a shoe, in solid lines, fitted with the liner shown in FIG. 63.

FIG. 64 shows a shoe 213 which is fitted with the liner 285 shown in FIG. 63. The shoe is the same as previously described. The illustration shows the heel flap 187 in position along the upper portion of the heel of the shoe, and with the inner sole 221 resting on the outer sole 85.

Figure 65:
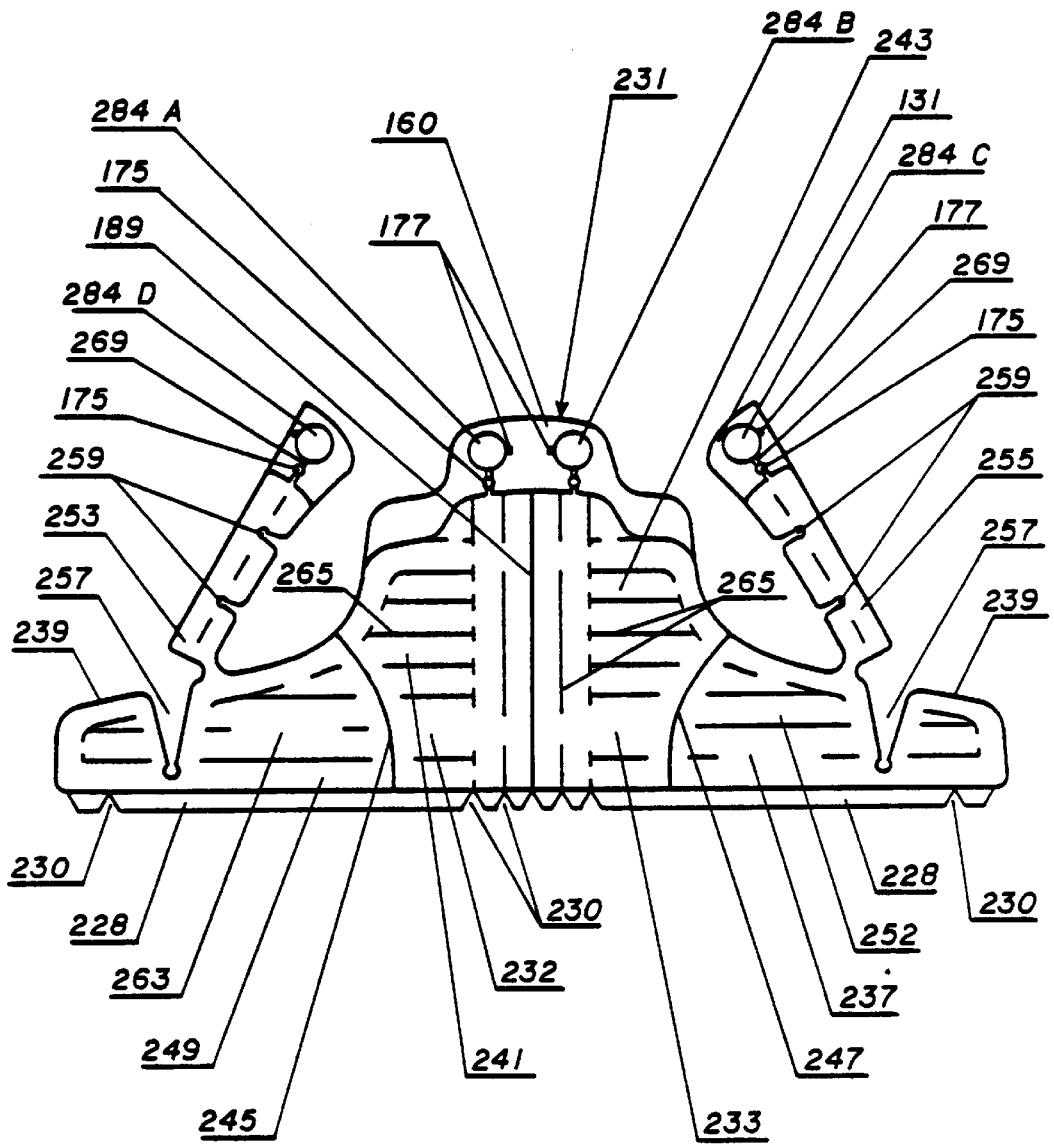
FIG. 65 is a plan view of an alternative inflatable upper liner with, a rear and medial and lateral inflatable chambers which provide linings for the upper inner surfaces of a shoe.

FIG. 65 is a plan view of an alternative lining 231 for the upper of a shoe, particularly an athletic shoe. This lining 231 has a base sheet 160 which can be either of the first and second sheets which is seamed to the periphery of the opposite and smaller sheets to form a sealed interior chamber. The lining 231 can be subdivided into medial and lateral side chambers by continuous vertical seam 189. The medial and lateral side chambers are further subdivided into heel side chambers 241 and 243 and forward side chambers 249 and 252 by continuous seams 245 and 247. All the side chambers have a plurality of horizontal discontinuous seams 265 which form air passageways. Air pumps 284a and 284b with air inlets 177 can be attached to the base sheet 160, preferably bonded thereto, and discharge into the sealed interiors of the chambers 241 and 243 of the lining 231. The pressure relief valves 175 are provided for control of the pressure in each chamber.

The heel portions 241 and 243 which overlie the heel are preferably unseamed at selected locations to provide heel pillows 232 and 233 on each side of the lining 231. Preferably the side portions also have discontinuous seams which form arch pillows 263 and 237 in preselected unseamed areas. Each forward portion of the inflatable lining is provided with a separate air pump 284c and 284d, and these pumps are supported on tongue base sheets 131, which extend from tongue flaps 255 and 253. The tongue flaps are formed by coextensive flaps of the first and second sheets which are seamed together about their peripheries to form sealed interior chambers into which each air pump discharges. Preferably, the tongue flaps 253 and 255 also have a plurality of notches 259 which are spaced along a side edge to provide flexibility to the flaps, when inflated.

Similarly, notches 257 are provided in the forward side chambers 249 and 252 to form toe chambers 239, and permit flexing of the lining 231.

The lining 231 has a continuous lower edge band 228 which is not inflated and which provides attachment to the shoe or sole of the shoe. Notches 230 can be provided in the edge band 228 to permit flexing of the lining to fit into a shoe.

Figure 66:
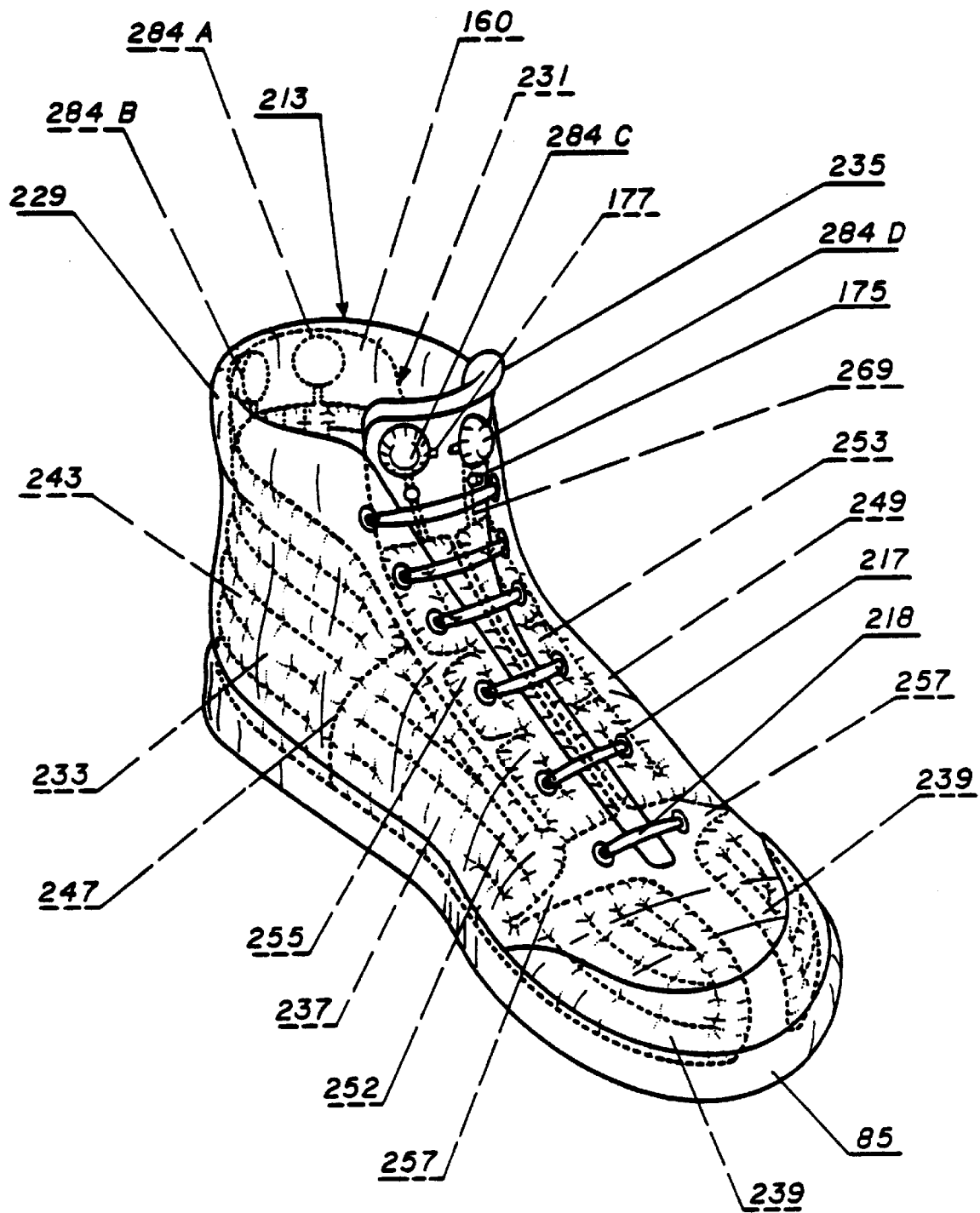
FIG. 66 is a perspective view of a shoe fitted with the upper lining shown in FIG. 65.

FIG. 66 illustrates a shoe 213 which is fitted with the lining 231 shown in FIG. 65. The shoe 213 is the same as previously described. As there illustrated, the air pumps 284a–284d are located externally of the shoe 213 on the upper ends of the tongue 235 and heel upper 229. The air inlets 177 can be inside the shoe, however, the pressure relief valves 175 are preferably outside the shoe to provide accessible exteriorly of the shoe 213. The lining 231 covers substantially the entire inner surface of the upper of the shoe and includes a toe lining 239 and the ankle pillows 232 and 233, and the side pillows 237 and 263. The tongue flaps 253 and 255 fold together and lie along the tongue 235.

Figure 67:
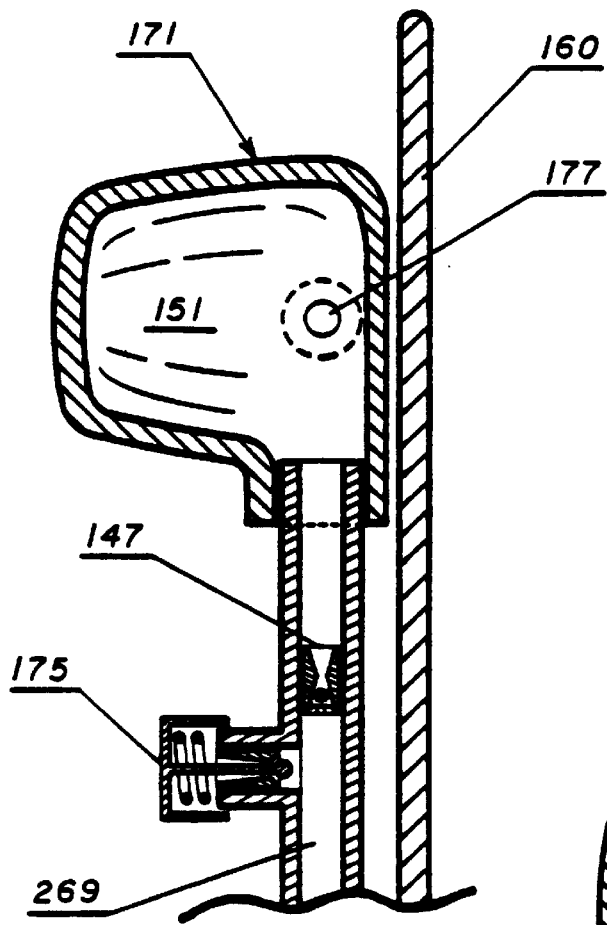
FIG. 67 is a sectional elevational view of an air pump used in the invention.

Referring now to FIG. 67, the air pump 171 is illustrated. The air pump is formed of a resilient, compressible bulb 151 which has an inlet which is closed with an inlet check valve 177. The bulb is supported on a base sheet 160, and has its mouth about the end of flexible tube 269 which contains a discharge check valve 147, thereby forming an air pump. A pressure relief valve 175 is provided in a branch of the tube 269. This relief valve has a valve operator which is biased into a normally closed position by an internal spring, and includes a button which can be depressed to open the valve against the force of the spring. In the drawing, the valve member is shown slightly open or apart from its valve seat for illustration purposes.

Figure 68:
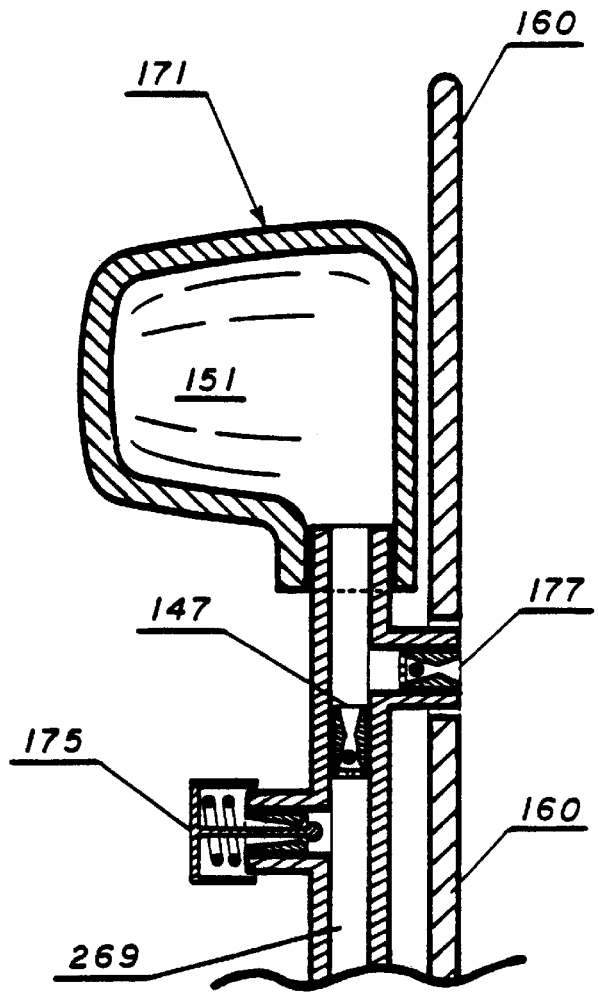
FIG. 68 is a sectional elevational view of an alternative air pump for use in the invention.

FIG. 68 illustrates another configuration of the air pump 171 in which the inlet check valve 177 is located in a branch of the tube 269, immediately upstream of the discharge check valve 147. In this configuration, the branch tube containing the inlet check valve 177 can extend through the supporting base sheet 160, or alternatively, can be directed beside sheet 160. It is understood that check valves of other construction than that shown by valve 177 can be used, e.g., duckbill type valves such as manufactured by Verney Laboratories, Inc., of Yellow Springs, Ohio, or, alternatively, flapper valves.

Figure 69:
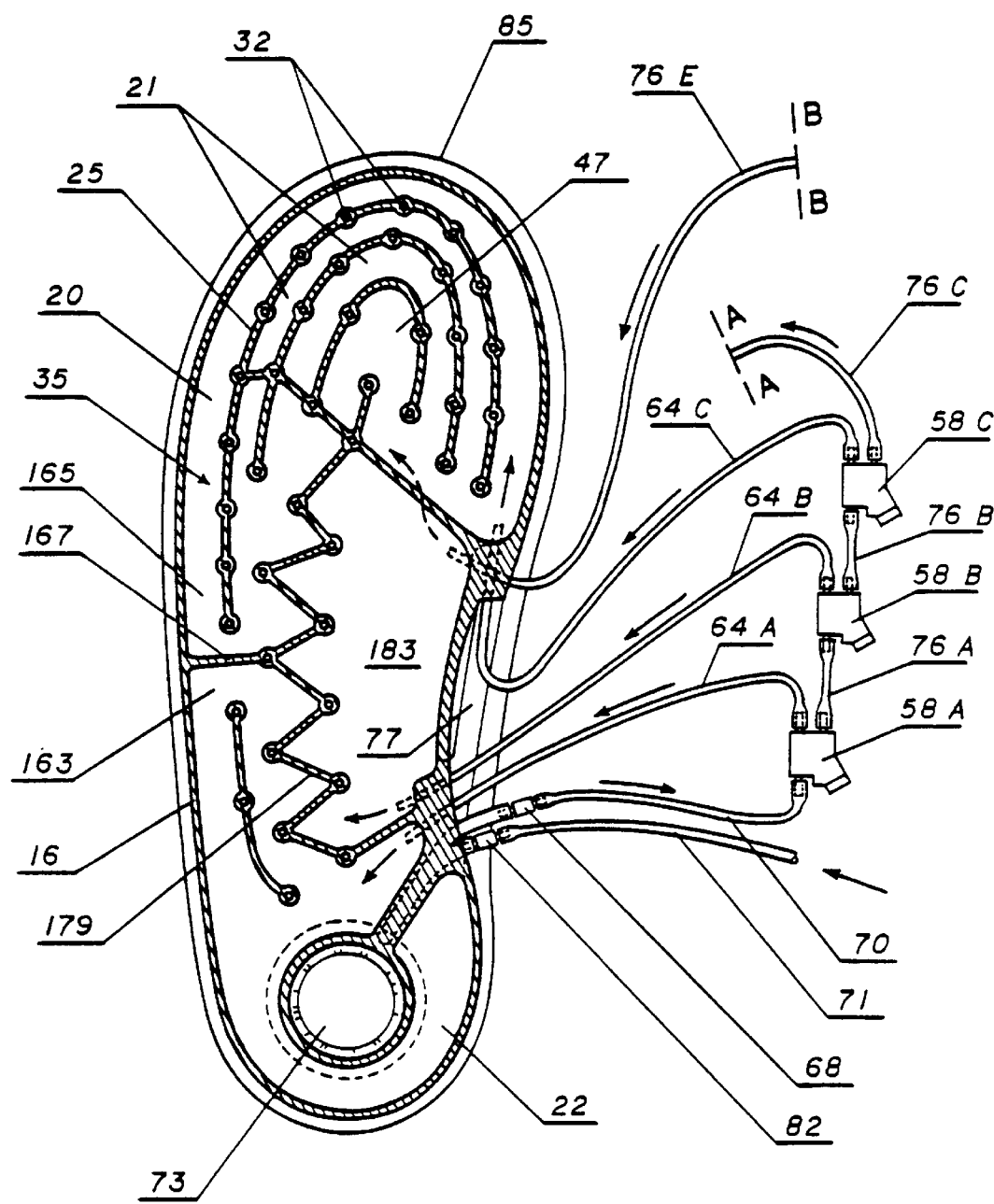
FIG. 69 is an assembly view of an embodiment of the invention showing an inflatable inner sole in plan view as having several chambers and an air pump in the heel of the inner sole, with separate pressure control valves for each chamber.

Referring now to FIG. 69, there is illustrated an inflatable inner sole 35 which has multiple, independent chambers which are a rear chamber 163; an arch chamber 183, and a toe chamber 165. The liner also has an air pump 73 which is located at the heel of the inner sole, similar to that shown in FIG. 52. The independent chambers are formed by interconnecting through seams 179 and 167 which extend from the continuous peripheral seam 16. Seam 179 extends from the peripheral seam 16 to enclose the arch area of the inner sole 35 to provide for an independently adjustable chamber 183 which functions as an arch pillow.

Figure 70:
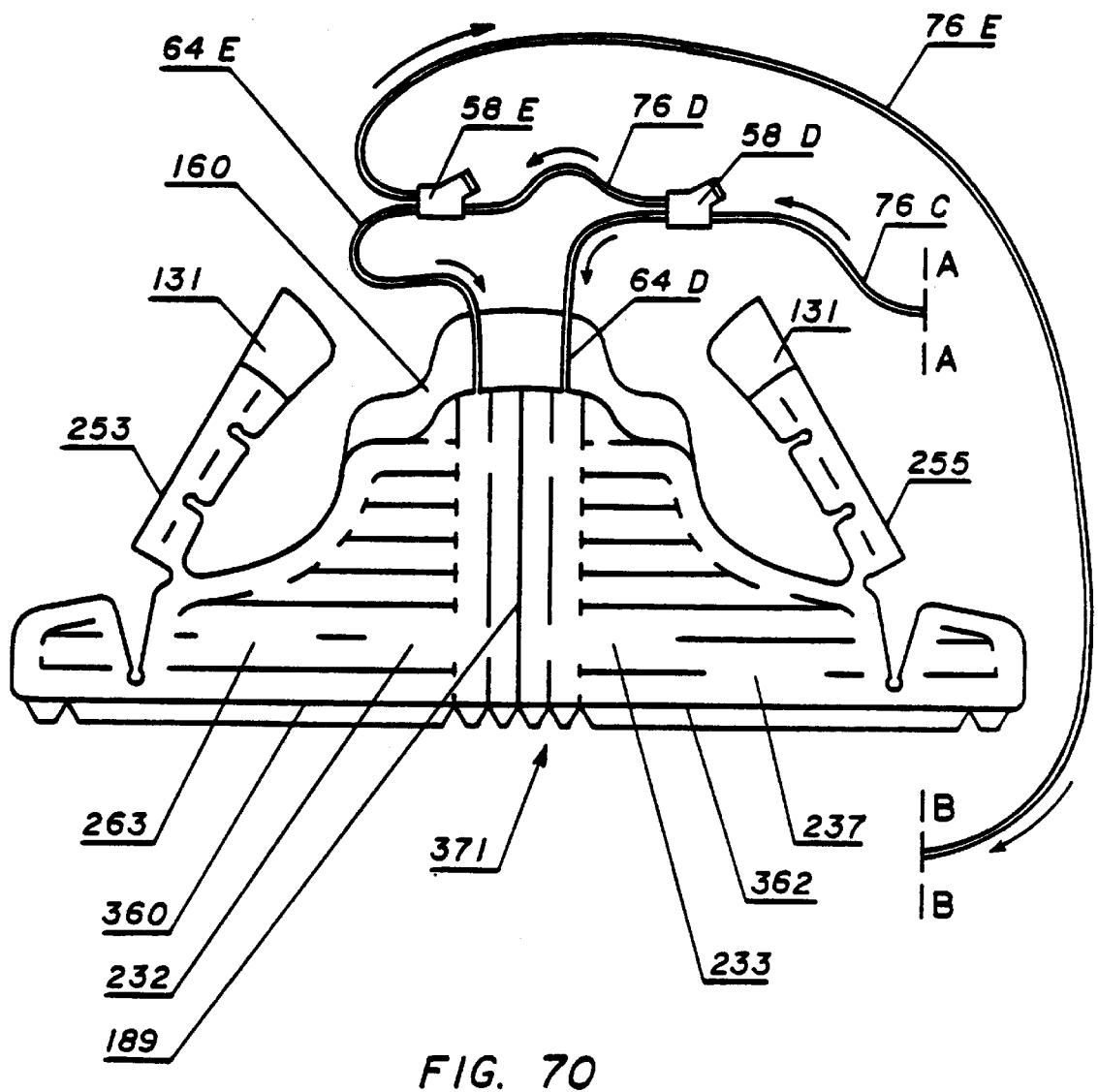
FIG. 70 is a view of an upper liner for footwear which has two chambers, each with a separate pressure control valve.

Fresh air is drawn into the air pump 73 through tube 71 having a check valve 82, and pressured air is delivered from the air pump 73 through tube 70 having check valve 68. Tube 70 connects to the first pressure control valve 58a of a series of pressure control valves 58a through 58e (valves 58d and 58e are shown in FIG. 70). These valves are the same as valve 58 shown in FIGS. 10–12. The controlled pressure port of valve 58a is connected to chamber 163 of the inner sole through tube 64a, and the relief port of valve 58a is connected to the next valve 58b of the series of pressure control valves by tube 76a. The controlled pressure port of this valve is connected to the arch chamber 183 by tube 64b and the relief port of this valve is connected to the next valve 58c by tube 76b. The controlled pressure port of valve 58c is connected to the toe chamber 165 by tube 64c and the relief port of valve 58c is connected to the upper liner 371 (shown in FIG. 70) by tube 76c, as indicated by break line A—A.

Referring now to FIG. 70, the upper liner 371 has a continuous vertical seam 189 at the heel to divide the liner 371 into a lateral side chamber 360 and a medial side chamber 362. This liner is similar to liner 231 shown in FIG. 65, and has the same elements such as the inflatable tongue halves 253 and 255, and inflatable ankle pillows 232 and 233. For simplicity of illustration, the seams are shown as single solid lines rather than the cross sectioned depiction used in FIG. 69 for seams in the inner sole. Also, apertures such as 32 shown for the inflatable inner sole 35, are not shown in the side lining, however, it is understood that such apertures can also be provided in this lining also, to facilitate air circulation throughout the entire footwear.

Pressure control valve 58d receives pressured air through tube 76c, as indicated by break line A—A. Valve 58d has its controlled pressure port connected to the medial side chamber 362 by tube 64d, and its relief port connected to the last valve 58e of the series of pressure control valves by tube 76d. Valve 58e has its pressure control port connected to the lateral side chamber 360 by tube 64e and its relief port discharges into tube 76e.

Tube 76e extends to the inflatable inner sole 35, as indicated by break line B—B. Referring now to FIG. 69, tube 76e is connected to the air channels beneath the inner sole 35 to provide air circulation through the shoe and inner sole (apertures 32) in the manner described previously with reference to FIGS. 19–21.

Figure 71:
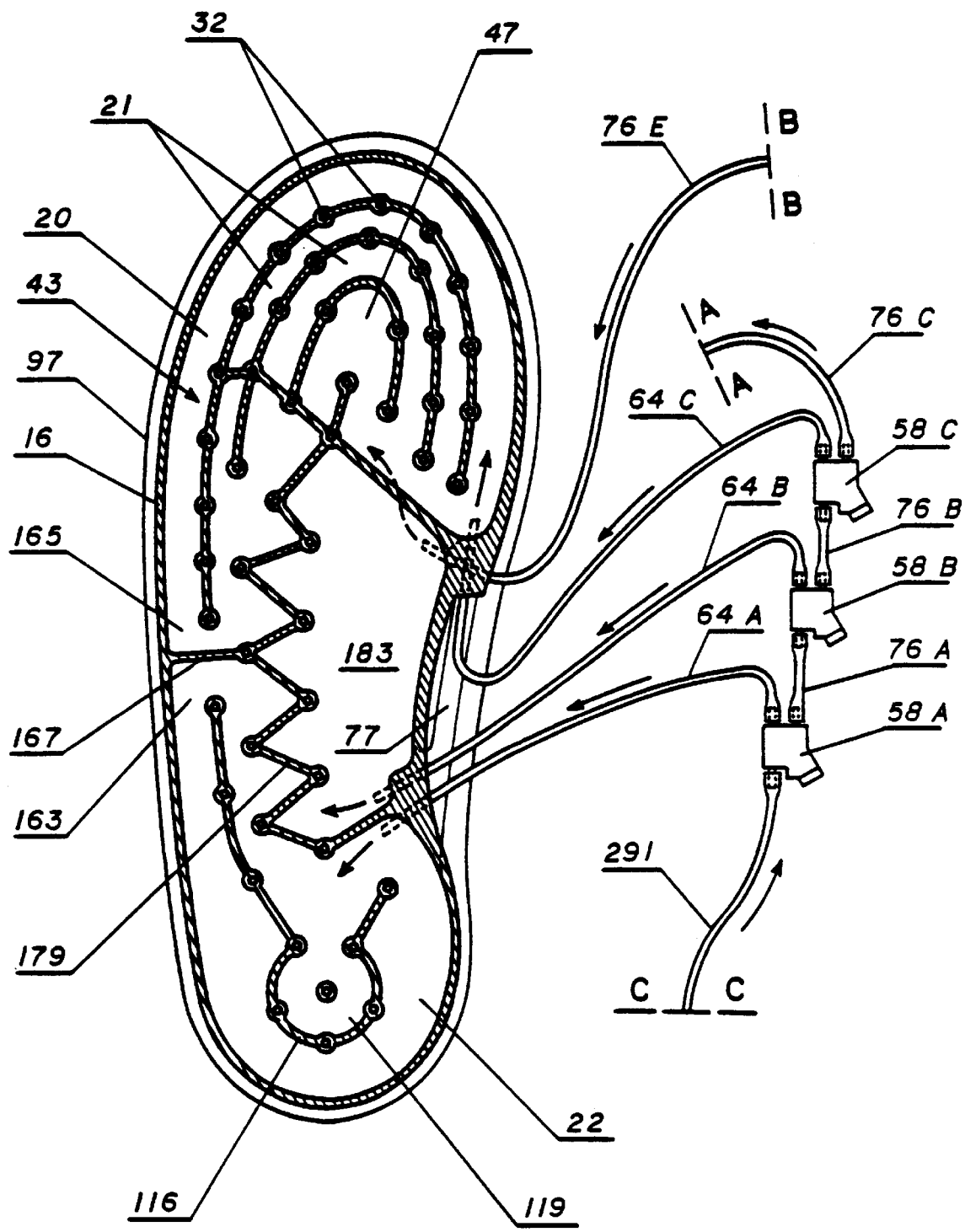
FIG. 71 is an assembly view of an inflatable inner sole shown in plan view similar to that of FIG. 69, but intended for use with a hand air pump.
Figure 72:
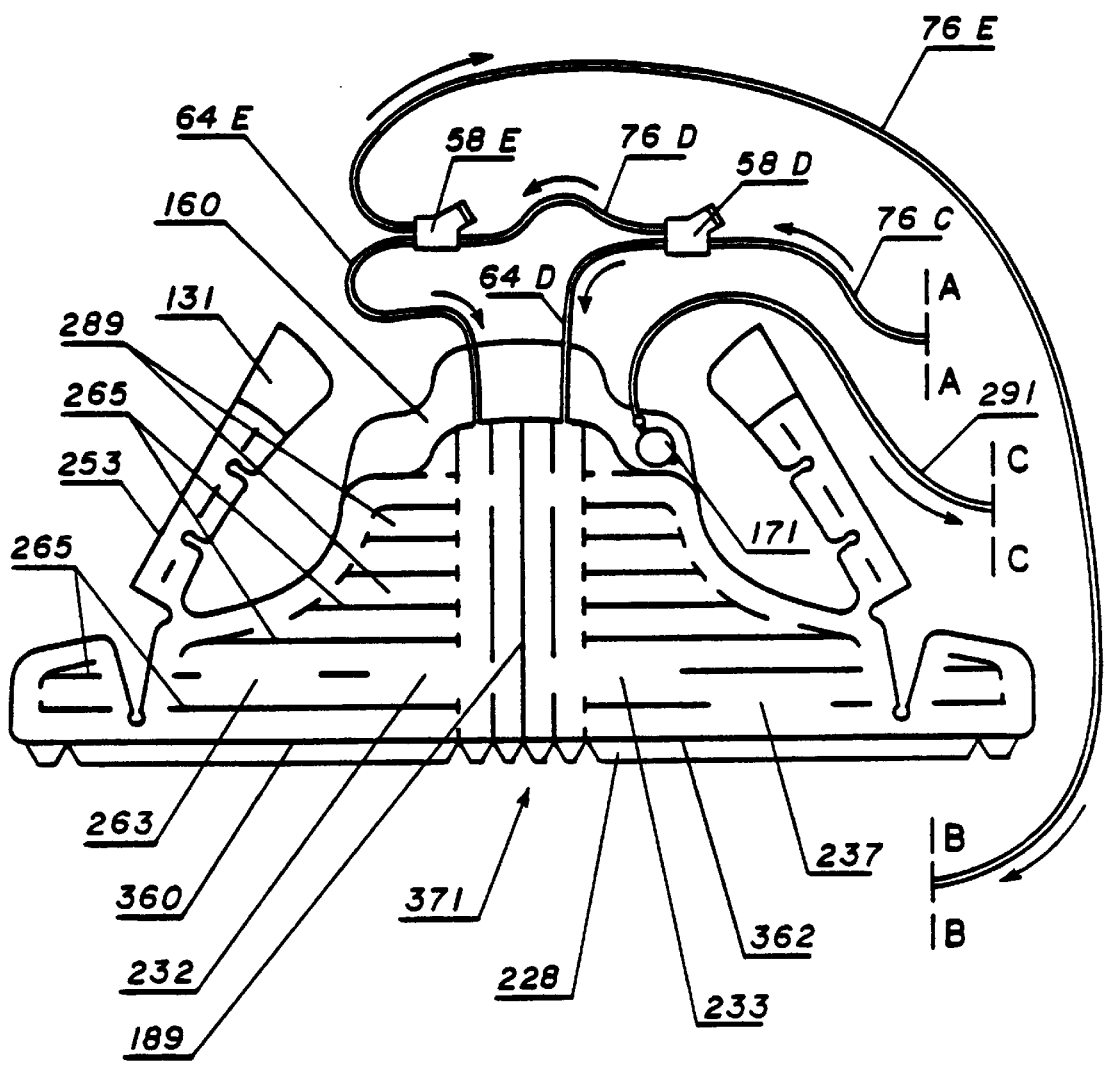
FIG. 72 is a plan view of an inflatable upper liner similar to that of FIG. 70 for use with a hand air pump.

Referring now to FIG. 71, an inner sole 43 is shown, resting on an outer sole 97 which is similar to outer sole 85 except it lacks provision for a heel pump. This embodiment is an alternative for the inflatable inner sole 35 shown in FIG. 69. This alternative inner sole 43 has a heel pillow 119 in the rear chamber 163, rather than the air pump 73 shown for inner sole 35 of FIG. 69. In this respect the inner sole 43 is similar to that shown in FIG. 53. The inner sole is used in combination with a hand air pump. The hand air pump can be mounted on the upper portion of an inflatable side lining, as shown in FIG. 72, which is a view of the same lining 371 shown in FIG. 70, except for the hand air pump 171 which is permanently secured to the upper base 160 of lining 371. Tube 291 extends from the hand air pump 171 to control valve 58a, as indicated by break line C—C. In all other aspects, the inflatable inner sole 43 is the same as inflatable inner sole 35, and the inflatable upper lining is the same as the inflatable upper liner 371 shown in FIG. 70.

Figure 73:
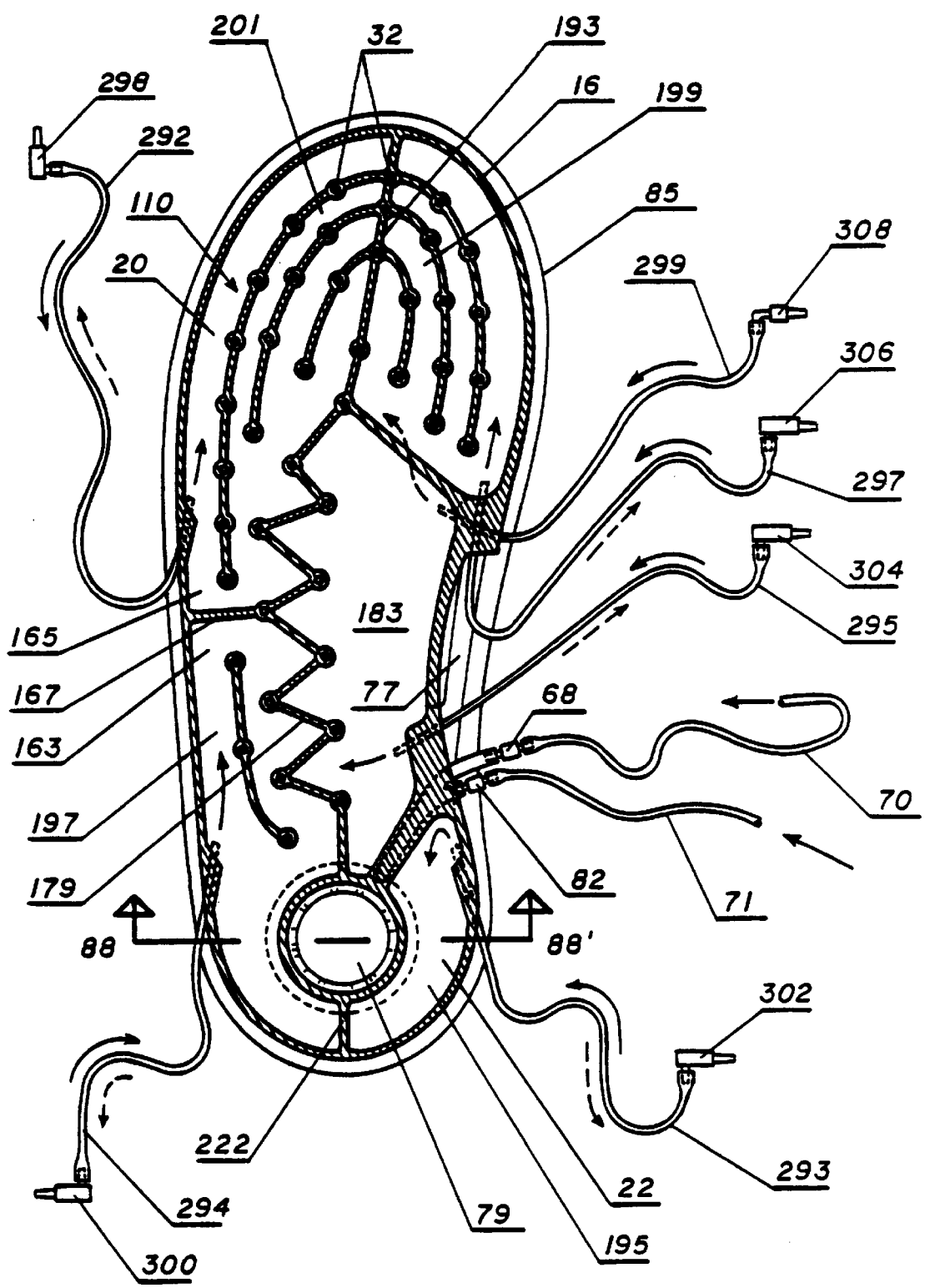
FIGS. 73 through 76 illustrate footwear with an inflatable upper liner and inflatable inner sole having an air pump in the heel, each with multiple chambers and a connector/pressure control valve shown in FIG. 76.
Figure 74:
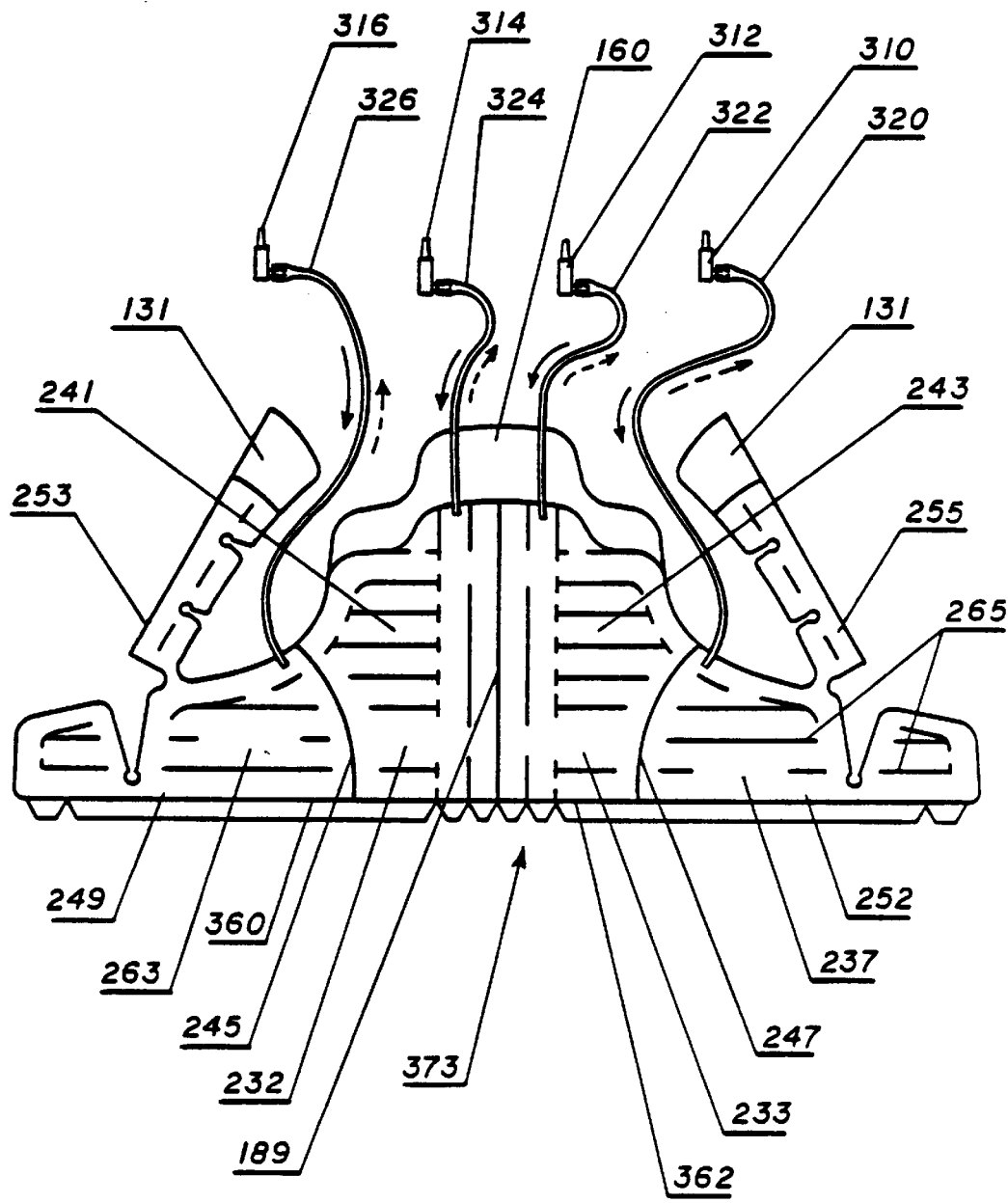
Figure 75:
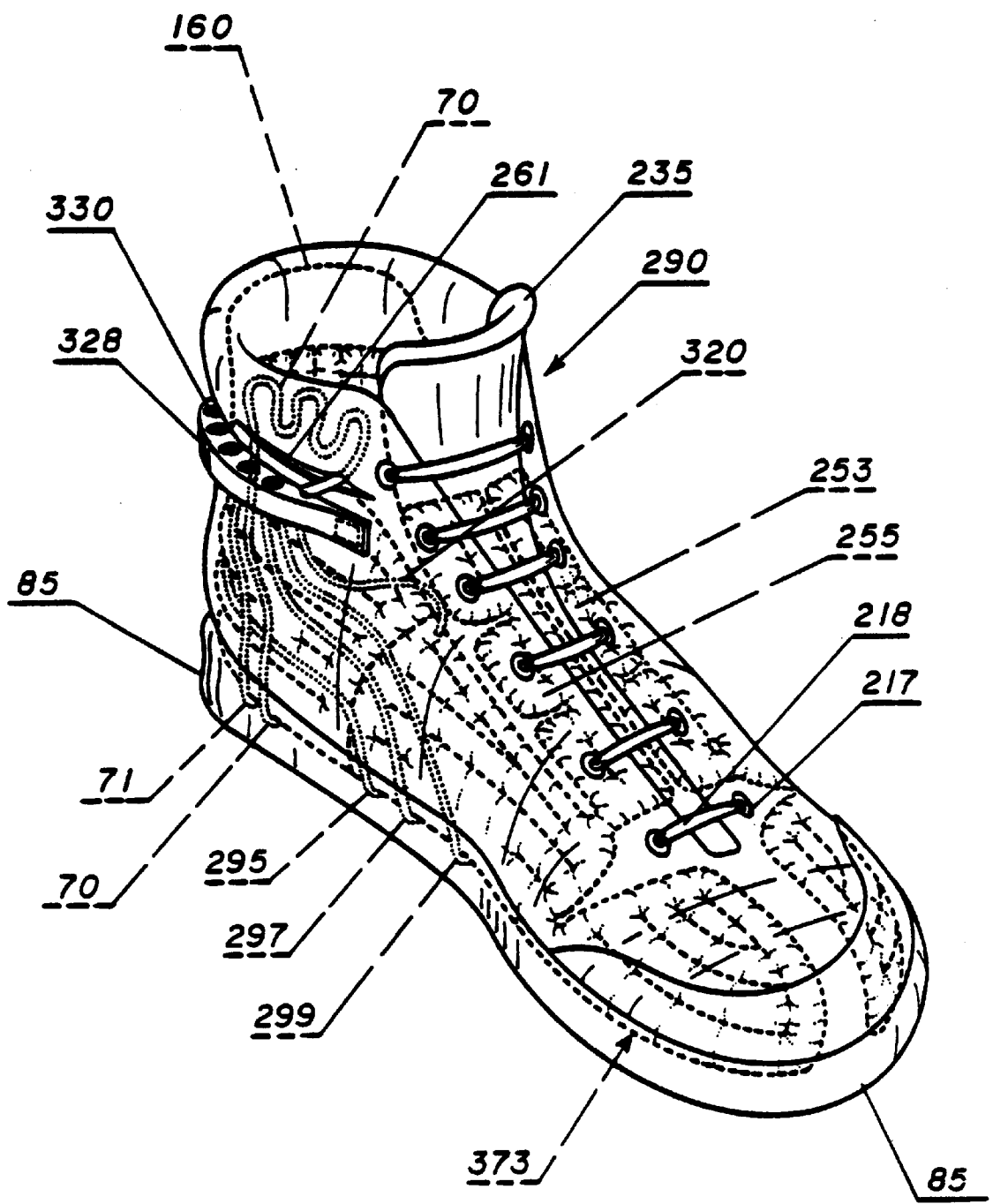

Referring now to FIGS. 73 through 76, a complete sport shoe 290 with inflatable liners of the invention is illustrated. The sport shoe is conventional in appearance with an outer sole 85, eyelets 217 and lacing 218, and tongue 235. The shoe 290 has an inflatable inner sole 110, which is shown in plan view in FIG. 73, and an inflatable upper liner 373 which is shown in FIGS. 74 and 75.

Figure 88:
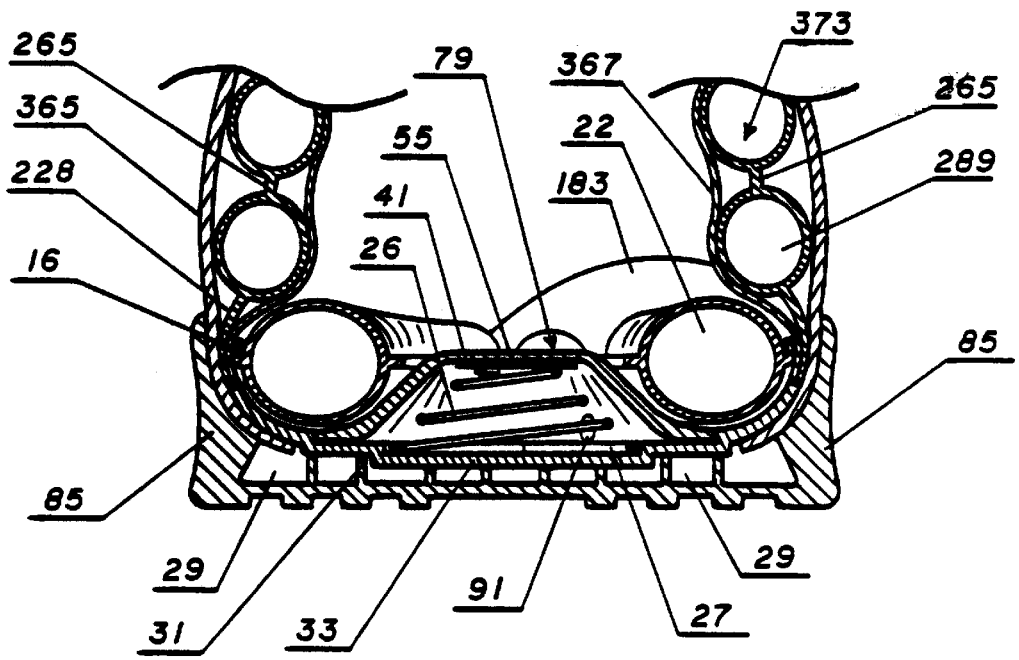
FIG. 88 is an elevational sectional view along line 88—88' of FIG. 73 illustrating in detail the air pump and inflatable inner sole and liner.
Figure 89:
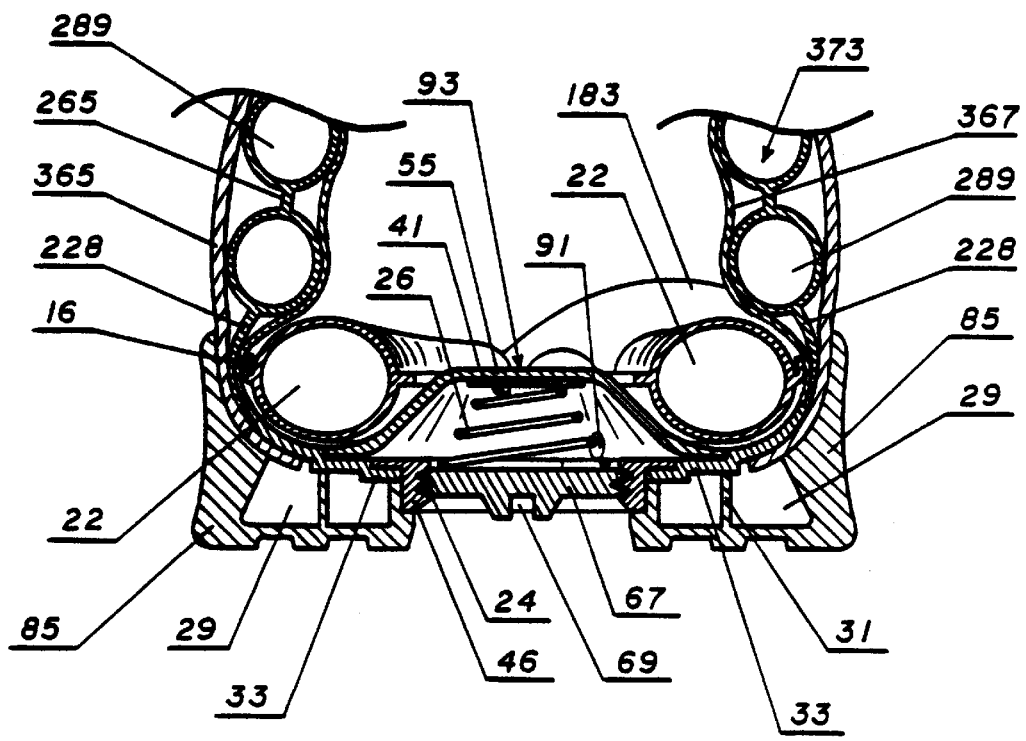
FIG. 89 is an elevational sectional view also along line 88—88' of FIG. 73 illustrating an alternative air pump to that shown in FIG. 88.

The inflatable inner sole 110 is subdivided into five interior chambers by continuous seams. Seam 179 surrounds the arch, forming arch chamber 183 and connects to seam 167 to divide the inner sole into front and rear portions 165 and 163. The rear portion 163 is subdivided by seam 222 into a medial heel chamber 195 and a lateral heel chamber 197. The front portion 165 is subdivided by seam 193 into a lateral toe chamber 201 and a medial toe chamber 199. As with the inner sole 35 shown in FIG. 69, an air pump 79 is located at the heel to provide a source of air under pressure for inflation of the chambers and to circulate air thorough the shoe. Sectional views through a typical air pump are shown in FIGS. 88 and 89. The air pump receives fresh air through tube 71 and its associated check valve 82 and discharges pressured air through check valve 68 and tube 70.

Tubes 70 and 71 are also shown in FIG. 75 as extending upwardly within the rear medial side of the shoe. Tube 71 terminates within collar housing 328. Tube 70 extends through a slit 261 in the outer wall of the shoe, with the slit providing an internal chamber within the wall of the shoe for storage of coils of tube 70. If desired, the edge of the slit could be closed with a zipper, or an elastic closure, or a Velcro closure (not shown).

Referring again to FIG. 73, each of the five separate and independent chambers of the inner sole is provided with a connector/pressure control valve and a connecting air tube. Arch chamber 183 has connector/valve 304 and tube 295; medial toe chamber 199 has connector/valve 306 and tube 297; lateral toe chamber 201 has connector/valve 298 and tube 292; lateral heel chamber has connector/valve 300 and tube 294; and medial heel chamber 195 has connector/valve 302 and tube 293.

Figure 76:
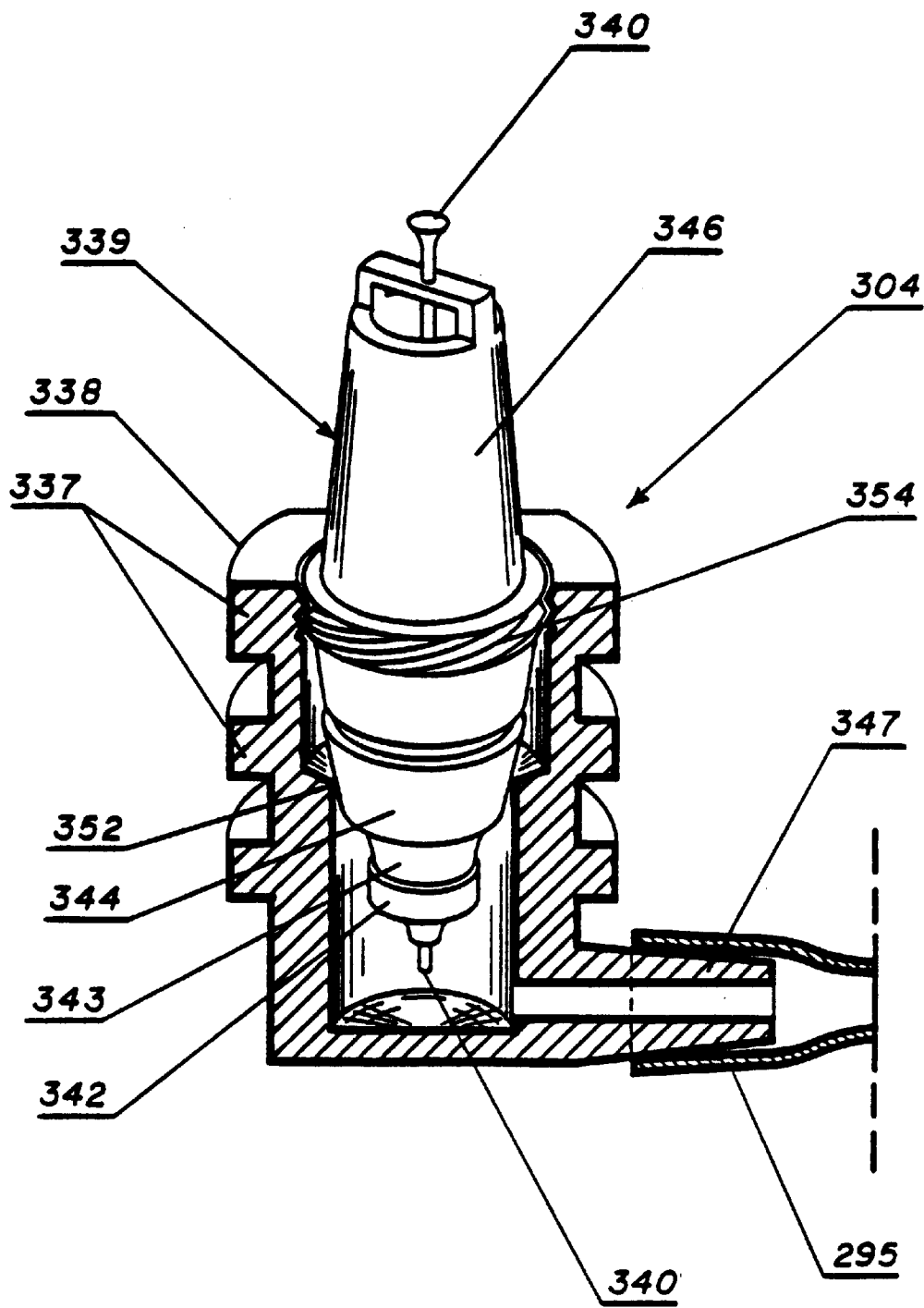

The structure of each connector/valve such as 304 is shown in detail in FIG. 76, which is a partial cross sectional view of the connector/valve 304. The pressure control valve 339 is a conventional inflation valve similar to valves available from Schrader Automotive Inc., Nashville, Tenn. 37202. This valve 339 has a valve member 342 which is resiliently biased into a closed position against the valve seat 343 by an internal spring (not shown). The valve member 342 is secured to a rod 340 which extends through the valve to an upper end 340 which serves as a valve operator to permit opening of the valve. The valve 339 has external threads 354 which are threadably received within a connector housing 338. The upper end or neck 346 of the valve 339 is conical to permit removable attachment of tubing. The lower end of the valve 339 has a rubber ring 344 which seats against internal shoulder 352 of the housing 338 for resilient sealing within the connector housing. The connector housing has a conical connector leg 347 to receive a tubing such as tube 295.

Referring again to FIGS. 73, 74 and 75, the discharge tube 70 from the air pump can be connected to any of the necks 346 of the connector/pressure control valve assemblies to permit a controlled pressurization of each of the individual chambers of the inflatable inner sole. To facilitate the connection by the wearer of the shoe, the connector/control valve assemblies are mounted within a collar housing 328 which has a plurality of circular wells 330 in which the connector/valve assemblies are mounted. The tube 70 has sufficient length to permit connection to each of the connector/valve assemblies and the excess length of the tube 70 is coiled within slit 261 in the shoe. As shown in FIG. 75, the tubes 295, and 297, which extend to chambers 183 and 199 are located in the upper medial side of the shoe.

FIG. 74 shows that the shoe 290 is also provided with an upper lining having a lateral side portion 360 and a medial side portion 362. This upper lining has four independent chambers which are formed by continuous seams 247, 189 and 245. The chambers are forward lateral and medial side chambers 249 and 252, rear lateral and medial side chambers 241 and 243. As with the embodiment shown in FIG. 65, the forward chambers are connected to inflatable half tongue liners 253 and 255.

Each of the independent chambers is provided with a connector/control valve assembly and connecting tubing. The forward lateral chamber 249 has connector/valve assembly 316 and tube 326; the rear lateral chamber 241 has connector/valve assembly 314 and tube 324; the rear medial side chamber 243 has connector/valve assembly 312 and tube 322; the forward medial side chamber 252 has connector/valve assembly 310 and tube 320. Tube 70, shown in FIGS. 73 and 75 can be connected to each of these connector/control valve assemblies to permit controlled pressurization of each chamber in the upper lining and in the inner sole.

Referring again to FIG. 73, the inflatable inner sole also has provision for circulation of air beneath and through the inner sole. The circulating air is provided by connecting tube 70 to the connector/valve assembly 308 which is connected to tube 299 (also shown in FIG. 75) that extends beneath the inner sole, discharging in the channels formed on the underside of the inflated inner sole which are vented through the inner sole by through apertures 32 spaced along the seams.

Figure 77:
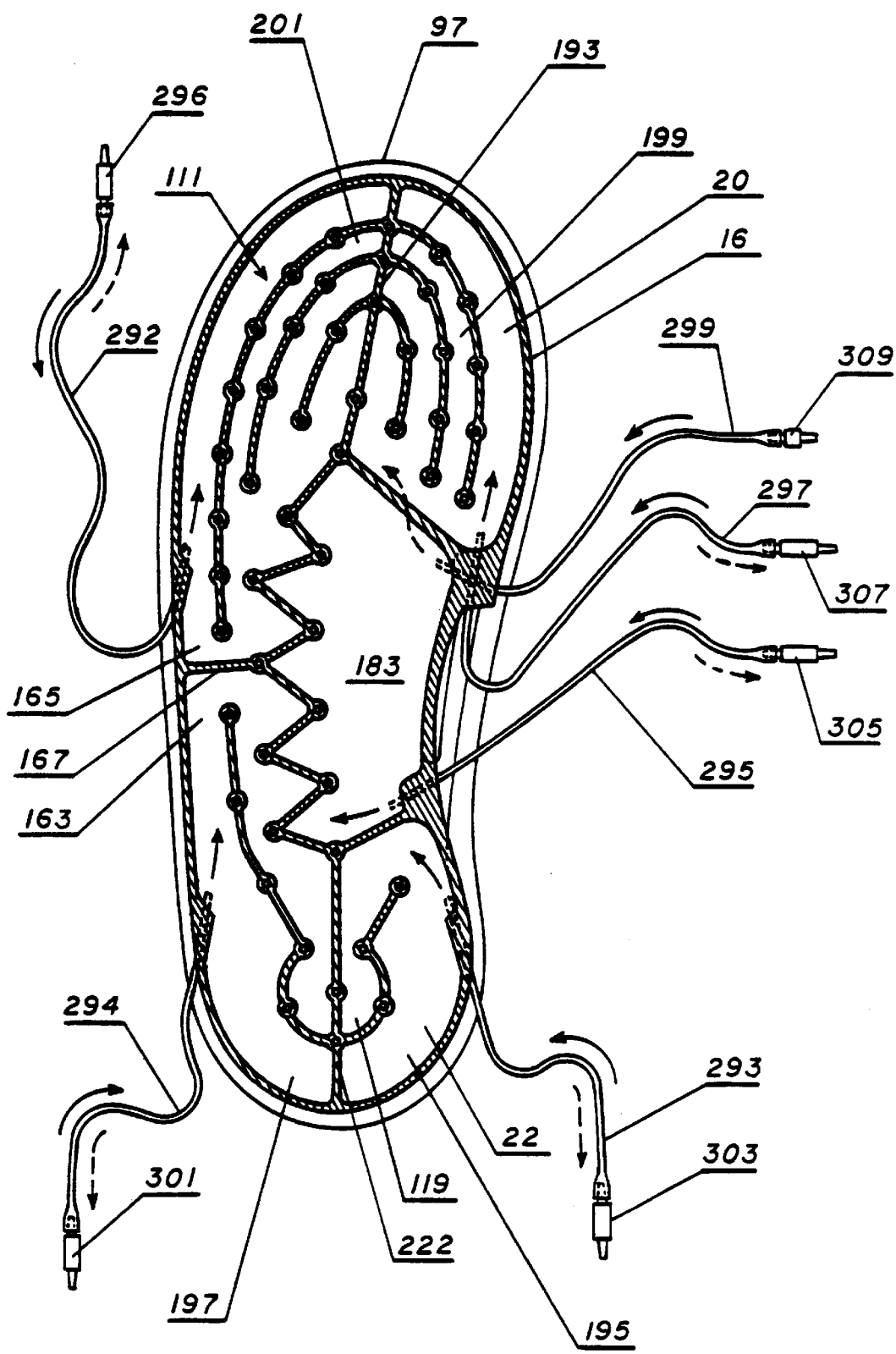
FIG. 77 illustrates an inflatable liner similar to that of FIG. 73 for use with a hand air pump.
Figure 78:
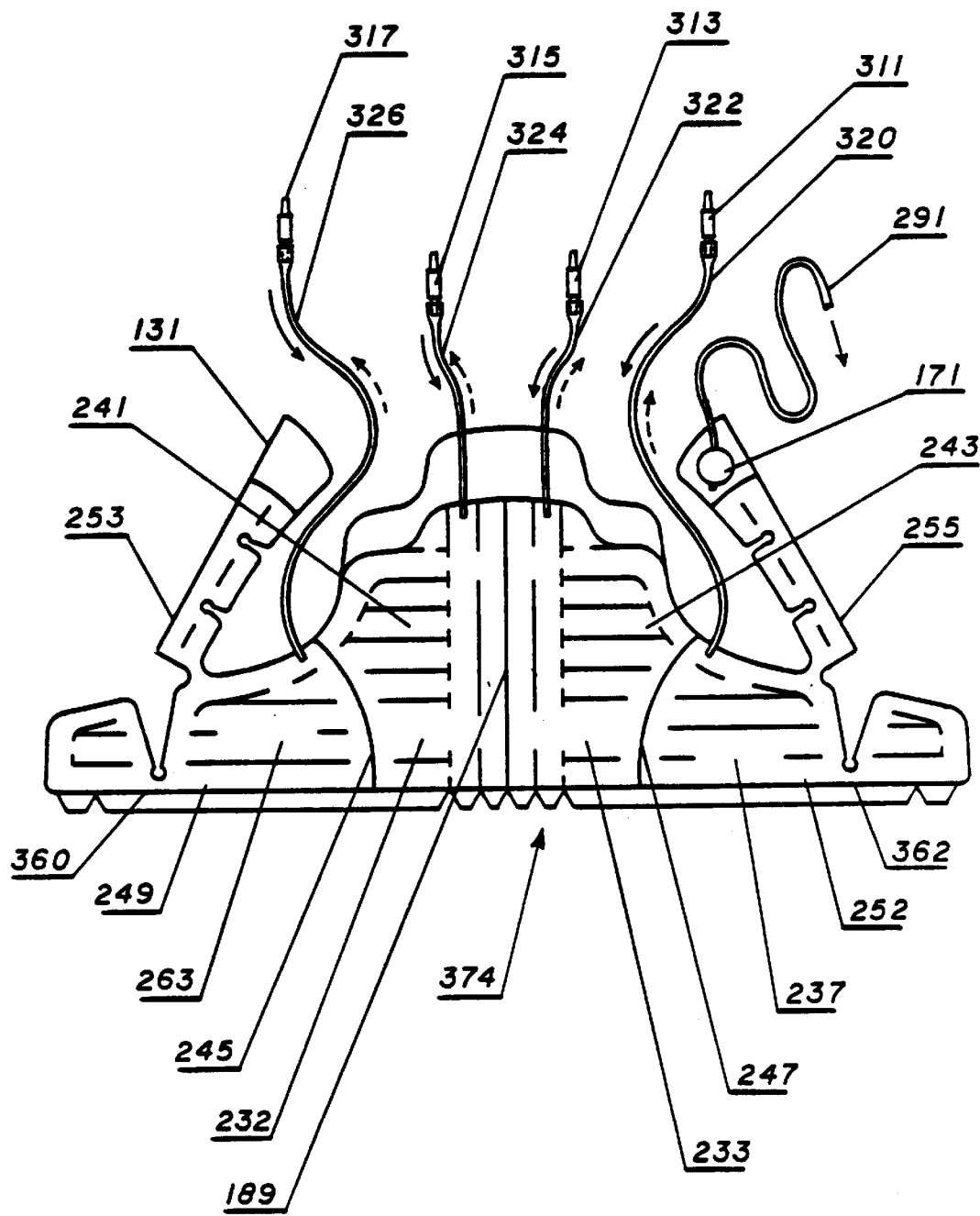
FIG. 78 is a plan view of an inflatable upper liner similar to those of FIGS. 70, 72 and 74 for use with a hand air pump.

FIGS. 77 and 78 illustrate an embodiment of the invention in which an inner sole 111 is shown as an alternative for the inflatable inner sole 110 shown in FIG. 73. This alternative inner sole 111 has a heel pillow 119 in the rear chamber 163, rather than the air pump 79 shown for inner sole 110 of FIG. 73. In this respect the inner sole 110 is similar to those shown in FIGS. 53, 54 and 71. The inner sole 111 is used in combination with a hand air pump. The hand air pump 171 can be mounted on the upper portion 131 of an inflatable tongue 255 or 253, as shown in FIG. 78, which is a view of lining 374. Tube 291 extends from the hand air pump 171 and can be connected to any of the connector/valves 311, 313, 315 and 317 of the upper lining 374, or to either of connector/valves 296, 301, 303, 305 and 307 or connector 309 of the inflable inner sole 111 (FIG. 77). If desired a slit can be provided in the tongue of the shoe such as tongue 235 (FIG. 75) to store the coiled tube 291, similar to slit 261 shown for storage of tube 70 in FIG. 75. The connector/valves shown in FIGS. 77 and 78 are essentially the same as those shown in FIGS. 73 and 74, except they are in line with the inlet and outlet ends being coaxial, rather than the right angle connector/valve structure shown in FIGS. 73 and 74. All tubes which extend from the connector/control valves to the chambers can be located between the inflatable lining and the outer upper of the shoe to avoid direct contact with the wearer's foot and thus avoid possible discomfort to the wearer.

The collar housing 328 is shown in greater detail in FIGS. 79 and 80. The collar housing is a C-shaped channel with apertures along its upper wall to form recesses 330. It is received about the rear upper portion of the shoe, as shown in FIG. 75 and can be permanently secured to the shoe by adhesive bindings 334, or alternatively by permanent stitching. FIG. 80 is a sectional view along line 80—80' of FIG. 79. It shows that the vertical wall 341 of the collar housing 328 has two horizontal internal ribs 329 which are received between the ribs 337 of the connector/control valve housing 338 (shown only in contour). FIG. 80 also shows the tube 70 as it is placed onto the conical neck of the control valve.

An alternative collar housing 332 is shown in FIGS. 81 and 82. In this embodiment, the collar has a tapered side wall 351 with inclined recesses 330. The collar housing 332 is permanently attached to the upper rear of the shoe with stitching 334. Permanent, adhesive cement could also be used. The connector/valve assembly 358 is substantially the same as shown in FIGS. 73 through 76 and 80, however, the leg 357 is coaxial with the conical neck 346, providing an in-line configuration for attachment of tubes. A connector tube such as 295 is permanently connected to leg 357, and the tube 70 is removably connected to the tapered neck 346 of the control valve. For this purpose, a conical connector sleeve 350 can be used, if desired. A collar housing the same as or similar to collar housing 328 and 332 can also be provided to receive valves 58 shown in FIGS. 69–72.

Referring now to FIG. 83, another housing for the connector/control valve assemblies is shown. This housing is adapted to be secured along the side of the shoe with adhesive or stitching strips 334. At its forward end, the housing can have an aperture 217 which serves as an eyelet for lacing, thereby also reinforcing the side of the shoe. The housing has a plurality of cylindrical sleeves which are connected in a side-by-side array, thereby forming wells 330 in which are mounted the connector/control valve assemblies 318, previously described. The housing can be made of flexible, hard rubber or plastic.

Figure 84:
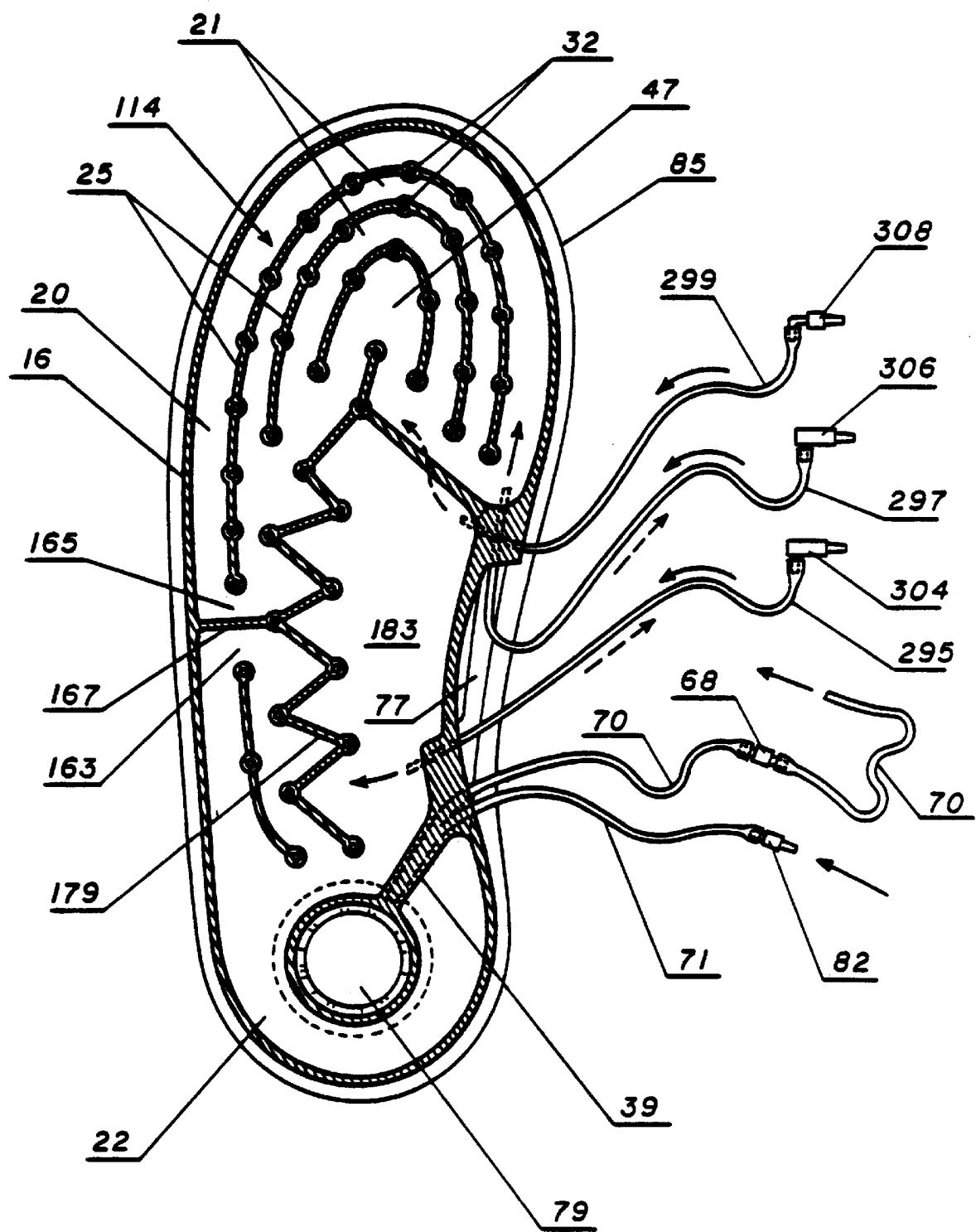
FIG. 84 is an assembly view of an embodiment of the invention showing an inflatable inner sole in plan view as having two chambers and an air pump in the heel of the inner sole, with separate pressure control valves for each chamber.

FIG. 84 illustrates an inflatable inner sole 114 which has only two separate chambers; forward chamber 165 and rear chamber 163. The rear chamber 163 is provided with a through aperture at the heel which is surrounded by a continuous seam to receive a heel air pump 79. The tubes extend through a channel formed beneath seam 39, from the air pump to the medial side of the inner sole. Tube 71 provides an air inlet to the pump through its check valve 82, and tube 70 provides an air discharge from the pump through its check valve 68. The check valves 82 and 68 can be placed in the channel 77 under the arch, as shown on FIG. 44. As illustrated, however, the check valves are installed in the tubes, remote from the inner sole to avoid any accidental contact of the valves with the wearer's foot. Preferably the valves 82 and 68 are mounted in the holder 328 shown in FIG. 75 in the same manner as described for the pressure control valves. Each of the chambers of the inner sole 114 has an independently controllable inflation system; connector/valve 304 and tube 295 communicate with the rear and instep chamber and connector/valve 306 and tube 297 communicate with the front chamber 165. The tube 70 can be connected to either of these systems to provide the internal pressure, or firmness desired by the wearer. Once the pressure is established as desired by the wearer in any chamber, the tube 70 can be disconnected and used to pressure the other chamber, or it can be connected to connector 308 which discharges into tube 299 that extends beneath the inner sole 114 to discharge air into the channels formed on the underside of the inner sole for circulation through the shoe. The rear chamber 165 provides stability to the footwear, as the support from the inner sole 114 is distributed evenly between the heel and arch of the wearer.

Figure 85:
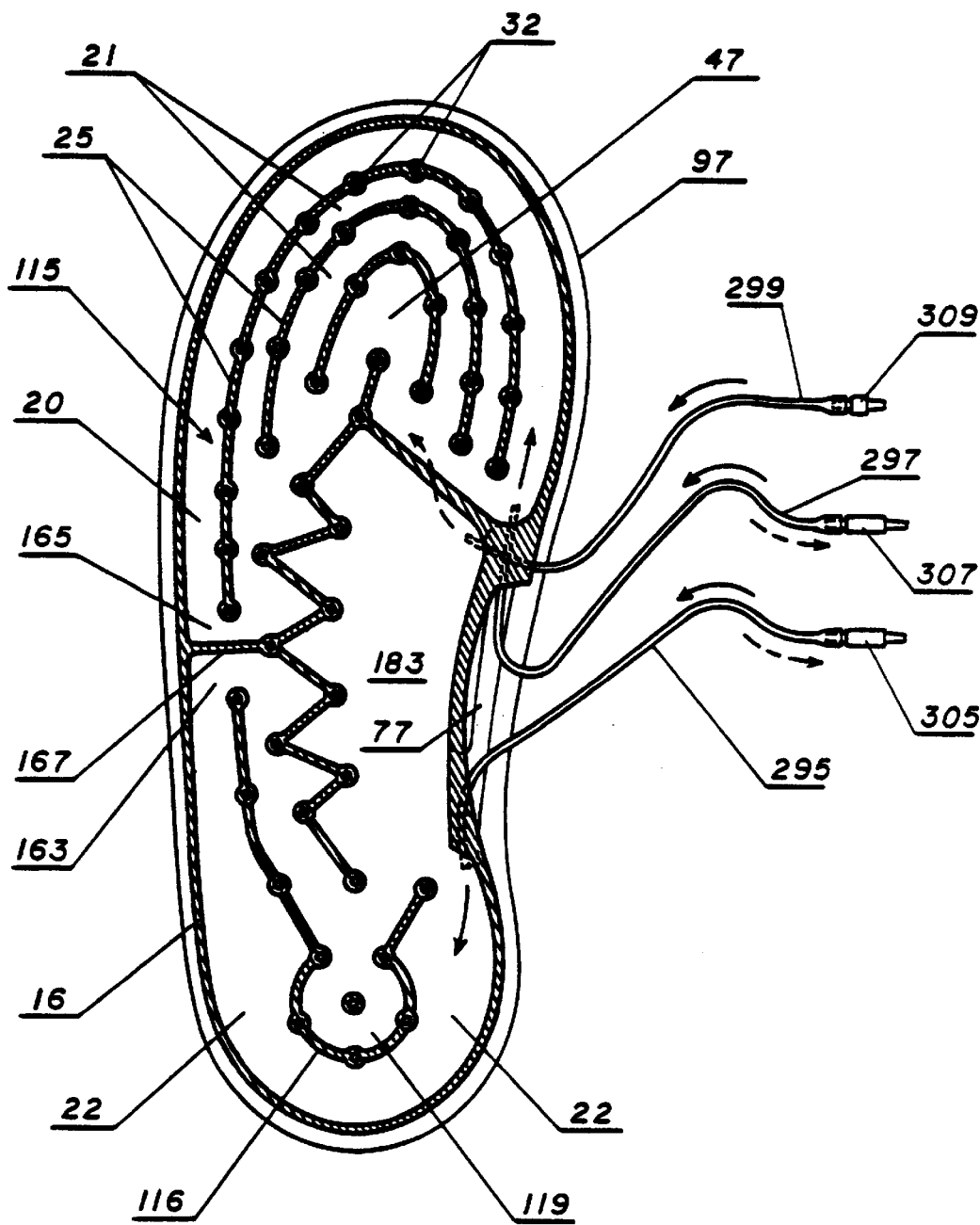
FIG. 85 is an assembly view of an inflatable inner sole shown in plan view which is similar to that of FIG. 84, but intended for use with a hand air pump.

FIG. 85 illustrates a two-chamber inner sole 115 which is essentially the same as that shown in FIG. 84, however, the heel chamber is modified to provide a heel pillow 119 in the rear chamber 163, rather than the air pump 79 shown for inner sole 114 of FIG. 84. In this respect the inner sole 115 is similar to those shown in FIGS. 53, 54, 71 and 77. The inner sole 115 is used in combination with an upper lining and a hand air pump such as shown in FIGS. 72 and 78.

Figure 86:
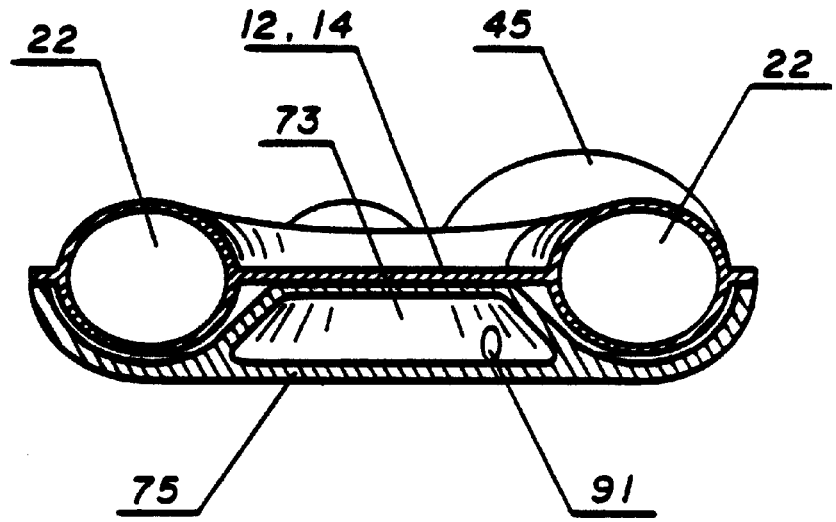
FIG. 86 is an elevational sectional view of an air pump alternative to that shown in FIG. 42, with the section line along line 42—42' of FIG. 40.

Referring now to FIG. 86, a heel air pump 73 is shown as received within the circular inflated passageway 22. This air pump is integral with the outer sole or underlayment 75. The air pump is similar to air pump 73 shown in FIG. 42, however, the upper sheet 12 and lower sheet 14 of the inner sole are bonded together and are not apertured, as in FIG. 42. Instead, the upper sheet of the air pump 73 underlies the bonded area of sheets 12 and 14 and preferably is glued or bonded to these sheets, so that the flexing of the sheets assists the return of the air pump. Port 91 which communicates with the external tubes containing the check valves, previously discussed is also shown in this view.

Figure 87:
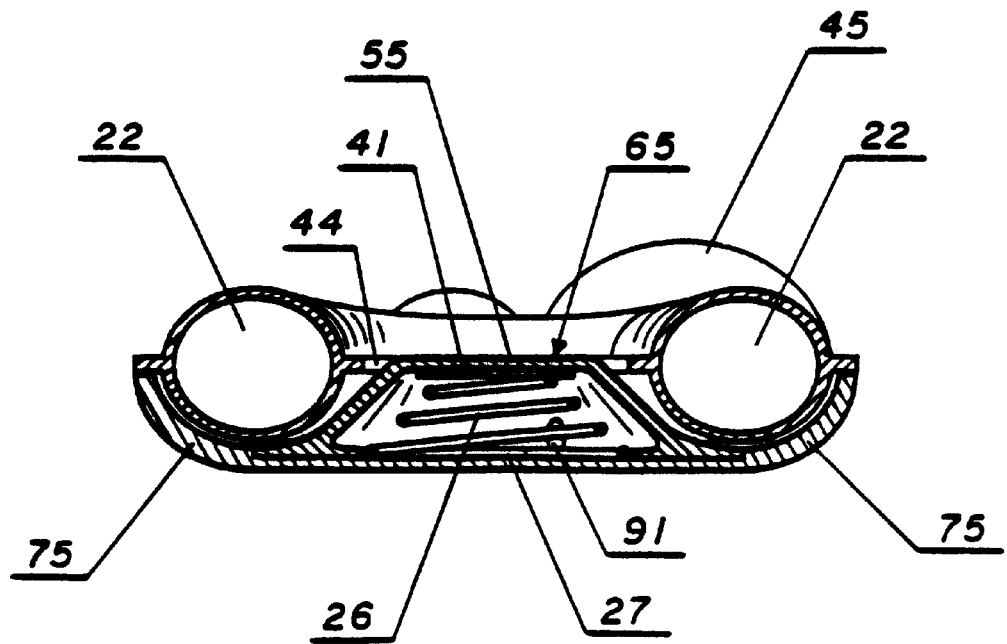
FIG. 87 is an elevational sectional view of another alternative air, pump to those shown in FIGS. 42 and 86.

FIG. 87 illustrates another embodiment of an air pump 65. In this embodiment, the inner sole is apertured, and the upper layer 55 of the air pump 65 extends through the aperture 44. The air pump is mounted in a circular recess 27 formed on the upper side of the underlayment 75, and is permanently bonded thereto. The air pump 65 can have an internal helical coil spring 26 which is biased against a plate 41 on the underside of the upper layer 55 of the air pump 65. The spring 26 assists the return of the air pump and increases its pumping action. Also, the spring also provides enhanced shock absorbency and resiliency to the footwear.

Referring now to FIG. 88, there is shown a sectional view through the heel of a shoe provided with an inner sole and upper lining of the invention. This view is located along a plane generally depicted by line 88—88' of FIG. 73. As there illustrated, the outer sole 85 has a honeycomb structure with air cells 29 which are formed by internal ribs 31. A cover plate 33, which is also the midsole of the shoe, overlies the ribs and is sealed thereto to provide enclosed air cells 29. The plate 33 can be made of a high strength and wear resistant material such as carbon or graphite fiber reinforced plastics. The plate 33 increases the strength and stiffness of the sole without significantly increasing its weight. The plate 33 has a central recess 27 which serves as a spring retainer for the base of helical spring 26. The air pump 79 is similar to air pump 65 previously described with reference to FIG. 87 and has its upper layer 55 extending through a receiving aperture in the inner sole and has a plate 41 beneath the upper layer 55, all as previously described.

FIG. 88 also illustrates the assembly of the inner sole and the upper lining 373 which is contained between the outer skin 365 and the inner liner 367 of the upper for the footwear. As previously mentioned the upper lining 373 is also formed with internal inflated passageways 289 which are formed by seams 265. Preferably, the upper lining 373 has tabs such as 228 which can be bonded to the outer skin 365 and liner 367 of the shoe to retain the upper lining 373 in place. The tabs 228 can also be bonded or sewed to the outer sole 85 in the fabrication of the shoe. In this fabrication, the peripheral seam 16 of the inner sole is folded upwardly and can be used as a surface for attachment of the inner sole with the upper liner 373 and outer sole 85, as desired.

Referring now to FIG. 89, there is illustrated an embodiment of the invention which is alternative to that shown in FIG. 88. This embodiment is essentially the same as that of FIG. 88, except an aperture 24 extends through the outer sole 85 and midsole 33 at the heel, immediately beneath the heel air pump 93. The aperture is closed with a flanged sleeve 46 which receives a plug 67 that is threadably engaged in the sleeve 46. A slot 69 can be provided on the underside of the plug 67 to permit its insertion and removal. The plug 67 provides access to the interior of the air pump 93, thereby permitting replacement of the helical coil spring 26. The spring 26 provides greater resiliency to the air pump and also increases the resiliency and shock absorbing properties of the shoe. The spring 26 can be replaced with springs of varied comprssion strengths to adjust the shoe to the wearer's weight and particular activity, e.g., sport, walking, running, basketball, etc., as well as for sport training exercises. The remainder of the structure is the same as that shown in FIG. 88.

In all of the embodiments, the outer soles 85 can be formed of suitable rubber or plastics, including, for example, open or closed cell foams of ethylene vinyl acetate copolymers, polyurethane, ethylene, etc.

The invention provides the advantages of an inflatable inner sole and upper lining which can be inflated by the normal walking activities or which can be manually inflated by operation of a small hand pump. In either case, the firmness of the inner sole is custom, adjustably controllable with a pressure control relief valve to insure exactly the desired softness and resiliency for any desired performance and for maximum comfort to avoid fatigue.

The pressures within the individual chambers of the lining can be adjusted to precisely the pressure which is most comfortable, or which provides for the maximum performance of the wearer. In the embodiment such as that shown in FIGS. 73–75, any of the chambers can be adjusted to the desired pressure by connecting the air pump discharge valve to a selected connector/valve (298, 300, 304, 306 or 308 of the inflatable innersole, or to a selected connector/valve (310, 312, 314 or 316 of the inflatable upper liner and by applying pressure with the air pump until the desired inflation pressure is reached, as can be determined by the pressure, e.g., firmness, applied to the wearer's foot. Fine adjustment of the pressure within each chamber can then be achieved by releasing any excess pressure through the pressure control valve.

With the embodiment such as shown in FIGS. 69–72, where the pressure control valves are serially connected, the user can alter the order of the valves in the serial connection to alter the location of the highest pressured chamber. As shown in FIGS. 69–72, the rear chamber 163 is provided with the greatest pressure by control valve 58a, and each of the chambers which are connected to the succeeding valves 58b, 58c, 58d and 58e is provided with a slightly lesser pressure than the chamber connected to the immediate preceding valve. The connection of the tubes 64a, 64b, 64c, 64d and 64e can be altered, as desired, to provide variation in the pressure which is applied to any of the chambers, thereby adapting the footwear to different applications, or varying the comfort of various parts of the footwear.

The inflatable inner sole also provides shock absorbency and can increase walking and running efficiency as it will absorb energy from impact and return it in a resilient lift to the wearer. The inflatable inner sole also increases the stability of the footwear, and can lead to reduced incidence of injuries such as sprains and the like. Since the preferred lining is self-inflated by normal walking or other activities of the wearer, the internal pressure of the lining remains constant at the setting of the pressure relief valve, thereby always compensating for any loss of air from the lining, which can result from various causes, e.g., defective or worn seams, or the permeability to air of the lining material. Finally, all of these advantages are secured with an inner sole and, optionally upper lining, of very light weight. The upper lining can be replaceable, if desired. It is preferred that the inner sole is formed as a replaceable insert, thereby permitting replacement when worn or damaged.

The pressure control valve is preferably located, as illustrated, adjacent the instep or under the arch. It could, however, be located at any other position where there is sufficient space, preferably in a readily accessible location.

Preferably the inner sole includes the plurality of apertures to permit fluid communication between the under side and the top side of the inflatable inner sole thus providing breathability through the inner sole. This insures that moisture does not accumulate on the top of the inflated inner sole. In the most preferred embodiment, the inner sole is provided with a forced air circulating pump which operates with normal walking activities to induce forced air circulation through the inner sole and the shoe. The flexing of the air passageways and the circulation of the air causes a massaging action on the soles of the wearer's feet.

The inflatable lining can be readily manufactured from flat sheets of plastic film, preferably polyurethane, by stamping and with solvent or ultrasonic or thermal bonding to form the seams. Of these, heat stamping in which the sheets are pressed with heat to form the seams is preferred.

I claim:

1. The combination of footwear having an outer sole and an attached outer upper with an inflatable lining received within said footwear for support therein against selected flexible, interior surfaces of said footwear comprising the tongue, the sole, the rear and opposite interior sides of the footwear, and combinations thereof, and comprising: an air enclosure having flexible walls and being formed of first and second sheets sealed together by a peripheral seam and having a plurality of discontinuous seams forming passageways within said lining and provided with at least one continuous transverse seam to subdivide said sealed interior into at least two sealed chambers, a respective relief valve having an user adjustable valve member in communication with each of said chambers to permit the user to adjust the pressures within said sealed interior chambers independently of each other, an air pump supported on said lining and having an air pump discharge passageway connecting the discharge of said air pump with said sealed interior chambers of said lining, whereby said pump can provide inflation pressure within said chambers of said sealed interior and connector means connecting said air pump discharge passageway to said sealed interior chambers of said lining to apply inflation pressure thereto whereby the user can adjust the resiliency, shock absorbency and comfort of the lining, with said lining, upon inflation, forming exterior air channels between the outer surface of said inflatable lining and the opposite inner surface of said footwear and having said air pump discharge passageway extending from said air pump to said exterior air channels, thereby permitting said air pump to circulate air through said footwear.

2. The combination of an inflatable lining and footwear which has a sole and a flexible upper, said lining received within said footwear and supported therein against selected flexible, interior surfaces of said footwear comprising the tongue, the sole, the rear and opposite interior sides of the footwear, and combinations thereof, said lining comprising: an air enclosure having flexible walls formed of plastic film surrounding a sealed interior and provided with at least one continuous transverse seam to subdivide said sealed interior into at least two sealed chambers, a respective relief valve in communication with each of said chambers to permit the user to adjust the pressures within said sealed interior chambers independently of each other, an air pump supported on said lining and having an air pump discharge passageway with each of said relief valves including a valve housing, an outlet port, an inlet port, and an user adjustable valve member which is received within said housing and positioned between said valve ports to provide a controlled air pressure at said outlet port and a flexible tube connecting said outlet port to a respective one of said sealed chambers, whereby the user can adjust the pressure within each respective chamber independently of each other to adjust the resiliency, shock absorbency and comfort of the lining, and connector means operable to connect said air pump discharge passageway to said inlet ports of said relief valves whereby said pump can provide inflation pressure within said chambers.

3. The combination of an inflatable lining and footwear having a sole and a flexible upper, with said lining received within footwear for support therein against selected flexible, interior surfaces of said footwear comprising the tongue, the sole, the rear and opposite interior sides of the footwear, and combinations thereof, which lining comprises: an air enclosure having flexible walls formed as a laminate of first and second flat sheets of plastic film having a size and shape of said selected interior surfaces and bonded together about their peripheral edges and including a sole portion to provide an inflatable inner sole, with at least two continuous transverse seams to subdivide said inner sole into rear, front and arch chambers, an air pump having a discharge port supported on said lining, three relief valves, one each, in communication with a respective one of said chambers to permit the user to adjust the pressures within said sealed interior chambers independently of each other, and connector means connecting said air pump discharge port to said sealed interior chambers of said lining to apply inflation pressure thereto with each of said relief valves including a valve housing, an outlet port, an inlet port, and a valve member which is received within its respective valve housing and positioned between said valve ports to provide a controlled air pressure at said outlet port and a plurality of flexible tubes, one each connecting the outlet port of its respective valve to a selected one of said sealed chambers, and wherein said connector means includes at least one air pump flexible discharge tube to connect the discharge of said air pump to the inlet ports of said valves.

4. The combination of claim 3 wherein each of said valves also includes an excess air discharge port and said plurality of valves are serially connected with the first valve thereof having its inlet port connected to said air pump flexible discharge tube and having its excess air discharge valve port connected to the inlet port of the succeeding valve, and with the controlled pressure discharge ports of each of said valves being connected with respective flexible tubes to its respective sealed chamber of said inflatable lining.

5. The combination of claim 4 wherein said lining has a plurality of discontinuous seams forming tubular passageways within said lining, and forming exterior air channels between the outer surface of said inflatable lining and the opposite inner surface of said footwear and including a flexible discharge tube extending from the excess air port of the last of said serially connected plurality of valves to said exterior air channels, thereby permitting said air pump to circulate air through said footwear.

6. The combination of claim 3 wherein said air pump discharge passageway is an air pump flexible discharge tube and wherein each of said relief valves includes a sleeve which removably receives said air pump flexible discharge tube whereby said discharge tube may be connected to any selected one of said relief valves.

7. The combination of footwear having an outer sole and an attached outer upper with an inflatable lining received within said footwear for support therein against selected flexible, interior surfaces of said footwear comprising the tongue, the sole, the rear and opposite interior sides of the footwear, and combinations thereof, and comprising an air enclosure having flexible walls formed of plastic film surrounding a sealed interior and being formed of first and second flat sheets sealed together by a peripheral seam and having a plurality of discontinuous seams forming passageways within said lining, and forming indentations in the exterior surfaces of said lining between said passageways, and provided with at least one continuous transverse seam to subdivide said sealed interior into at least two sealed chambers, at least one relief valve having an user adjustable valve member, said relief valve being in communication with a respective one of said chambers to adjust the pressure within said respective one chamber whereby the user can adjust the resiliency, shock absorbency and comfort of the lining, and an air pump supported on said lining and having an air pump discharge passageway connecting the discharge of said air pump with said sealed interior chambers of said lining, whereby said pump can provide inflation pressure within said chambers of said sealed interior and with said seams forming exterior air channels between the outer surface of said inflatable lining and the opposite inner surface of said footwear and including a flexible tube with a sleeve extending to said exterior air channels, whereby said air pump discharge passageway may be connected to said sleeve and flexible tube to circulate air through said footwear.

8. An inflatable lining to be received within footwear for support therein against selected flexible, interior surfaces of said footwear comprising the tongue, the sole, the rear and opposite interior sides of the footwear, and combinations thereof, which comprises: an air enclosure having flexible walls formed as a laminate of first and second sheets of plastic having a size and shape of said selected interior surfaces and bonded together about their peripheral edges and including a sole portion to provide an inflatable inner sole, with continuous transverse seams to subdivide said inner sole into at least rear, front and arch chambers, an air pump supported on said lining and having an air pump discharge passageway, relief valves, one each, in communication with a respective one of said chambers to permit the user to adjust the pressures within said sealed interior chambers independently of each other, with each of said valves also including an excess air discharge port and said relief valves being serially connected with the first valve thereof having its inlet port connected to said air pump discharge passageway and having its excess air discharge valve port connected to the inlet port of the succeeding valve in said series, and with the controlled pressure discharge ports of each of said valves being connected with respective flexible tubes to its respective sealed chamber of said inflatable lining.

9. The combination of footwear having an outer sole and an attached outer upper with said inflatable lining of claim 8 received within said footwear as an internal lining thereof and being formed of first and second sheets sealed together by a peripheral seam and having a plurality of discontinuous seams forming passageways within said lining, and forming indentations in the exterior surfaces of said lining between said passageways, thereby forming exterior air channels between the outer surface of said inflatable lining and the opposite inner surface of said footwear and including a flexible discharge tube extending from the excess air port of the last of said serially connected plurality of valves to said exterior air channels, thereby permitting said air pump to circulate air through said footwear.

10. The combination of footwear having a sole and attached flexible upper with an inflatable lining received within said footwear for support therein against selected flexible, interior surfaces of said footwear comprising the tongue, the sole, the rear and opposite interior sides of the footwear, and combinations thereof, which lining comprises: an air enclosure having flexible walls formed as a laminate of first and second flat sheets of plastic film having a size and shape of said selected interior surfaces and bonded together about their peripheral edges and including a sole portion to provide an inflatable inner sole, with continuous transverse seams to subdivide said inner sole into rear, front and arch chambers, an air pump supported on said lining and having an air pump discharge passageway, relief valves, one each, in communication with a respective one of said chambers to permit the user to adjust the pressures within said sealed interior chambers independently of each other, with each of said relief valves including a sleeve which removably receives said air pump discharge passageway whereby said discharge passageway may be connected to any selected one of said pressure relief valves.

11. The combination of claim 10 wherein said lining has a plurality of discontinuous seams forming passageways within said lining, and forming indentations in the exterior surfaces of said lining between said passageways, thereby forming exterior air channels between the outer surface of said inflatable lining and the opposite inner surface of said footwear and including a flexible tube with a sleeve extending to said exterior air channels, whereby said air pump flexible passageway may be connected to said sleeve and flexible tube to circulate air through said footwear.

12. The combination of claim 10 wherein said continuous seams subdivide the lining into medial and lateral rear, medial and lateral front, and arch chambers.

13. The combination of an inflatable lining and footwear which has a sole and a flexible upper, said lining received within said footwear and supported therein against selected flexible, interior surfaces of said footwear comprising the tongue, the sole, the rear and opposite interior sides of the footwear, and combinations thereof, which comprises: first and second flat sheets of plastic film having the shape and size of the selected inner surfaces including sole portions to provide an inflatable inner sole, with said first and second sheets being bonded together in a continuous seam about their peripheral edges to form an air enclosure having flexible walls surrounding a sealed interior and provided with at least one continuous transverse seam to subdivide said sealed interior into at least two sealed chambers, at least one relief valve having an user adjustable valve member, said relief valve being in communication with a respective one of said chambers to adjust the pressure within said respective one chamber whereby the user can adjust the resiliency, shock absorbency and comfort of the lining, and including an opening through said first and second sheets and surrounded by a closed circular loop seam located at a preselected position in said lining, and a flexible bulb air pump received within said opening said air pump having an inlet port and air pump inlet check valve and an air pump discharge port with an air pump discharge check valve, an air pump discharge passageway connecting the discharge of said air pump with said sealed interior chambers of said lining, whereby said air pump can provide inflation pressure within said chambers of said sealed interior.

14. The combination of claim 13 wherein said opening and closed circular loop seam are located at the heel of the sole, whereby the normal walking activities of a wearer of footwear fitted with said inflatable lining will operate said air pump and pressurize said inflatable lining.

15. The combination of claim 14 wherein said inflatable lining is formed as a complete assembly which is inserted into said footwear.

16. The combination of claim 14 including spring means contained within said flexible bulb to bias said bulb into an extended position, and to increase the resiliency and shock absorbency of said lining.

17. An inflatable lining to be received within footwear for support therein against selected flexible, interior surfaces of said footwear comprising the tongue, the sole, the rear and opposite interior sides of the footwear, and combinations thereof, which comprises: an air enclosure having flexible walls formed of a laminate of first and second sheets of plastic having a size and shape of said selected interior surfaces including a sole portion, and bonded about their peripheral edges to form a sealed interior and provided with at least one continuous transverse seam to subdivide said sealed interior into at least two sealed chambers, at least one relief valve having an user adjustable valve member, said relief valve being in communication with a respective one of said chambers to adjust the pressure within said respective one chamber whereby the user can adjust the resiliency, shock absorbency and comfort of the lining, and an air pump supported on said lining and comprising a flexible bulb having an air puma inlet port and air pump inlet check valve and an air pump discharge port with an air pump discharge check valve communicating with an air pump discharge passageway connecting the discharge of said air pump with said sealed interior chambers of said lining, whereby said pump can provide inflation pressure within said chambers of said sealed interior, with said sole portion having an opening through said first and second sheets and surrounded by a closed circular loon seam located at the heel of the sole with said flexible bulb received within said opening whereby the normal walking activities of a wearer of said footwear will operate said air pump and pressurize said inflatable lining, and including spring means within said flexible bulb to bias said bulb into an extended position, with an aperture in the undersurface of said flexible bulb, and including a sealing plug removably received within said aperture, thereby providing access to permit removal and replacement of said spring means with spring means of varied compression strengths.

18. An inflatable liner for footwear which has a sole and a flexible upper, said lining to be received within said footwear and supported therein against selected flexible, interior surfaces of said footwear comprising the tongue, the sole, the rear and opposite interior sides of the footwear, said liner comprising first and second flat sheets of plastic film having the shape and size of the selected inner surfaces and bonded together in a continuous seam about their peripheral edges to form a sealed interior and a plurality of discontinuous seams between the first and second flat sheets to create within the sealed interior a plurality of interconnecting passageways, and at least one continuous seam to subdivide the sealed interior into at least two subdivided, sealed chambers; means to supply pressured air to said sealed chambers comprising an air tube connected to each of said chambers, a pressure relief valve and a connector sleeve carried on each of said tubes whereby a source of pressured air can be connected to said tubes and wherein said relief valves are pressure relief valves each having a valve housing, an outlet port, an inlet port, an excess air discharge port, and an user adjustable valve member which is received within said housing and positioned between said valve ports to provide a controlled air pressure at said outlet port and a tube connecting said outlet port to a respective one of said sealed chambers, with a tube connecting the excess air discharge port of one of said valves to the inlet port of the next valve, whereby the user can adjust the pressure within each respective chamber.

19. A combination of footwear comprising a sole and a flexible upper and an inflatable lining within said footwear, said lining comprising: first and second flat sheets of plastic film sealed about their periphery to form a sealed enclosure and including a flexible bulb having inlet and outlet check valves to permit its use to pump air under pressure and a passageway communicating from said outlet check valve of said bulb to said enclosure, said bulb being located at the heel of said footwear; spring means received within said flexible bulb to increase the resiliency and shock absorbency of said lining, a through aperture in the sole of said footwear also at the heel thereof and communicating with the interior of said flexible bulb, a sealing plug removably received within said aperture and sealing said flexible bulb, to provide access to the interior of said flexible bulb, thereby permitting removal and replacement of said spring means with spring means of varied compression strengths.

20. The inflatable lining of claim 19 wherein said spring means is a helical coil compression spring.

\* \* \* \* \*